US006879910B2

(12) United States Patent
Shike et al.

(10) Patent No.: US 6,879,910 B2
(45) Date of Patent: Apr. 12, 2005

(54) SYSTEM AND METHOD FOR MONITORING REMOTELY LOCATED OBJECTS

(75) Inventors: Chikashi Shike, Fukushima (JP); Noriaki Abe, Tokyo (JP)

(73) Assignees: Bigrental Co., Ltd., Fukushima (JP); Komatsu Ltd., Tokyo (JP)

( * ) Notice: Subject to any disclaimer, the term of this patent is extended or adjusted under 35 U.S.C. 154(b) by 42 days.

(21) Appl. No.: 10/237,981

(22) Filed: Sep. 10, 2002

(65) Prior Publication Data

US 2003/0074134 A1 Apr. 17, 2003

(30) Foreign Application Priority Data

Sep. 10, 2001 (JP) ...................................... 2001-274118

(51) Int. Cl.[7] ................................................ G06F 15/50

(52) U.S. Cl. ......................... 701/208; 701/213; 701/50; 340/989; 340/990

(58) Field of Search .......................... 701/50, 201, 207, 701/208, 209, 211, 213; 340/988–991, 995.19

(56) References Cited

U.S. PATENT DOCUMENTS

| | | | | |
|---|---|---|---|---|
| 5,243,530 A | * | 9/1993 | Stanifer et al. | 701/219 |
| 5,742,914 A | * | 4/1998 | Hagenbuch | 701/35 |
| 5,758,313 A | * | 5/1998 | Shah et al. | 455/456.2 |
| 5,884,216 A | * | 3/1999 | Shah et al. | 701/207 |
| 5,904,727 A | * | 5/1999 | Prabhakaran | 701/208 |
| 6,026,345 A | * | 2/2000 | Shah et al. | 701/117 |
| 6,292,724 B1 | * | 9/2001 | Apsell et al. | 701/29 |

FOREIGN PATENT DOCUMENTS

| | | | |
|---|---|---|---|
| JP | 5-233653 | 9/1993 | |
| JP | 2000-113261 | 4/2000 | |
| JP | 2000-194894 | 7/2000 | |
| JP | 2000-339581 | 12/2000 | |
| WO | WO 0022595 A1 * | 4/2000 | G08G/1/127 |

* cited by examiner

*Primary Examiner*—Michael J. Zanelli
*Assistant Examiner*—Eric M. Gibson
(74) *Attorney, Agent, or Firm*—Westerman, Hattori, Daniels & Adrian, LLP

(57) ABSTRACT

The present invention makes it possible to precisely monitor remotely located objects. The construction vehicles each contain a GPS apparatus, and various sensors for capturing the states of vehicle parts, and are capable of reporting, as required, the current position captured by the GPS apparatus, and operation information captured by the various sensors to the TMS mail server via the satellite communication system. The TMS mail server and the rental company system are capable of communicating at any time via a communication network between computers. The TMS mail server collects the latest positional information, operation information, and so forth, on the construction vehicles being rented and relays such information in the form of electronic mail, for example, to the rental company system as required or periodically. The rental company system displays construction vehicles by means of marks in the current positions of the construction vehicles on a map represented by map data, or in the form of a list, based on the collected positional information and operation information, on a branch store computer terminal. The system also displays the operating states of rented construction vehicles based on the collected operation information, on the branch store computer terminal.

12 Claims, 78 Drawing Sheets

OVERALL BUSINESS TASK/ SYSTEM FLOW
(FROM A STOCK INQUIRY UNTIL A POINT-TO-POINT TRANSFER REQUEST)

OVERALL BUSINESS TASK/ SYSTEM FLOW
(FROM TRANSPORTATION SCHEDULING UNTIL WAREHOUSING)

EXPLANATORY NOTES FOR THE FLOWCHART OF
FIG. 7 AND SUBSEQUENT FLOWCHARTS

| SYMBOL | MEANING |
|---|---|

:FLOW OF BUSINESS TASK/ SYSTEM PROCESSING

:PROCESSING BY THE SYSTEM

:PROCESSING BY A PERSON

:CREATION OF A NEW RECORD WITH RESPECT TO A

:UPDATING OF THE CONTENTS OF A SPECIFIC RECORD, WITH RESPECT TO A

:READING/REFERENCING OF A

FIG.17

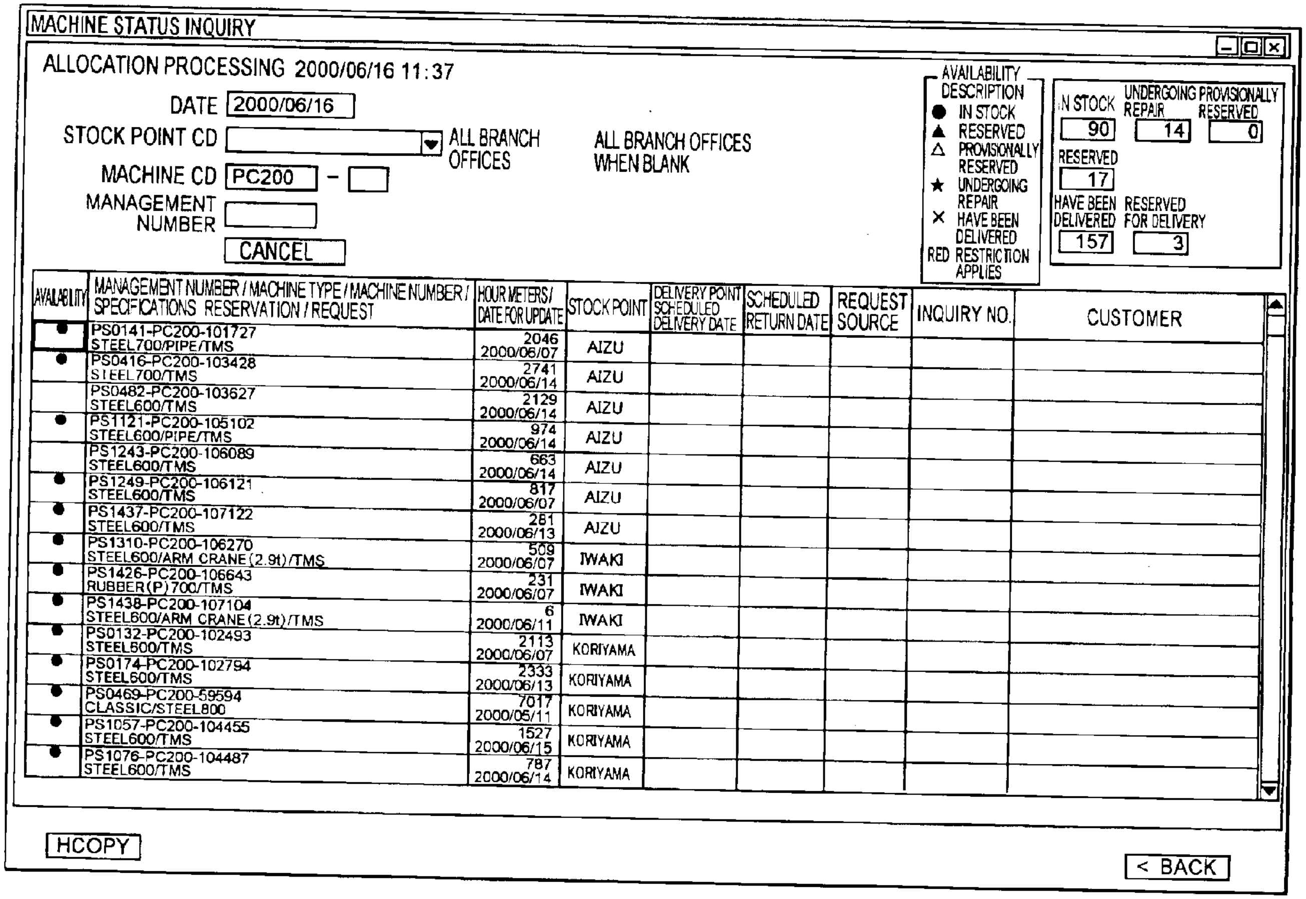

| AVAILABILITY | MANAGEMENT NUMBER / MACHINE TYPE / MACHINE NUMBER / SPECIFICATIONS RESERVATION / REQUEST | HOUR METERS / DATE FOR UPDATE | STOCK POINT | DELIVERY POINT SCHEDULED DELIVERY DATE | SCHEDULED RETURN DATE | REQUEST SOURCE | INQUIRY NO. | CUSTOMER |
|---|---|---|---|---|---|---|---|---|
| ● | PS0141-PC200-101727 STEEL700/PIPE/TMS | 2046 2000/06/07 | AIZU | | | | | |
| ● | PS0416-PC200-103428 STEEL700/TMS | 2741 2000/06/14 | AIZU | | | | | |
| | PS0482-PC200-103627 STEEL600/TMS | 2129 2000/06/14 | AIZU | | | | | |
| ● | PS1121-PC200-105102 STEEL600/PIPE/TMS | 974 2000/06/14 | AIZU | | | | | |
| | PS1243-PC200-106089 STEEL600/TMS | 663 2000/06/14 | AIZU | | | | | |
| ● | PS1249-PC200-106121 STEEL600/TMS | 817 2000/06/07 | AIZU | | | | | |
| ● | PS1437-PC200-107122 STEEL600/TMS | 281 2000/06/13 | AIZU | | | | | |
| ● | PS1310-PC200-106270 STEEL600/ARM CRANE(2.9t)/TMS | 509 2000/06/07 | IWAKI | | | | | |
| ● | PS1426-PC200-106643 RUBBER(P)700/TMS | 231 2000/06/07 | IWAKI | | | | | |
| ● | PS1438-PC200-107104 STEEL600/ARM CRANE(2.9t)/TMS | 6 2000/06/11 | IWAKI | | | | | |
| ● | PS0132-PC200-102493 STEEL600/TMS | 2113 2000/06/07 | KORIYAMA | | | | | |
| ● | PS0174-PC200-102794 STEEL600/TMS | 2333 2000/06/13 | KORIYAMA | | | | | |
| ● | PS0469-PC200-59594 CLASSIC/STEEL800 | 7017 2000/05/11 | KORIYAMA | | | | | |
| ● | PS1057-PC200-104455 STEEL600/TMS | 1527 2000/06/15 | KORIYAMA | | | | | |
| ● | PS1076-PC200-104487 STEEL600/TMS | 787 2000/06/14 | KORIYAMA | | | | | |

FIG.23

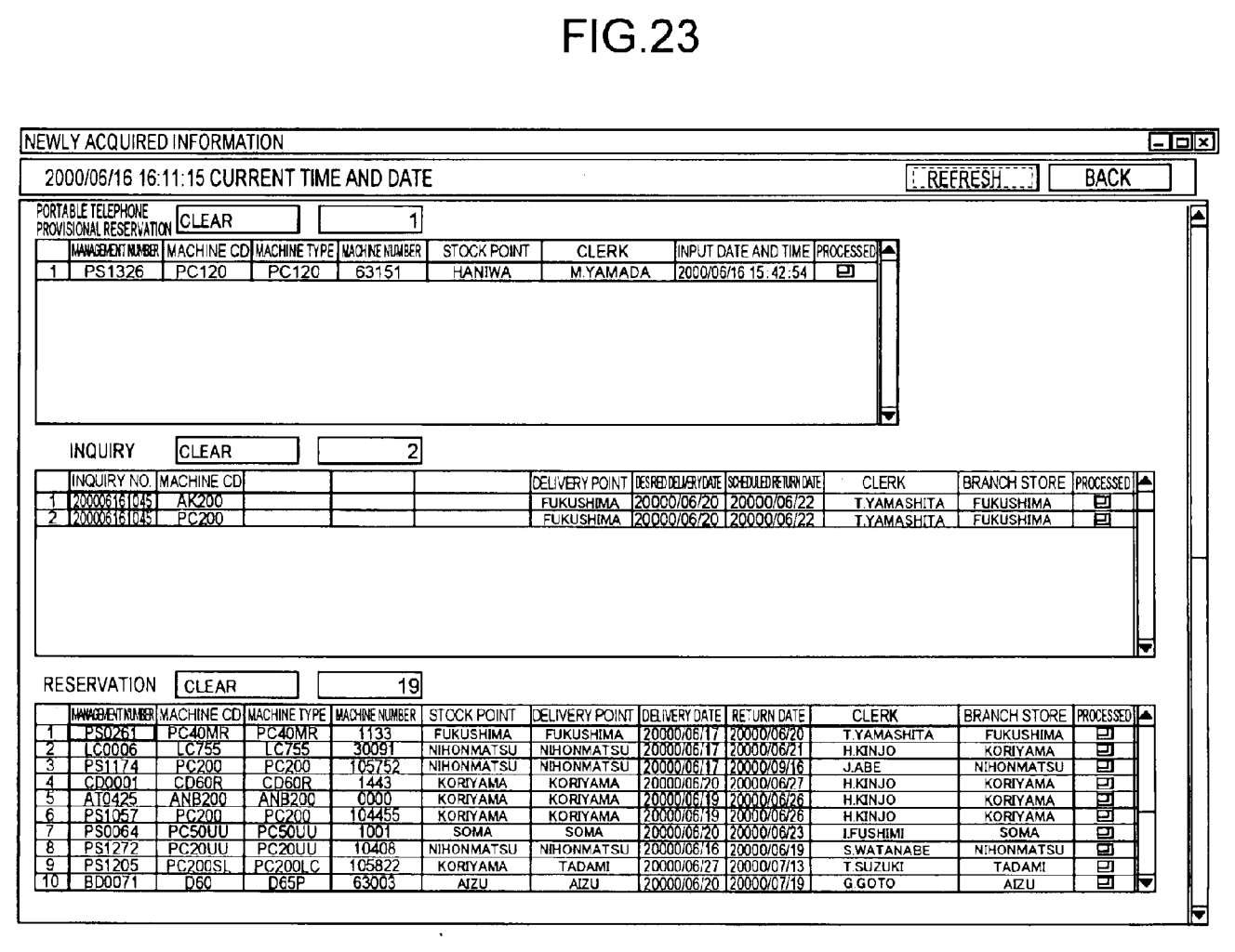

NEWLY ACQUIRED INFORMATION

2000/06/16 16:11:15 CURRENT TIME AND DATE

REFRESH BACK

PORTABLE TELEPHONE PROVISIONAL RESERVATION CLEAR 1

| | MANAGEMENT NUMBER | MACHINE CD | MACHINE TYPE | MACHINE NUMBER | STOCK POINT | CLERK | INPUT DATE AND TIME | PROCESSED |
|---|---|---|---|---|---|---|---|---|
| 1 | PS1326 | PC120 | PC120 | 63151 | HANIWA | M.YAMADA | 2000/06/16 15:42:54 | ☐ |

INQUIRY CLEAR 2

| | INQUIRY NO. | MACHINE CD | | | | DELIVERY POINT | DESIRED DELIVERY DATE | SCHEDULED RETURN DATE | CLERK | BRANCH STORE | PROCESSED |
|---|---|---|---|---|---|---|---|---|---|---|---|
| 1 | 200006161045 | AK200 | | | | FUKUSHIMA | 20000/06/20 | 20000/06/22 | T.YAMASHITA | FUKUSHIMA | ☐ |
| 2 | 200006161045 | PC200 | | | | FUKUSHIMA | 20000/06/20 | 20000/06/22 | T.YAMASHITA | FUKUSHIMA | ☐ |

RESERVATION CLEAR 19

| | MANAGEMENT NUMBER | MACHINE CD | MACHINE TYPE | MACHINE NUMBER | STOCK POINT | DELIVERY POINT | DELIVERY DATE | RETURN DATE | CLERK | BRANCH STORE | PROCESSED |
|---|---|---|---|---|---|---|---|---|---|---|---|
| 1 | PS0261 | PC40MR | PC40MR | 1133 | FUKUSHIMA | FUKUSHIMA | 20000/06/17 | 20000/06/20 | T.YAMASHITA | FUKUSHIMA | ☐ |
| 2 | LC0006 | LC755 | LC755 | 30091 | NIHONMATSU | NIHONMATSU | 20000/06/17 | 20000/06/21 | H.KINJO | KORIYAMA | ☐ |
| 3 | PS1174 | PC200 | PC200 | 105752 | NIHONMATSU | NIHONMATSU | 20000/06/17 | 20000/09/16 | J.ABE | NIHONMATSU | ☐ |
| 4 | CD0001 | CD60R | CD60R | 1443 | KORIYAMA | KORIYAMA | 20000/06/20 | 20000/06/27 | H.KINJO | KORIYAMA | ☐ |
| 5 | AT0425 | ANB200 | ANB200 | 0000 | KORIYAMA | KORIYAMA | 20000/06/19 | 20000/06/26 | H.KINJO | KORIYAMA | ☐ |
| 6 | PS1057 | PC200 | PC200 | 104455 | KORIYAMA | KORIYAMA | 20000/06/19 | 20000/06/26 | H.KINJO | KORIYAMA | ☐ |
| 7 | PS0064 | PC50UU | PC50UU | 1001 | SOMA | SOMA | 20000/06/20 | 20000/06/23 | I.FUSHIMI | SOMA | ☐ |
| 8 | PS1272 | PC20UU | PC20UU | 10408 | NIHONMATSU | NIHONMATSU | 20000/06/16 | 20000/06/19 | S.WATANABE | NIHONMATSU | ☐ |
| 9 | PS1205 | PC200SL | PC200LC | 105822 | KORIYAMA | TADAMI | 20000/06/27 | 20000/07/13 | T.SUZUKI | TADAMI | ☐ |
| 10 | BD0071 | D60 | D65P | 63003 | AIZU | AIZU | 20000/06/20 | 20000/07/19 | G.GOTO | AIZU | ☐ |

FIG.33

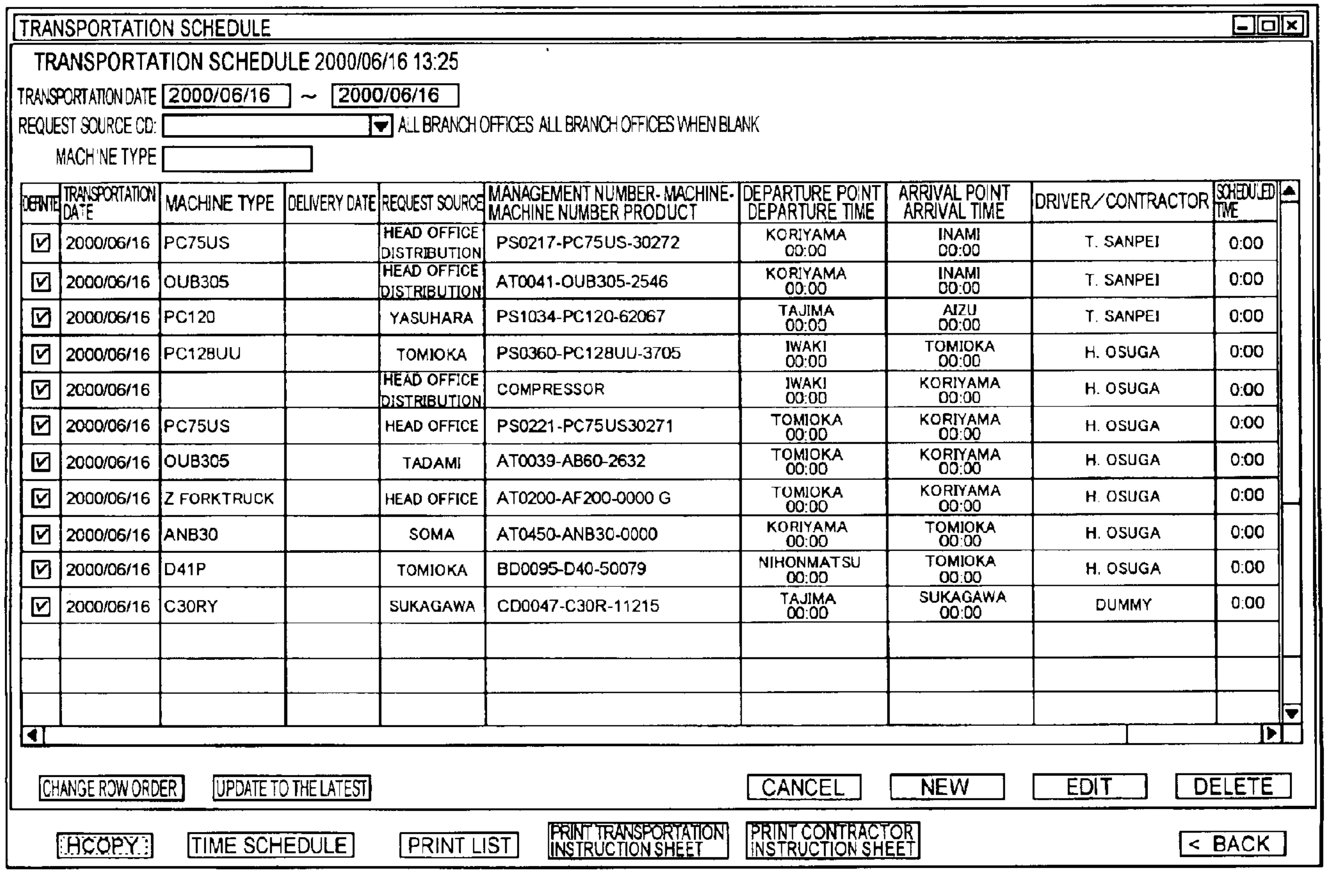

| DEFINITE | TRANSPORTATION DATE | MACHINE TYPE | DELIVERY DATE | REQUEST SOURCE | MANAGEMENT NUMBER-MACHINE-MACHINE NUMBER PRODUCT | DEPARTURE POINT DEPARTURE TIME | ARRIVAL POINT ARRIVAL TIME | DRIVER/CONTRACTOR | SCHEDULED TIME |
|---|---|---|---|---|---|---|---|---|---|
| ☑ | 2000/06/16 | PC75US | | HEAD OFFICE DISTRIBUTION | PS0217-PC75US-30272 | KORIYAMA 00:00 | INAMI 00:00 | T. SANPEI | 0:00 |
| ☑ | 2000/06/16 | OUB305 | | HEAD OFFICE DISTRIBUTION | AT0041-OUB305-2546 | KORIYAMA 00:00 | INAMI 00:00 | T. SANPEI | 0:00 |
| ☑ | 2000/06/16 | PC120 | | YASUHARA | PS1034-PC120-62067 | TAJIMA 00:00 | AIZU 00:00 | T. SANPEI | 0:00 |
| ☑ | 2000/06/16 | PC128UU | | TOMIOKA | PS0360-PC128UU-3705 | IWAKI 00:00 | TOMIOKA 00:00 | H. OSUGA | 0:00 |
| ☑ | 2000/06/16 | | | HEAD OFFICE DISTRIBUTION | COMPRESSOR | IWAKI 00:00 | KORIYAMA 00:00 | H. OSUGA | 0:00 |
| ☑ | 2000/06/16 | PC75US | | HEAD OFFICE | PS0221-PC75US30271 | TOMIOKA 00:00 | KORIYAMA 00:00 | H. OSUGA | 0:00 |
| ☑ | 2000/06/16 | OUB305 | | TADAMI | AT0039-AB60-2632 | TOMIOKA 00:00 | KORIYAMA 00:00 | H. OSUGA | 0:00 |
| ☑ | 2000/06/16 | Z FORKTRUCK | | HEAD OFFICE | AT0200-AF200-0000 G | TOMIOKA 00:00 | KORIYAMA 00:00 | H. OSUGA | 0:00 |
| ☑ | 2000/06/16 | ANB30 | | SOMA | AT0450-ANB30-0000 | KORIYAMA 00:00 | TOMIOKA 00:00 | H. OSUGA | 0:00 |
| ☑ | 2000/06/16 | D41P | | TOMIOKA | BD0095-D40-50079 | NIHONMATSU 00:00 | TOMIOKA 00:00 | H. OSUGA | 0:00 |
| ☑ | 2000/06/16 | C30RY | | SUKAGAWA | CD0047-C30R-11215 | TAJIMA 00:00 | SUKAGAWA 00:00 | DUMMY | 0:00 |

FIG.60

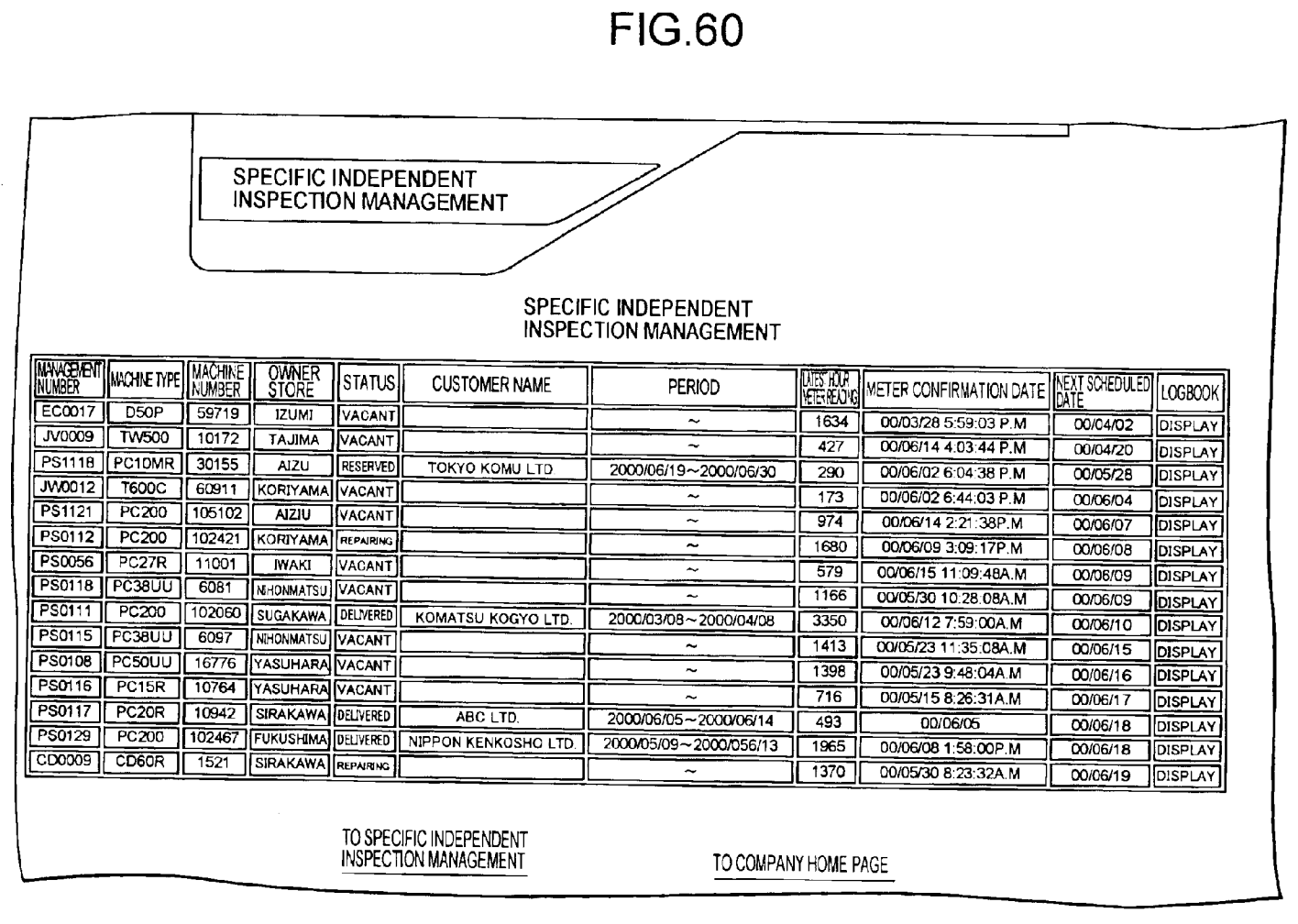

SPECIFIC INDEPENDENT INSPECTION MANAGEMENT

SPECIFIC INDEPENDENT INSPECTION MANAGEMENT

| MANAGEMENT NUMBER | MACHINE TYPE | MACHINE NUMBER | OWNER STORE | STATUS | CUSTOMER NAME | PERIOD | LATEST HOUR METER READING | METER CONFIRMATION DATE | NEXT SCHEDULED DATE | LOGBOOK |
|---|---|---|---|---|---|---|---|---|---|---|
| EC0017 | D50P | 59719 | IZUMI | VACANT | | ~ | 1634 | 00/03/28 5:59:03 P.M | 00/04/02 | DISPLAY |
| JV0009 | TW500 | 10172 | TAJIMA | VACANT | | ~ | 427 | 00/06/14 4:03:44 P.M | 00/04/20 | DISPLAY |
| PS1118 | PC10MR | 30155 | AIZU | RESERVED | TOKYO KOMU LTD | 2000/06/19~2000/06/30 | 290 | 00/06/02 6:04:38 P.M | 00/05/28 | DISPLAY |
| JW0012 | T600C | 60911 | KORIYAMA | VACANT | | ~ | 173 | 00/06/02 6:44:03 P.M | 00/06/04 | DISPLAY |
| PS1121 | PC200 | 105102 | AIZIU | VACANT | | ~ | 974 | 00/06/14 2:21:38P.M | 00/06/07 | DISPLAY |
| PS0112 | PC200 | 102421 | KORIYAMA | REPAIRING | | ~ | 1680 | 00/06/09 3:09:17P.M | 00/06/08 | DISPLAY |
| PS0056 | PC27R | 11001 | IWAKI | VACANT | | ~ | 579 | 00/06/15 11:09:48A.M | 00/06/09 | DISPLAY |
| PS0118 | PC38UU | 6081 | NIHONMATSU | VACANT | | ~ | 1166 | 00/05/30 10:28:08A.M | 00/06/09 | DISPLAY |
| PS0111 | PC200 | 102060 | SUGAKAWA | DELIVERED | KOMATSU KOGYO LTD. | 2000/03/08~2000/04/08 | 3350 | 00/06/12 7:59:00A.M | 00/06/10 | DISPLAY |
| PS0115 | PC38UU | 6097 | NIHONMATSU | VACANT | | ~ | 1413 | 00/05/23 11:35:08A.M | 00/06/15 | DISPLAY |
| PS0108 | PC50UU | 16776 | YASUHARA | VACANT | | ~ | 1398 | 00/05/23 9:48:04A.M | 00/06/16 | DISPLAY |
| PS0116 | PC15R | 10764 | YASUHARA | VACANT | | ~ | 716 | 00/05/15 8:26:31A.M | 00/06/17 | DISPLAY |
| PS0117 | PC20R | 10942 | SIRAKAWA | DELIVERED | ABC LTD. | 2000/06/05~2000/06/14 | 493 | 00/06/05 | 00/06/18 | DISPLAY |
| PS0129 | PC200 | 102467 | FUKUSHIMA | DELIVERED | NIPPON KENKOSHO LTD. | 2000/05/09~2000/056/13 | 1965 | 00/06/08 1:58:00P.M | 00/06/18 | DISPLAY |
| CD0009 | CD60R | 1521 | SIRAKAWA | REPAIRING | | ~ | 1370 | 00/05/30 8:23:32A.M | 00/06/19 | DISPLAY |

TO SPECIFIC INDEPENDENT INSPECTION MANAGEMENT

TO COMPANY HOME PAGE

FIG.64

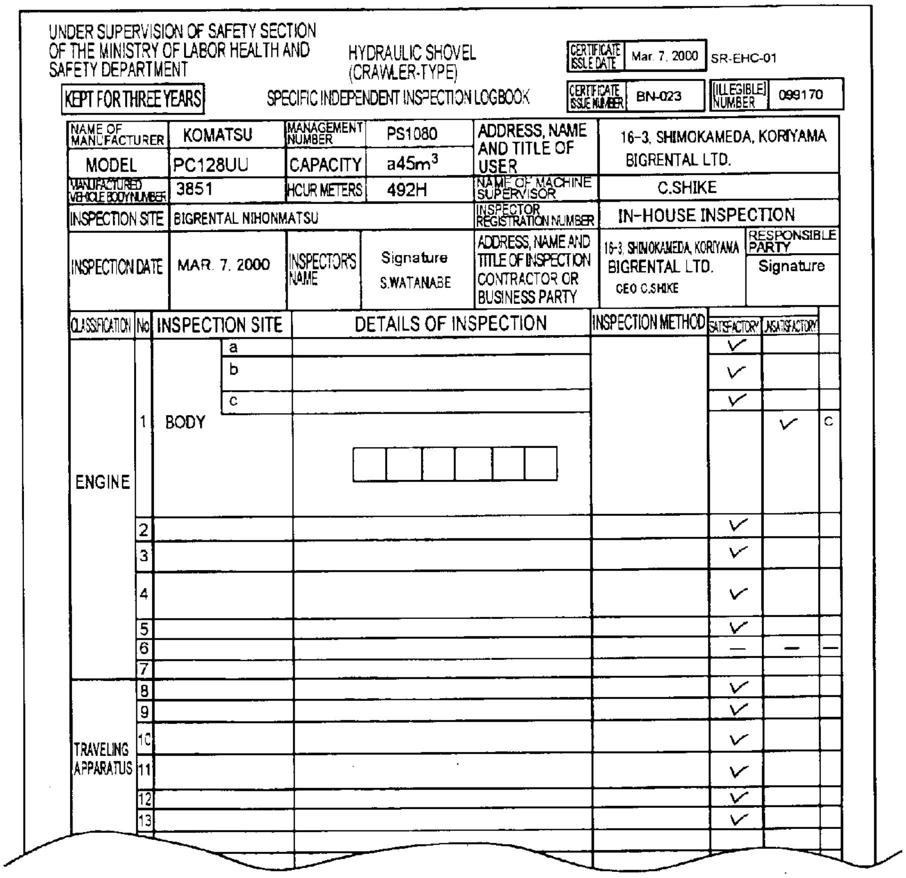

UNDER SUPERVISION OF SAFETY SECTION OF THE MINISTRY OF LABOR HEALTH AND SAFETY DEPARTMENT

HYDRAULIC SHOVEL (CRAWLER-TYPE)

| CERTIFICATE ISSUE DATE | Mar. 7, 2000 | SR-EHC-01 |
| --- | --- | --- |

KEPT FOR THREE YEARS

SPECIFIC INDEPENDENT INSPECTION LOGBOOK

| CERTIFICATE ISSUE NUMBER | BN-023 | ILLEGIBLE NUMBER | 099170 |
| --- | --- | --- | --- |

| | | | | | | |
| --- | --- | --- | --- | --- | --- | --- |
| NAME OF MANUFACTURER | KOMATSU | MANAGEMENT NUMBER | PS1080 | ADDRESS, NAME AND TITLE OF USER | 16-3, SHIMOKAMEDA, KORIYAMA BIGRENTAL LTD. | |
| MODEL | PC128UU | CAPACITY | a45m³ | | | |
| MANUFACTURED VEHICLE BODY NUMBER | 3851 | HOUR METERS | 492H | NAME OF MACHINE SUPERVISOR | C.SHIKE | |
| INSPECTION SITE | BIGRENTAL NIHONMATSU | | | INSPECTOR REGISTRATION NUMBER | IN-HOUSE INSPECTION | |
| INSPECTION DATE | MAR. 7, 2000 | INSPECTOR'S NAME | Signature S.WATANABE | ADDRESS, NAME AND TITLE OF INSPECTION CONTRACTOR OR BUSINESS PARTY | 16-3, SHIMOKAMEDA, KORIYAMA BIGRENTAL LTD. CEO C.SHIKE | RESPONSIBLE PARTY Signature |

| CLASSIFICATION | No | INSPECTION SITE | | DETAILS OF INSPECTION | INSPECTION METHOD | SATISFACTORY | UNSATISFACTORY | |
| --- | --- | --- | --- | --- | --- | --- | --- | --- |
| ENGINE | 1 | BODY | a | | | ✓ | | |
| | | | b | | | ✓ | | |
| | | | c | | | ✓ | | |
| | | | | | | | ✓ | c |
| | 2 | | | | | ✓ | | |
| | 3 | | | | | ✓ | | |
| | 4 | | | | | ✓ | | |
| | 5 | | | | | ✓ | | |
| | 6 | | | | | — | — | — |
| | 7 | | | | | | | |
| TRAVELING APPARATUS | 8 | | | | | ✓ | | |
| | 9 | | | | | ✓ | | |
| | 10 | | | | | ✓ | | |
| | 11 | | | | | ✓ | | |
| | 12 | | | | | ✓ | | |
| | 13 | | | | | ✓ | | |

FIG.68

MAINTENANCE HISTORY

FOR COMPANY INTERNAL USE ONLY

MACHINE TYPE PC75UU- MACHINE NUMBER 17253

| DATE | INSTRUCTION NUMBER | FEE | HR | COMMENT | MAINTENANCE SUMMARY |
|---|---|---|---|---|---|
| TOTAL FEE | | 290750 | | | |
| 99/01/09 | S0291050 | 19074 | 0 | PS0550 | WELD BUCKET HOOK |
| 99/00/19 | S0591200 | 6025 | 22 | PS0555／No.013 | CHANCE OPERATING PATTERN |
| 99/07/05 | S0897056 | 11060 | 320 | 04102,PS0555 | CAR WASH |
| 99/07/23 | S0897193 | 11937 | 351 | 04277,PS05 | CHECK ENGINE TROUBLE |
| 00/01/14 | S03A2423 | 33600 | 0 | KOMATSU FACTORY | WELD BUKET CRACK |
| 00/02/03 | S03A2028 | 34487 | 774 | No.PS0555· | SAFETY INSPECTION |
| 00/02/29 | R03A2325 | -174576 | 773 | KOMATSU FACTORY | CHANGE DOOR GLASS |
| 00/02/29 | R03A2335 | 174576 | 773 | KOMATSU FACTORY | CHANGE DOOR GLASS |
| 00/03/23 | R03A3260 | 174576 | 773 | KOMATSU FACTORY | CHANGE DOOR GLASS |

FIG.71

OIL NON-CHANGE MANAGEMENT

| MANAGEMENT NUMBER | MACHINE TYPE | MACHINE NUMBER | CLASSIFICATION | OIL CHANGE METER | OIL CHANGE DATE | NEXT METER READING | LATEST METER READING | METER CHECK DATE | SPECIFIC INDEPENDENT INSPECTION |
|---|---|---|---|---|---|---|---|---|---|
| B00037 | D21P | 80640 | New | 0 | | 300 | 167 | 00/06/07 5:52:01 P.M. | BD0037 |
| B00047 | D65P | 62688 | New | 0 | | 300 | 873 | 00/04/19 6:18:53 P.M. | BD0047 |
| B00050 | D21P | 80820 | New | 0 | | 300 | 486 | 00/06/09 3:20:01 P.M. | BD0050 |
| B00077 | D41P | 11192 | New | 0 | | 300 | 390 | 99/09/08 | BD0077 |
| B00078 | D31P | 48891 | New | 0 | | 300 | 350 | 00/06/08 10:12:25 A.M. | BD0078 |
| B00080 | D31P | 48912 | New | 0 | | 300 | 371 | 00/06/08 7:58:04 P.M. | BD0080 |
| B00082 | D31P | 48911 | New | 0 | | 300 | 195 | 00/06/03 | BD0082 |
| B00084 | D20P | 81157 | New | 0 | | 300 | 175 | 00/05/25 10:03:18 A.M. | BD0084 |
| B00085 | D31P | 48935 | New | 0 | | 300 | 312 | 00/06/06 4:54:22 P.M. | BD0085 |
| B00087 | D65P | 63082 | New | 0 | | 300 | 118 | 00/05/30 | BD0087 |

FIG.74

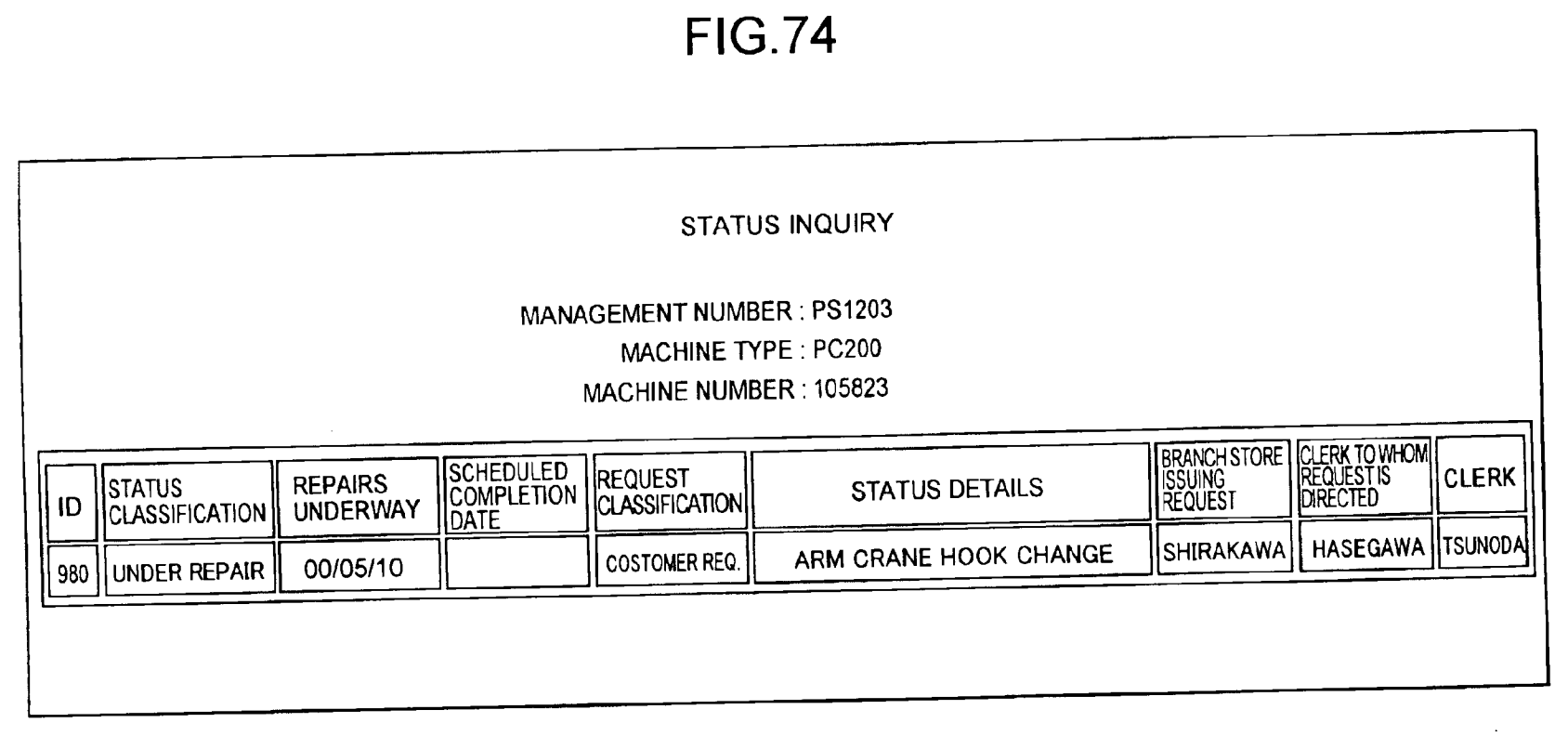

STATUS INQUIRY

MANAGEMENT NUMBER : PS1203
MACHINE TYPE : PC200
MACHINE NUMBER : 105823

| ID | STATUS CLASSIFICATION | REPAIRS UNDERWAY | SCHEDULED COMPLETION DATE | REQUEST CLASSIFICATION | STATUS DETAILS | BRANCH STORE ISSUING REQUEST | CLERK TO WHOM REQUEST IS DIRECTED | CLERK |
|---|---|---|---|---|---|---|---|---|
| 980 | UNDER REPAIR | 00/05/10 | | COSTOMER REQ. | ARM CRANE HOOK CHANGE | SHIRAKAWA | HASEGAWA | TSUNODA |

FIG. 79

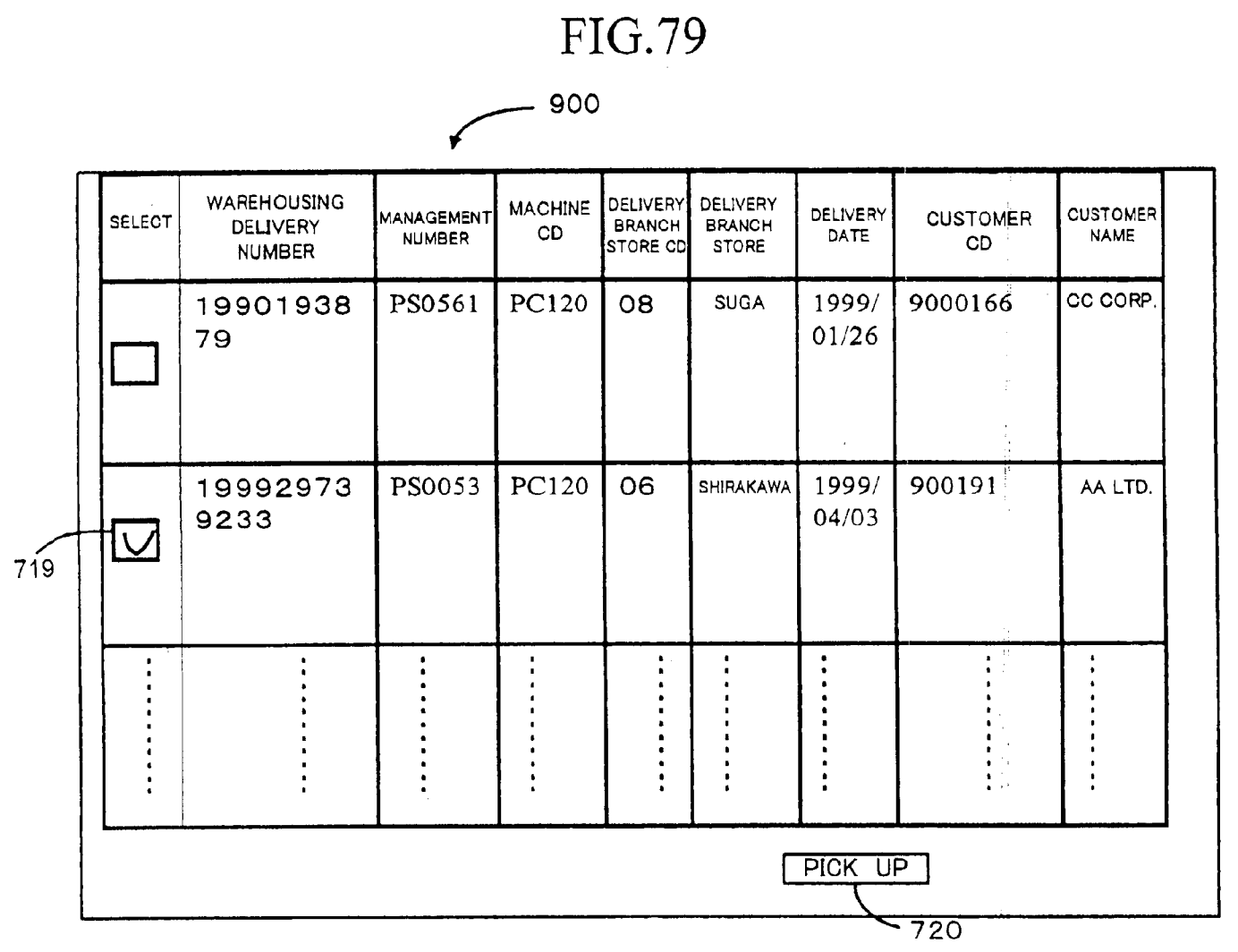

900

| SELECT | WAREHOUSING DELIVERY NUMBER | MANAGEMENT NUMBER | MACHINE CD | DELIVERY BRANCH STORE CD | DELIVERY BRANCH STORE | DELIVERY DATE | CUSTOMER CD | CUSTOMER NAME |
|---|---|---|---|---|---|---|---|---|
| ☐ | 19901938 79 | PS0561 | PC120 | 08 | SUGA | 1999/ 01/26 | 9000166 | CC CORP. |
| ☑ | 19992973 9233 | PS0053 | PC120 | 06 | SHIRAKAWA | 1999/ 04/03 | 900191 | AA LTD. |
| ........... | ........... | ........... | ........... | ........... | ........... | ........... | ........... | ........... |

PICK UP

720

719

SYSTEM AND METHOD FOR MONITORING REMOTELY LOCATED OBJECTS

BACKGROUND OF THE INVENTION

1. Field of the Invention

The present invention relates to a technology for monitoring remotely located objects, and relates, for example, in a rentals business that provides machine and vehicle rentals, to a technology which is adapted as a support apparatus or similar for establishing a maintenance scheme for the machines and vehicles being rented.

2. Description of the Related Art

The description that follows is based on the example of a construction vehicle rental company.

Such a company normally employs a business model in which a plurality of branch stores are situated in different locations and a plurality of construction vehicles are owned and utilized individually by each branch store. Consequently, the maintenance of the construction vehicles is carried out by each branch store, and each branch store performs maintenance on construction vehicles in its possession by means of the following method, for example.

In other words, as occasion calls, the clerk at each branch store contacts renting customers with regard to construction vehicles being rented, asks where and how the rented construction vehicles are being used, and so forth, and thus infers the respective current position and operating status of the construction vehicles being rented. Then, based on the current positions and operating statuses thus inferred, a serviceman from each branch store determines maintenance schedules, and then goes to one or a plurality of sites to maintain the construction vehicles in accordance with these schedules.

However, efficient maintenance using this conventional method is difficult for the reasons provided below.

That is, investigations, by workers, of sites and the operating states of vehicles being rented is time-consuming and labor-intensive, and sites and operating states investigated in this manner are not necessarily accurate. This leads to inefficiencies in that maintenance schedules of low efficiency are established, sites to be visited are overlooked, visits are made to sites which are close to other branch stores by servicemen from branch stores that are especially far away from these sites, the times at which the maintenance is carried out are too early or too late, and so forth.

Problems of this kind are not limited to the rentals industry alone but rather may also exist in a variety of other business fields that deal with various objects in remote locations.

SUMMARY OF THE INVENTION

Accordingly, it is an object of the present invention to make it possible to precisely monitor remotely located objects.

The system according to an aspect of the present invention comprises: region designating means for designating a region; map displaying means for displaying a map including the designated region; position detecting means for automatically detecting the position(s) of one or a plurality of remotely located objects; object selecting means for selecting an object positioned in the designated region, on the basis of the detected position of the object; and object position displaying means for displaying a marker representing the selected object in the position of the selected object, on a displayed map.

In a preferred embodiment, the above system further comprises: detecting means for automatically detecting the state(s) of the above-mentioned one or plurality of objects; and object state displaying means for displaying the detected state of the selected object.

In a preferred embodiment, the above system further comprises means for displaying a marker that indicates at least one base, in the position of the base on the displayed map. Further, here, a "base" is, for example, an activity base in which a service, business or other activity is conducted in accordance with the intended use of the system, such as that of a branch store of a rental company in the rental system of the embodiment described hereinbelow.

In a preferred embodiment, the region designating means receives an area range request from a user with respect to a desired base and designates a region corresponding to the requested area range.

In a preferred embodiment, the system further comprises: means for displaying a list of selected objects.

In a preferred embodiment, the position detecting means detects the latest position substantially by executing an operation for detecting the position as required or periodically.

In a preferred embodiment, the state detecting means detects the latest state substantially by executing an operation for detecting the state as required or periodically. In another preferred embodiment, the object state displaying means displays the latest state of the object and a history of past states thereof. In yet another preferred embodiment, the object state displaying means is constituted to display the state of the selected object and a map indicating the position of the selected object.

In a preferred embodiment, the above-mentioned object is a rental good (article for rent) and the system may further comprise an object information database for storing object information related to objects; and means for reading object information for the selected object (a rental good being rented, for example) from this object information database and displaying this object information. This object information includes, for example, information (such as the customer's name, contact address, importance, for example) on a customer currently renting the object (that is, the customer to whom the object is being rented), information on the object warehousing or delivery point, information pertaining to the object (such as the specifications, model, management number, machine type, for example), object rental date, scheduled object return date, or information on the clerk dealing with the object. Object information may include, for example, all or part of a variety of information in a database possessed by a basic server 108 according to the embodiment described hereinbelow.

In a preferred embodiment, the system comprises: position detecting means for automatically detecting the position (s) of one or a plurality of remotely located objects; state detecting means for automatically detecting the state(s) of the one or plurality of objects (such as the cumulative operating time, details of any anomalies and breakdowns, the engine oil pressure, engine speed, work machine oil temperature, work machine oil pressure, radiator water temperature, work machine load, remaining fuel quantity, for example); selecting means for selecting an object to be output (an object which is to be displayed or transmitted to a separate system, for example), on the basis of the detected position and state thereof; and means for outputting a selected object.

The means which the system of the present invention comprises can be possessed by one computer or can be shared among a plurality of computer machines which are connected to a communication network.

BRIEF DESCRIPTION OF THE DRAWINGS

FIG. 17 shows a machine status inquiry screen used in stock inquiry processing;

FIG. 23 shows a newly acquired information screen used in the allocation processing (when automatic allocation regulations apply);

FIG. 33 shows a "Transportation schedule" screen used in the transportation scheduling processing;

FIG. 43 shows a "Delivery details" screen used in delivery processing;

FIG. 52 shows a "Warehousing input" screen used in warehousing processing;

FIG. 53 shows a "Warehousing details" screen used in warehousing processing;

FIG. 54 shows a "Warehousing details" screen used in warehousing processing;

FIG. 55 shows a "Warehousing details" screen used in warehousing processing;

FIG. 56 shows a "Warehousing details" screen used in warehousing processing;

FIG. 57 shows a "Warehousing input" screen used in warehousing processing;

FIG. 60 shows a "specific independent inspection management" screen used in the specific independent inspection processing;

FIG. 64 shows a logbook image display screen used in the specific independent inspection logbook output processing;

FIG. 68 shows a "Maintenance history" screen used in the maintenance history inquiry processing;

FIG. 71 shows an "Oil non-change management" screen used in the oil change processing;

FIG. 74 shows a "repairs status inquiry" screen used in the repairs status inquiry processing;

FIG. 79 shows an example of a vehicle list screen 900; and

DESCRIPTION OF THE PREFERRED EMBODIMENTS

Figure 1:
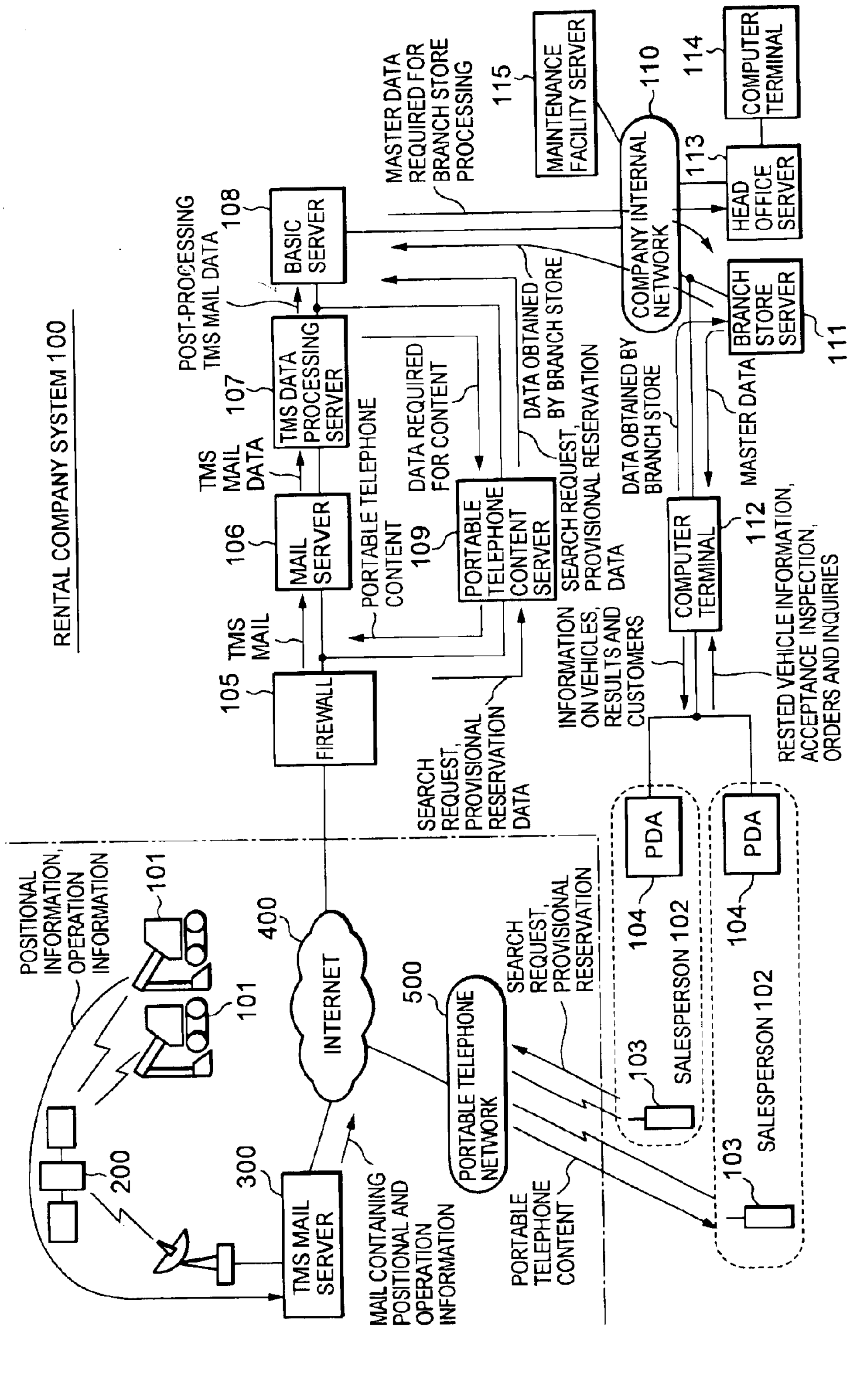
FIG. 1 is a block diagram according to an embodiment of the present invention.

First, by reference to FIGS. 1 to 74, a description will be provided of the rental system as a whole to which the monitoring system of an embodiment of the present invention is applied. Thereafter, through reference to FIGS. 75 to 80, a description will be provided for those parts of this embodiment that are directly related to the present invention.

FIG. 1 shows the overall constitution of the rental system to which the monitoring system of an embodiment of the present invention is applied.

Such a system comprises: a computer system 100 for performing information processing, which is in the rental company (referred to hereinafter as "rental company system"); a multiplicity of construction vehicles 101, 101, . . . which are rental goods, and a TMS (Telemanagement System) mail server 300 that remotely captures the respective positions of these construction vehicles 101, 101, . . . , operating states thereof, and the like.

The construction vehicles 101, 101, . . . and the TMS mail server 300 are in principle capable of communicating at any time and irrespective of where the construction vehicles 101, 101, . . . are located, via a wireless communication system (which may include a portable telephone network) that operates irrespective of location over an extremely wide range such as the satellite communication system 200, for example. The construction vehicles 101, 101, . . . each contain a GPS apparatus, and various sensors for capturing the states of vehicle parts, and are capable of reporting the current position captured by the GPS apparatus, and operation information captured by the various sensors (the operating time, details of any anomalies and breakdowns, the engine oil pressure, engine speed, work machine oil temperature, work machine oil pressure, radiator water temperature, work machine load, remaining fuel quantity, and the like) as required, to the TMS mail server 300 via the satellite communication system 200.

The TMS [mail] server 300 and the rental company system 100 are capable of communicating at any time via a communication network between computers such as the Internet 400, for example. The TMS mail server 300 collects the latest positional information, operation information, and so forth, on the construction vehicles 101, 101, . . . and relays such information in the form of electronic mail, for example, to the rental company system 100 as required or periodically.

The rental company system 100 comprises various computers 105, 112, which are installed in company buildings, and portable information processing terminals carried by salespeople 102, 102, . . . , for example portable telephones 103, 103, . . . and PDAs (Personal Digital Assistants) 104, 104, . . . It goes without saying that the system constitution illustrated is only an example, and that other constitutions can also be adopted. For example, each salesperson 102 carries two devices, in the form of the portable telephone 103 and the PDA 104, but this is because, at the time of submitting the present application, the portable telephone 103 has features that are lacking in terms of information processing and display functions, and the PDA 104 has features that are lacking in terms of communication functions. Accordingly, should a portable terminal that is sufficiently superior with respect to both these functions become available in the future, a single terminal of this kind would be adequate.

Behind the firewall 105 of the rental company system 100, the mail server 106 receives and stores electronic mail that describes the latest positional information and operation information on the construction vehicles 101, 101, . . . which is sent from the TMS mail server 300 (referred to as TMS mail hereinafter). A TMS data processing server 107 receives TMS mail stored in the mail server 106, extracts data representing the latest positional information and operation information on the construction vehicles 101, 101, . . . from this electronic mail (referred to as TMS data hereinafter), and then sends this TMS data to the basic server 108.

The basic server 108 comprises a database for storing all the data required by the rental company system 100. The details of the data stored in this database (referred to as master data hereinafter) will be described subsequently. Upon receiving the TMS data, the basic server 108 uses this data to update the master data related to the positional information and operation information on the construction vehicles 101, 101, . . . The basic server 108 is connected, via the company network, to branch office servers 111, 111, . . . installed in each branch store of a multiplicity of branch stores owned by the rental company, and master data required for the business tasks of each branch store is transmitted periodically or as required to the branch office servers 111, 111, . . . The basic server 108 is also connected via the company network to a head office server 113 installed in the head office of the rental company, and master data required for the business tasks of the head office is transmitted to the head office server 113 periodically or as required. The details of the business tasks of the branch stores and the head office will be described subsequently.

A portable telephone content server 109 is connected to the basic server 108. The portable telephone content server 109 can communicate, via the Internet 400, for example, with a Web browser of the portable telephones 103, 103, . . . carried by the salespeople 102, 102. As a result, various data can be transmitted as portable telephone content of a predetermined format to the portable telephones 103, 103, . . . , and predetermined data can be received from this web browser.

Types of data which can be supplied as portable telephone content to the portable telephones 103, 103, . . . include, for example, the rental availability status and reservation status of each construction vehicle, the rental records for each customer, the operating rate of each construction vehicle, the status of each rental agreement, the status of delivered vehicles, and so forth. The portable telephone content server 109 first receives a search request with respect to specific portable telephone content from the portable telephone 103 of each salesperson 102, then sends a search request for the latest master data required for the requested portable telephone content to the basic server 108. Thereafter, the portable telephone content server 109 receives search result data from the basic server 108, creates the requested portable telephone content on the basis of the latest data, and then transmits the portable telephone content to the portable telephone 103 of the salesperson 102 such that this content is displayed by the portable telephone 103.

Further, data received by the portable telephone content server 109 from the portable telephone 103 of each salesperson 102 includes rental provisional reservation data with respect to a specific construction vehicle. Upon receiving the provisional reservation data, the portable telephone content server 109 sends this data to the basic server 108.

In each branch store of the rental company, the branch store server 111 holds the latest master data downloaded from the basic server 108, and a branch store business application for performing branch store business tasks is installed in each of several computer terminals 112, 112, . . . connected to the branch store server 111. The branch store business application downloads required master data to the computer terminal 112 from the branch store server 111 and performs business task processing while accessing this data. The details of this business task processing will be described subsequently.

Furthermore, PDAs 104, 104, . . . carried by the salespeople 102, 102, . . . can be connected as required to respective computer terminals 112 in the branch stores. A PDA business application that supports the external business tasks of the salespeople 102 is installed in each PDA 104. When the PDA 104 is connected to the computer terminal 112, this PDA business application downloads predetermined types of data from the computer terminal 112 such as, for example, vehicle information, credit information, customer information, and uploads data inputted to the PDA 104 in the activities of the salesperson 102, such as, for example, rested vehicle information, acceptance inspection information, order and inquiry information, to the computer terminal 112. For example, the salespeople 102, 102, . . . connect the PDAs 104, 104, . . . to the respective computer terminals 112 upon starting work each day to thereby make a download from the computer terminals 112, which have the latest information, and connect the PDAs 104, 104, . . . to the respective computer terminals 112 upon finishing work each day to thereby upload data inputted in the business tasks of the day to the computer terminals 112.

Data that is to be mirrored by the master data of the basic server 108, which is data inputted to the computer terminals 112 (data inputted in the business task processing of the branch store business application, and data which is uploaded from the PDAs 104, 104, . . . ) is uploaded as required or periodically to the basic server 108 via the branch store server 111, and the master data in the basic server 108 is updated on the basis of this data.

In the head office of the company, a number of computer terminals 114 are connected to the head office server 113. A head office business application installed in the computer terminals 114 is used to perform business task processing at the head office. Of data that is inputted to the computer terminals 114 in the head office business task processing, the data which is to be mirrored by master data of the basic server 108 is uploaded to the basic server 108 via the head office server 113 as required or periodically, and the master data in the basic server 108 is updated on the basis of this data.

Furthermore, the rental company system 100 is connected to a server 115 of a maintenance facility outside the company that carries out comparatively large-scale maintenance such as specific independent inspections of construction vehicles, comparatively major repairs, and the like.

According to the rental system having the constitution described above, information on all the construction vehicles 101, 101, . . . which the rental company owns (for example, the current position, operation information, rental availability status and reservation status, the maintenance history, and so forth) is centrally managed by the basic server 108 in the rental company system 100, and this information is continuously updated by the latest information. Further, this information can be referenced via any branch store computer terminal 112, and via any PDA 104 or any portable telephone 103 of the salespeople 103, whereby business activities can be implemented on the basis of this information.

As a result, efficient use can be made of all of the construction vehicles 101, 101, . . . This is because, there being no obstacle between branch stores as is present in the conventional business model, all the salespeople are also able to conduct business for all the construction vehicles located at all of the branch stores, and it is possible to accept an order by selecting a vehicle which is compatible with the customer's request and which is advantageous also in terms of vehicle dispatch (for example, current position, operating state and rental status), from among all of the construction vehicles.

Further, according to the system of the present embodiment, the salespeople are able to respond quickly to customer needs. This is because, as detailed above, it is possible to select a vehicle which is compatible with the customer's request and which is advantageous also in terms of vehicle dispatch, from among all the vehicles, it is possible to check the current state of all the vehicles at any time and in any location by using a PDA or portable telephone, and it is possible to make a provisional reservation via a portable telephone should a suitable vehicle be found.

According to the system of the present embodiment, it is also possible to carry out appropriate maintenance on vehicles which are being rented. This is because, even if a vehicle is being rented, the current position and operating state thereof can be grasped through the medium of TMS data, meaning that the rental company independently judges whether maintenance is required and the materials and people required for the maintenance on the basis of the TMS data, and is therefore capable of sending appropriate staff to the operation site. This fact is highly advantageous since, where construction machines are concerned, work is frequently carried out in mountains in remote locations.

Furthermore, according to the system of the present embodiment, a uniform quality can be assured when putting the construction vehicles on the secondhand vehicle market, by controlling the quality of the construction vehicles. This is because it is possible to grasp the states of all the construction vehicles (for example, the current position, operation information, rental availability status and reservation status, maintenance history, and so forth), and, consequently, on the basis of such states, maintenance schedules can be put together such that all the vehicles appropriately receive maintenance, and rental schedules can be adjusted for an appropriate hour meter value (elapsed operating time) at the time when the construction vehicles are put on the secondhand vehicle market.

Details of the rental company system 100 will be described below.

Figure 2:
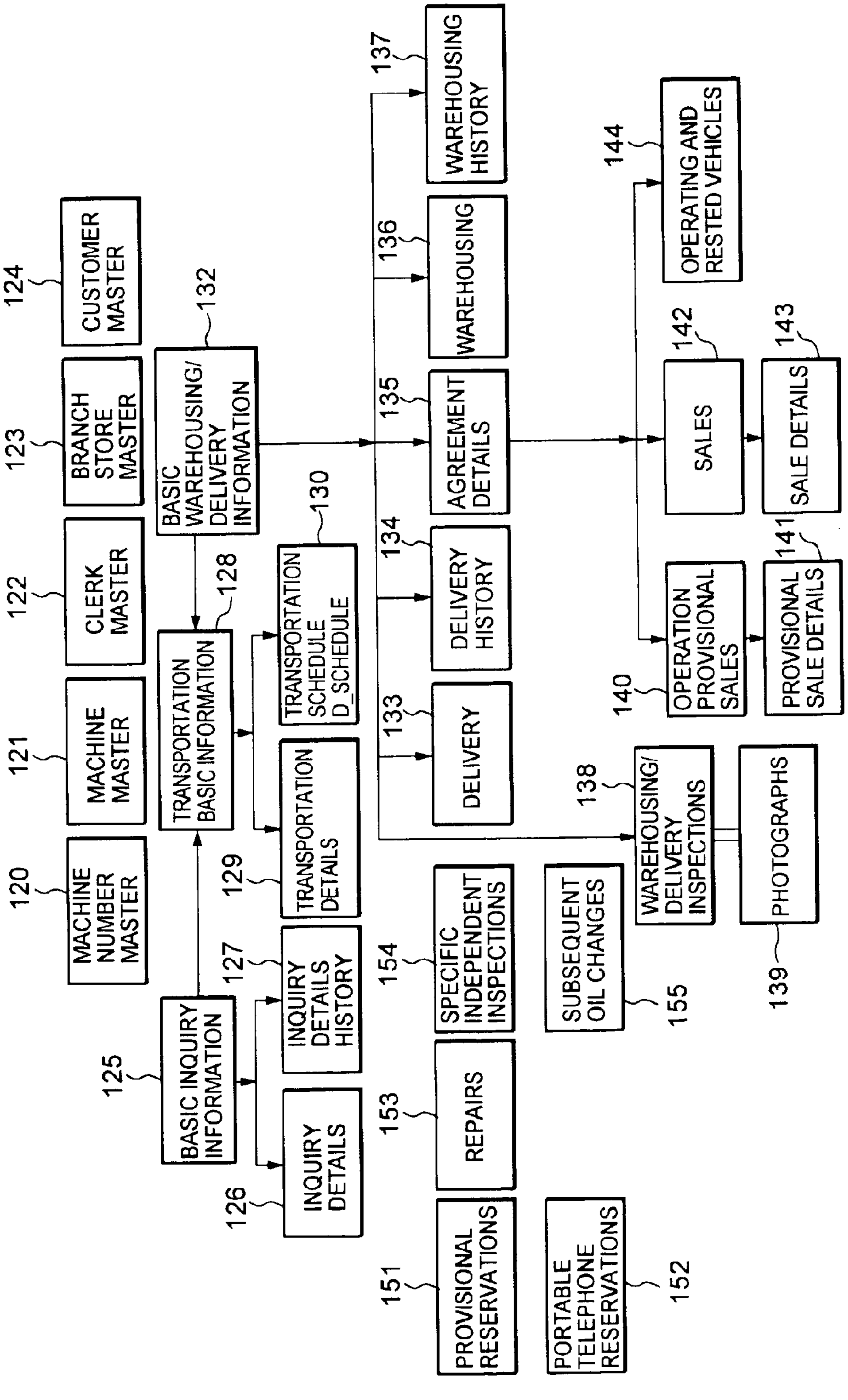
FIG. 2 is a block diagram showing the contents of a database possessed by the basic server 108 of the rental company system 100.

FIG. 2 illustrates the main contents of the database possessed by the basic server 108 of the rental company system 100. In FIG. 2, the arrows between the tables signify that, for data items shared between tables, data in a table on the base side of an arrow is mirrored by the table at the tip of the arrow. Also, the presence of two lines between tables signifies that data is linked between tables.

As shown in FIG. 2, this database comprises: a machine number master table 120 for recording information on each construction vehicle that is a rental good; a machine master table 121 for recording information on each type of construction vehicle; a clerk master table 122 for recording information on an employee such as a salesperson; a branch store master table 123 for recording information on each branch store and the head office; and a customer master table 124 for recording information on each customer.

This database further comprises: an basic inquiry information table 125 for recording basic information that relates to an "inquiry" (an acquisition request made by a branch store or salesperson with respect to a rental inquiry or order from a customer); an inquiry details table 126 for recording detailed information on an inquiry; and a details history table 127 for storing the contents of the inquiry details table 125 in relation to past inquiries which have been completed.

The database further comprises: a transportation basic information table 128 for recording basic information relating to the operations for transferring construction vehicles between locations; a transportation details table 129 for recording detailed information on the transfer operations; and a transportation schedule table 130 for recording information relating to schedules for such transfer operations.

The database further comprises: a basic warehousing/delivery information table 132 for recording basic information relating to a procedure for removing a construction vehicle from a warehouse (delivery) for delivery to a customer at the beginning of the rental period, and to a procedure for receiving the construction vehicle from the customer and putting the vehicle in the warehouse (warehousing) at the end of the rental period; a delivery table 133 for recording detailed information on the delivery procedure; a delivery history table 134 for storing the contents of the delivery table 133 in relation to the previous completed rental agreement; a warehousing table 136 for recording detailed information on the warehousing procedure; a warehousing history table 137 for storing the contents of the warehousing table 136 in relation to the previous completed rental agreement; and a warehousing/delivery inspection table 138 for recording information in relation to inspections of the construction vehicles performed upon warehousing/delivery. The warehousing/delivery inspection table 138 is linked with a photobase 139 for storing data of photographs of the construction vehicles taken using a digital camera at the time of the warehousing/delivery inspection.

The database further comprises: an agreement details table 135 for recording detailed information on rental agreements; a provisional sale table 140 for recording information on provisional sales; a provisional sale details table 141 for recording detailed information on provisional sales; a sale table 142 for recording information on sales; a sale details table 143 for recording detailed information on sales; and an operating/rested vehicle table 144 for recording information related to the operation and resting of the construction vehicles.

The database further comprises: a provisional reservation table 151 for recording information related to provisional reservations for rental of construction vehicles; a portable telephone reservation table 152 for recording information which is related to rental reservations made by salespeople using a portable telephone; a repairs table 153 for recording information related to repairs of construction vehicles; a specific independent inspection table 154 for recording information related to specific independent inspections of construction vehicles; and a subsequent oil change table 155 for recording information related to subsequent oil changes for the construction vehicles.

Of the tables 120 to 155 for recording the master data, only those tables which are directly linked to the description of business task processing provided hereinafter will be selected and the data items recorded in such tables are indicated below.

(1) Machine Number Master Table 120

This table has the following items and the like recorded therein for each of the construction vehicles 101, 101, . . . for rent: a specific "management number"; the "branch store code" and "branch store name" of the branch store owning the vehicle in question; the "machine type", specific "machine number", "specifications", "model", "purchase date", "cost", "hour meters", "date for hour meter update"; "search keyword", "date for carrying out independent inspection"; "time limit for carrying out independent inspection"; "provisional reservation classification" indicating the presence or absence of a provisional reservation; "repairs classification" indicating whether the vehicle is operating normally or undergoing repair; "warehousing inspection classification" indicating that a warehousing inspection has not yet been performed, has been performed or is pending; "date for warehousing inspection"; "reservation restriction flag" indicating the presence or absence of a reservation restriction; and "transfer restriction flag" indicating the presence or absence of a transfer restriction.

(2) Machine Master Table 121

This table has the following items and the like recorded therein for each machine type of the construction vehicles for rent: "machine code", "machine name", and "machine abbreviation" indicating the machine type; and "reservation restriction flag" indicating the presence or absence of a reservation restriction.

(3) Basic Inquiry Information Table 125

This table has the following items and the like recorded therein for each inquiry (rental inquiry or order request): a specific "inquiry number"; the "acceptance date"; the "customer code" and "customer name" of the customer; the "branch store code" and "branch store name" of the branch store that made the inquiry along with the "clerk code" and "clerk's name" of the salesperson; "delivery point code" and "delivery point name" indicating the branch store that delivers the vehicle for rent (delivery point); "inquiry flag" indicating whether or not linking of the inquiry with an order is definite; customer "desired delivery date" and "desired delivery time"; "desired delivery classification" indicating that the desired delivery date and time are unchangeable or can be adjusted; customer "scheduled return date"; "scheduled return classification" indicating that the scheduled return date is unchangeable or can be adjusted; "form of agreement" indicating whether the agreement is a daily, weekly or monthly agreement; "number of days of agreement; and the "order estimated fee" and "order estimated unit price" which indicate the estimated fee of the rental fee and the estimated unit price respectively.

(4) Inquiry Details Table 126

This table has the following items and the like recorded therein for each inquiry: the "inquiry number", "acceptance date", "clerk code" and "clerk's name", copied from the basic inquiry information table 124; "management number", "machine type", and "machine number" of vehicles for rent; information indicating "special specifications" in cases where special specifications are requested; information indicating various specifications such as the "operation type", "shoe", "tooth edge, "tooth"; the "substitution feasibility" indicating the presence or absence of a substitute machine type; the "substitute machine type" in a case where there is a substitute machine type; and "reservation classification" indicating that this inquiry is still at the inquiry stage, has been nullified, has been sent back, that a reservation has been made, or that delivery has been carried out.

(5) Transportation Basic Information Table 128

This table has the following items and the like recorded therein for transportation of the construction vehicles between branch stores: a specific "transportation instruction number"; the "instruction branch store code" and "instruction branch store name", and the "instruction clerk code" and "name of clerk issuing instruction", which indicate the branch store that issued the transportation instruction and the clerk at this branch store respectively; and, in cases where this transportation corresponds to a specific inquiry, the "inquiry number" of this inquiry, the "code of the branch store from which the request originated" and the "name of the branch store from which the request originated", and the "code of the clerk from whom the request originated" and the name of the clerk from whom the request originated", which indicate the branch store and the clerk respectively that made the inquiry; and also the "customer code" and "customer name" of this inquiry.

(6) Transportation Details Table 129

This table has the following items and the like recorded therein for requests for the transportation of the construction vehicles between branch stores: the "transportation instruction number", which is copied from the transportation basic information table 128; the "warehousing/delivery number", which is copied from the basic warehousing/delivery information table 132; "transportation confirmation flag" indicating that the transportation has been performed or has not yet been performed; in cases where there is a corresponding inquiry, the "inquiry number", "management number", "machine type", and "machine number" of the corresponding inquiry, which are copied from the inquiry details table 125; the "previous stock point code" and "previous stock point name" of the construction vehicle being transported; the "departure point code" indicating the branch store from which the construction vehicle departs; "arrival point code" indicating the branch store at which the construction vehicle arrives; the "departure point", "departure time", "arrival point", "arrival time", "scheduled transportation time", "carrier name", "driver", "transportation date", and the "schedule shift flag" that indicates whether there is any shift in the system transportation scheduling.

(7) Transportation Schedule Table 130

This table has the following items and the like recorded therein for the transportation of the construction vehicles between branch stores: the "transportation instruction number", which is copied from the transportation basic information table 128; the "warehousing/delivery number", which is copied from the basic warehousing/delivery information table 132; "transportation confirmation flag" indicating that the transportation has been performed or has not yet been performed; in cases where there is a corresponding inquiry, the "inquiry number", "management number", "machine type", and "machine number" of the corresponding inquiry, which are copied from the inquiry details table 125; the "previous stock point code" and "previous stock point name" of the construction vehicle being transported; the "departure point code" indicating the branch store from which the construction vehicle departs; "arrival point code" indicating the branch store at which the construction vehicle arrives; the "departure point", "departure time", "arrival point", "arrival time", "scheduled transportation time", "carrier name", "driver", "transportation date", and the "schedule shift flag" that indicates whether there is any shift in the system transportation scheduling.

(8) Basic Warehousing/Delivery Information Table 132

This table has the following items and the like recorded therein with respect to warehousing/delivery of the construction vehicles of the respective rental agreements generated by each inquiry: "warehousing/delivery number" for which the inquiry number is copied from the basic inquiry information table 124; the "customer code" and "customer name", the "branch store code" and "branch store name", the "clerk code" and "clerk's name", the "form of agreement" and "number of days of the agreement"; the "order estimated fee" and "order estimated unit price", for which corresponding items in the basic inquiry information table 124 are copied; and also the "scheduled delivery date" and "scheduled return date", which are copied from the basic inquiry information table.

(9) Delivery Table 133

This table has the following items and the like recorded therein with respect to delivery of the construction vehicles: the "warehousing/delivery number", which is copied from the basic warehousing/delivery information table 132; the "management number" of the delivered construction vehicle and attachments; the "acceptance date" indicating the date on which the delivery is inputted; the "delivery point code" and "delivery point name" indicating the branch store performing the delivery; the "delivery branch store code" and "delivery branch store name", and the "delivery clerk code" and "delivery clerk name", which indicate the branch store that prints the delivery slip and the clerk at this branch store respectively; the "machine type" and "machine number" of the construction vehicle which is delivered; the "delivery date" indicating the date of delivery; the "scheduled return date", which is copied from the basic warehousing/delivery information table 132; the "site name", which indicates the site for the rental; "hour meters upon delivery", which indicates the hour meter value at the time of delivery; information indicating various specifications upon delivery such as the "operation type", the "shoe", "tooth edge", "tooth"; and the "scheduled warehousing date classification", which indicates whether the scheduled warehousing date is pending or has been confirmed.

(10) Warehousing Table 136

This table has the following items and the like recorded therein with respect to warehousing of the construction vehicles: the "warehousing/delivery number", which is copied from the basic warehousing/delivery information table 132; the "management number" of the delivered construction vehicle and attachments; the "acceptance date" indicating the date on which the warehousing is inputted; the "warehousing point code" and "warehousing point name" indicating the branch store performing the warehousing; the "warehousing branch store code" and "warehousing branch store name", and the "warehousing clerk code" and "warehousing clerk name", which indicate the branch store that prints the warehousing slip and the clerk at this branch store respectively; the "machine type" and "machine number" of the construction vehicle which is delivered; the "warehousing date" indicating the date of warehousing; as well as the "hour meters at the time of delivery", copied from the delivery table 133 and information for varying specifications such as the "operation type", the "shoe", "tooth edge", and "tooth".

(11) Warehousing/Delivery Inspection Table 138

This table has the following items and the like recorded therein with respect to the inspection at the time of delivery and the inspection at the time of warehousing of the construction vehicles: "warehousing/delivery number" copied from the basic warehousing/delivery information table 132; the warehousing/delivery classification indicating whether or not an inspection at the time of delivery and an inspection at the time of warehousing are performed; "item ID" of various inspection items; "result" indicating a favorable or unfavorable inspection result with respect to the various inspection items; "installation" indicating, with respect to the various inspection items, whether or not a part has been changed, the vehicle has been repaired, cleaned, and supplied with oil and water, and whether any anomalies exist; "photograph pointers" for indicating data of photographs of the construction vehicle in question which were taken at the time of an inspection.

(12) Photobase 139

This table has data of photographs taken in the inspections at the time of delivery and warehousing recorded therein. The photograph data is linked by the "photograph pointers" described earlier to corresponding inspection data in the warehousing/delivery inspection table 138.

(13) Provisional Reservation Table 151

This table has the following items and the like recorded therein with respect to the provisional reservation of each rental: the "management number" of vehicles provisionally reserved; "acceptance date" indicating the acceptance date of the provisional reservation; the "customer code" and "customer" for the customer making the provisional reservation; and the "branch store code" and "branch store name", and the "clerk code" and "clerk's name" of the branch store handling the provisional reservation and the salesperson respectively.

(14) Portable Telephone Reservation Table 152

This table has the following items and the like recorded therein with respect to each reservation made by portable telephone: the "management number" of the vehicle reserved; the "acceptance date" indicating the acceptance date of the reservation; and the "clerk code" of the salesperson making the reservation.

(15) Repairs Table 153

This table has the following items and the like recorded therein with respect to repairs on the construction vehicles: the "management number" of the construction vehicle; the "repairs report number", the "date on which the repairs were begun", the "scheduled completion date", and the "estimate status", "classification of insurance procedure", "status details", "photograph classification", "branch store issuing request", "clerk to whom request is directed", for such repairs; and the "customer code" and "customer name" of the customer that initiated the repairs.

(16) Specific Independent Inspection Table 154

This table has the following items and the like recorded therein with respect to specific independent inspections on the construction vehicles: the "management number" of the construction vehicle, the "logbook inputting date", "date of previous inspection", "hour meters at the time of the specific independent inspection", "code of the branch store undertaking specific independent inspection", "engine model", "engine number", "certificate number", "certifying branch store code", "certificate date", "logbook image data".

(17) Subsequent Oil Change Table 155

This table has the following items and the like recorded therein with respect to the subsequent oil change for the construction vehicles: the "management number" of the construction vehicle, the "machine code", "machine type", "machine number", "hour meters at the time of the previous oil change", "previous oil change date", "scheduled hour meters for subsequent oil change", "current hour meters", "date for updating current hour meters", "owner branch office code", "owner branch office name", "clerk code", and "clerk's name".

A description follows of the flow of business task processing which is performed by the rental company system 100 using the database described above.

Figure 3:
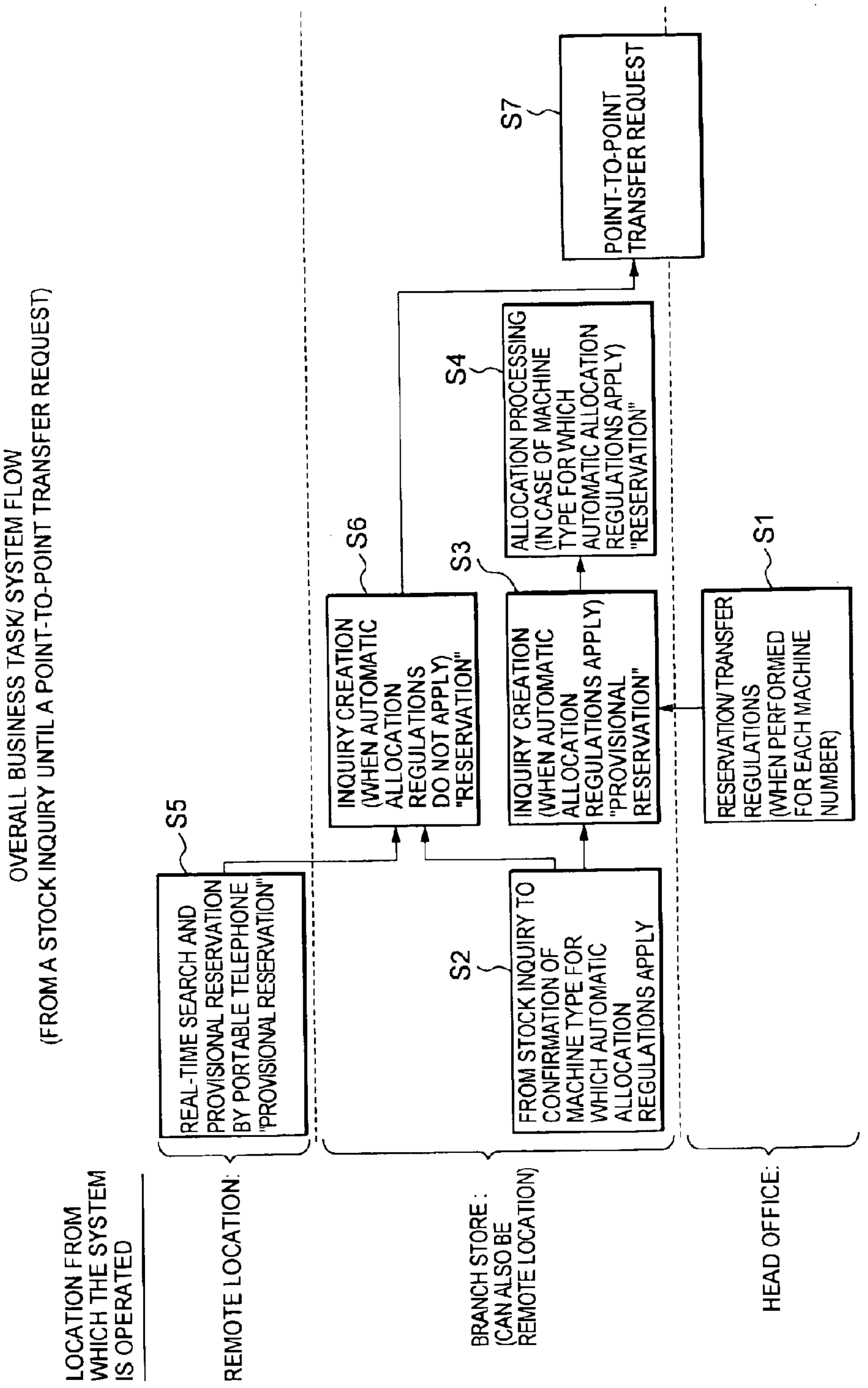
FIG. 3 is a flowchart showing the overall flow of business task processing from the time of a stock inquiry for a construction vehicle up until a transfer request, in business task processing which is performed by the system.
Figure 4:
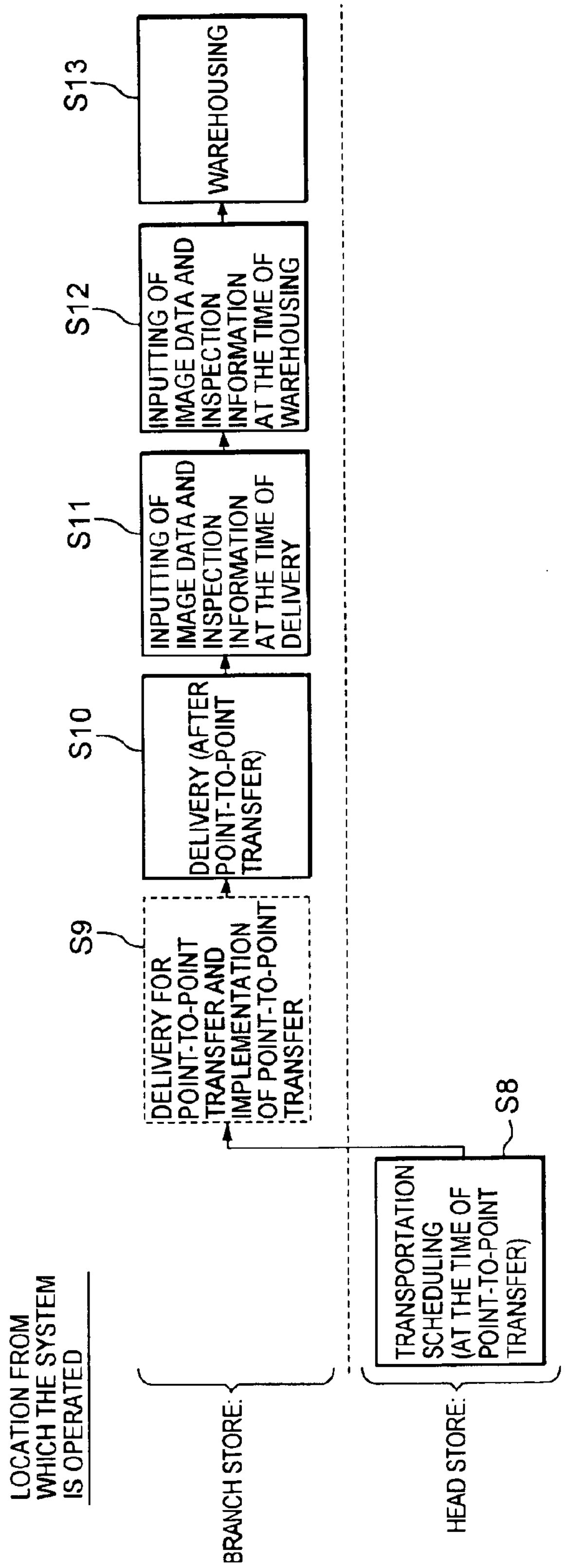
FIG. 4 is a flowchart following on from the process flow of FIG. 3 and shows the overall flow of business task processing from the time of construction vehicle transportation scheduling until warehousing thereof.
Figure 5:
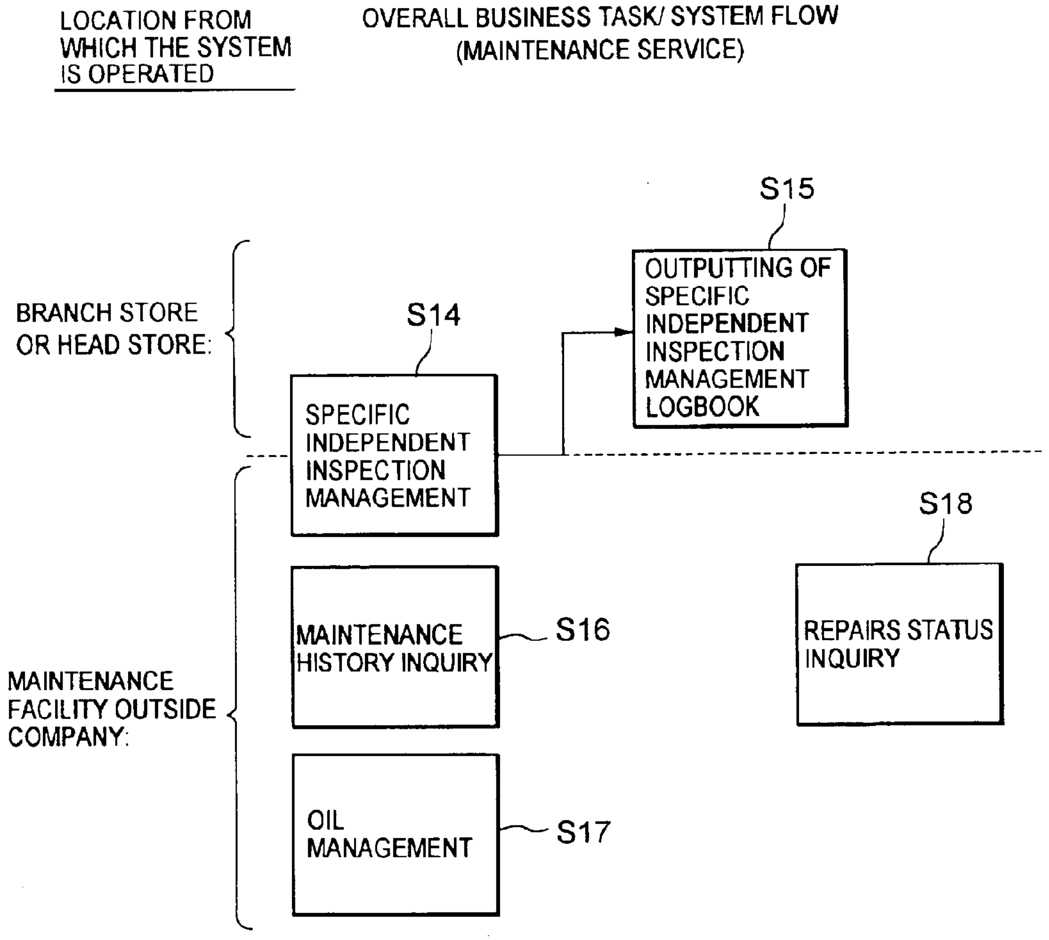
FIG. 5 is a flowchart showing the overall flow of business task processing related to the maintenance of the construction vehicles.

FIG. 3 shows the overall flow of business task processing from the time of a stock inquiry for a construction vehicle up until a transfer request, in business task processing which is performed by the system. FIG. 4 follows on from the process flow of FIG. 3 and shows the overall flow of business task processing from the time of transportation scheduling for a construction vehicle until warehousing thereof. FIG. 5 shows the overall flow of business task processing related to the maintenance of the construction vehicles.

As shown in FIG. 3, reservation/transfer regulations processing (step S1) can be performed as required at the head office. In this processing S1, it is possible, by designating optional construction vehicles, to impose a reservation regulation or transfer regulation for the construction vehicles, or, alternatively, cancel regulations for optional construction vehicles for which the reservation regulation or transfer regulation already applies. Here, the "reservation regulation" is a measure to prohibit the automatic inputting of a reservation for these vehicles in accordance with a request such as that via the portable telephone of a salesperson (that is, such reservation is not possible unless the reservation is not to be inputted manually following a judgement of reservation feasibility by the branch store operator). Further, the "transfer regulation" is a measure such that a determination to transfer the construction vehicles between branch stores (point-to-point transfer) cannot be made automatically. This reservation regulation and transfer regulation are referred to generically as "automatic allocation regulations".

In short, "automatic allocation regulations" are measures to regulate the automatic allocation by the system of vehicles for a given rental order (that is, such [automatic] allocation is not possible unless allocation is not to be made manually after a branch store operator judges the feasibility of allocation. These "automatic allocation regulations" can be imposed on individual vehicles such that the operating time and maintenance schedule for each vehicle can be controlled intentionally, and, in view of this, it is possible to ensure that when each vehicle is put on the secondhand vehicle market at a predetermined time, the vehicle hour meters and quality are at a uniform level.

As shown in FIG. 3, stock inquiry processing (S2) can be carried out at each branch store as required such as when an inquiry is received from a customer. This processing S2 makes it possible to confirm various vehicle states of any given types such as whether the vehicle is in stock, has been reserved, is undergoing repairs, or other availability states, the delivery point, the specifications, and whether automatic allocation regulations apply.

Furthermore, a salesperson in an outside location is able to perform real-time search and provisional reservation by portable telephone processing (S5), as required such as when an inquiry is received from a customer, in an outside location. In this processing S5, by connecting via the portable telephone to the portable telephone content server of the rental company system, it is possible to search for and confirm a vehicle currently in stock of a given machine type (only vehicles for which automatic allocation regulations do not apply), and on the basis of the result, to issue a provisional reservation for a specific vehicle.

Inquiry creation processing (S3, S6) can be performed in each branch store such as when an inquiry or order has been received from a customer. As a result of performing the above-described stock inquiry (S2), inquiry creation processing (S3) which is for a machine type having automatic allocation regulations is normally undertaken after confirming vehicles for which automatic allocation regulations apply. As a result of making the above-described stock inquiry (S2), inquiry creation processing (S6) which is for a machine type without automatic allocation regulations is undertaken for a vehicle for which automatic allocation regulations do not apply. Further, also for a vehicle (without automatic allocation regulations) for which a provisional reservation has been made in the above-described real-time search and provisional reservation by portable telephone processing (S5), the inquiry creation processing (S6) for a machine type without automatic allocation regulations is undertaken.

In each branch store, allocation processing (S4) is then performed for vehicles for which the inquiry creation processing (S3) for a machine type having automatic allocation regulations has been performed. Reservations for the vehicles for which automatic allocation regulations apply are confirmed by this allocation processing (S4). On the other hand, for vehicles for which automatic allocation regulations do not apply, reservations are confirmed at the stage of performing the inquiry creation processing (S6) for a machine type without automatic allocation regulations.

At the branch stores and at head office, processing (S7) of a request for a point-to-point transfer is performed for vehicles whose reservation has been confirmed. This processing S7 determines the overall details such as the transportation means, the transportation date range, and so forth, with regard to the point-to-point transfer of each vehicle (transportation from the current warehouse until delivery to the customer).

Thereafter, as shown in FIG. 4, at the head office, transportation scheduling processing (S8) is performed for vehicles for which point-to-point transfer request processing (S7) is complete. This processing S8 determines a unit transportation schedule for each vehicle.

In the branch stores, in accordance with a determined transportation schedule, the actual delivery of the vehicle, the delivery inspection, and the point-to-point transfer are carried out (S9), and, accordingly, delivery processing (S10), and processing (S11) to input image data and inspection information at the time of delivery are performed.

In the branch stores, with respect to vehicles which have been returned from customers at the end of the rental period, a warehousing inspection is performed as well as processing (S12) to input image data and inspection information at the time of warehousing, and warehousing processing (S13).

Also, as shown in FIG. 5, the branch stores or head office of the rental company, as well as the maintenance facility outside the company, perform processing (S14) for construction vehicle specific independent inspection management, periodically or as required. This processing S14 specifies construction vehicles that are to undergo a specific independent inspection and makes specific independent inspection management logbooks following the inputting of the results of each specific independent inspection performed on these vehicles. Thereafter, branch stores perform processing (S15) to output specific independent inspection management logbooks and maintain specific independent inspection management logbooks, which are outputted (printed out).

In addition, the maintenance facility outside the company performs, periodically or as required: vehicle maintenance history inquiry processing (S16), oil management processing (S17), repairs status inquiry (S18), and the like, performs management so that the maintenance, oil changes, repairs, and so forth, of each vehicle are carried out properly.

The specific flow of the respective processing shown in FIGS. 3 to 5 will be described hereinbelow using the flowchart of FIG. 7 and subsequent flowcharts, and the drawings of the user interface screens.

Figure 6:
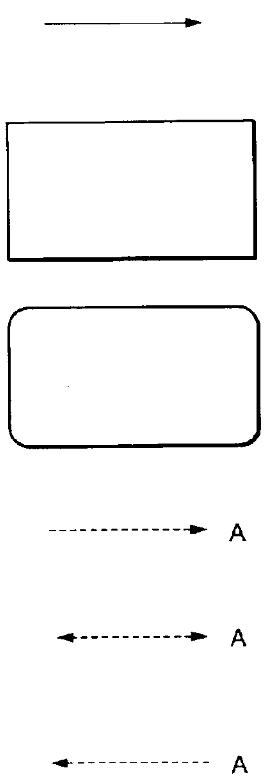
FIG. 6 shows explanatory notes for the flowchart of FIG. 7 and subsequent flowcharts.
Figure 7:
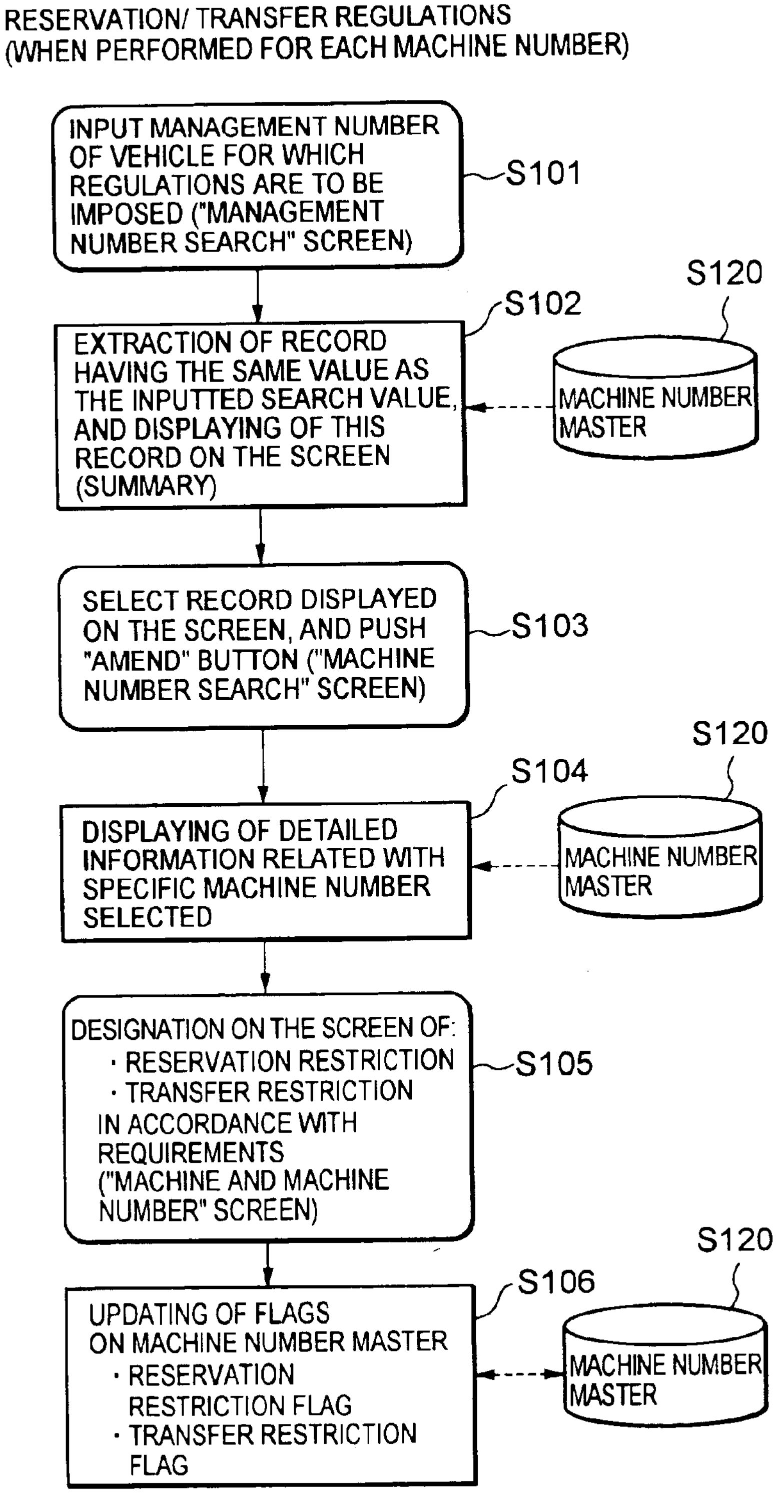
FIG. 7 is a flowchart showing the flow of the "reservation/transfer regulations" processing of step S1 in FIG. 3 (when performed for every vehicle).

FIG. 6 shows explanatory notes for the flowchart of FIG. 7 and subsequent flowcharts. As shown in this figure, in the flowchart of FIG. 7 and subsequent flowcharts, the bold line arrows indicate the direction in which the process steps progress. Blocks with sharp corners indicate process steps performed by the system; blocks with round corners indicate processing performed by people; one-sided dotted line arrows facing table "A" signify the generation of a new record in table "A"; double-sided dotted line arrows facing table "A" signify the updating of a specific record of table "A"; and one-sided dotted line arrows protruding from table "A" signify the reading/referencing of a record in table "A".

FIG. 7 shows the flow of "reservation/transfer regulations" processing of step S1 in FIG. 3. FIGS. 8 to 14 show user interface screens used in the processing.

Figure 8:
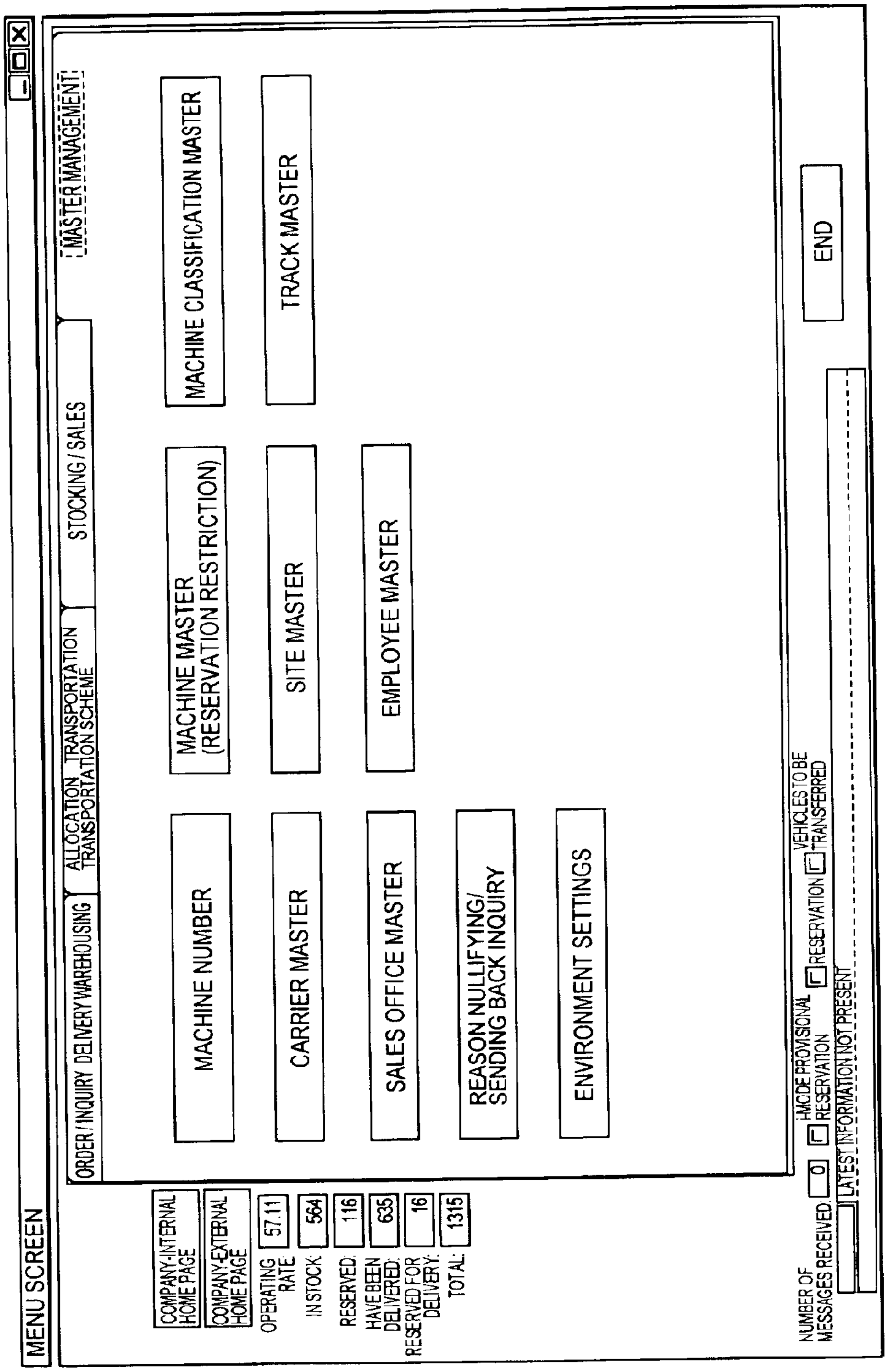
FIG. 8 shows a menu screen used in the reservation/transfer regulations" processing.
Figure 9:
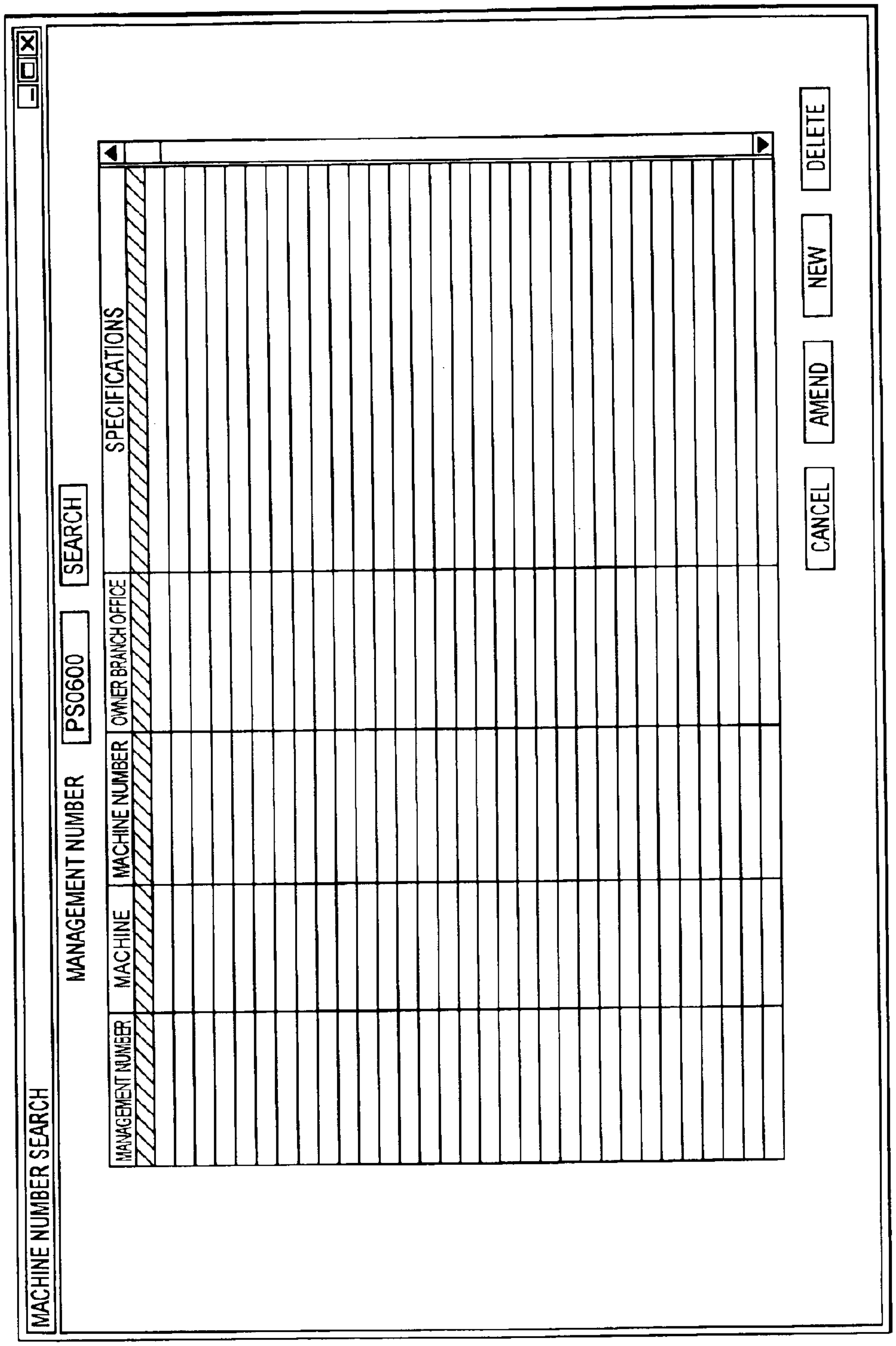
FIG. 9 shows a machine number search screen used in the reservation/transfer regulations processing for each vehicle.
Figure 10:
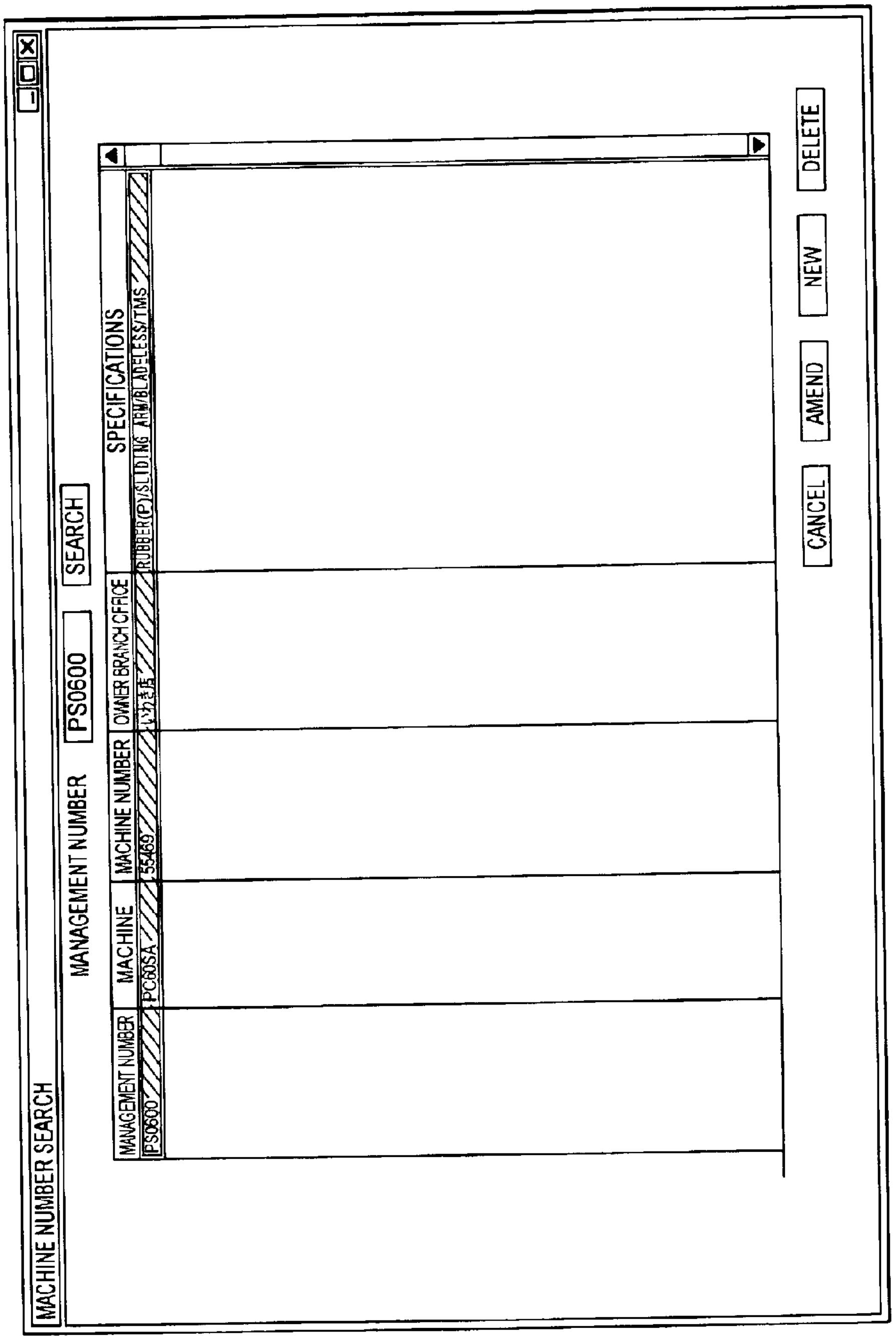
FIG. 10 shows a machine number search screen (search result) used in the reservation/transfer regulations processing for each vehicle.

In the menu screen shown in FIG. 8 which is displayed by the computer terminals at the head office, when the operator uses the mouse to click sequentially on "master management" and "machine number", the system displays the machine number search screen shown in FIG. 9. Next, in step S101 in FIG. 7, the operator enters, in the machine number search screen of FIG. 9, the management number (for example, "PS0600") of the vehicle for which he or she wishes to impose regulations, and then clicks on "Search", whereupon, in step S102 in FIG. 7, the system retrieves the record of the vehicle whose management number is the same as the management number inputted, from the machine number master table 120 (refer to FIG. 2), and displays the contents of the record in the machine number search screen as shown in FIG. 10. Next, in step S103 in FIG. 7, when the operator selects a record displayed in the screen of FIG. 10 and clicks on "Amend", in step S104 in FIG. 7, the system reads out more detailed information on the vehicle of the selected record from the machine number master table 120, and displays this detailed information in the machine number screen as shown in FIG. 11.

Figure 11:
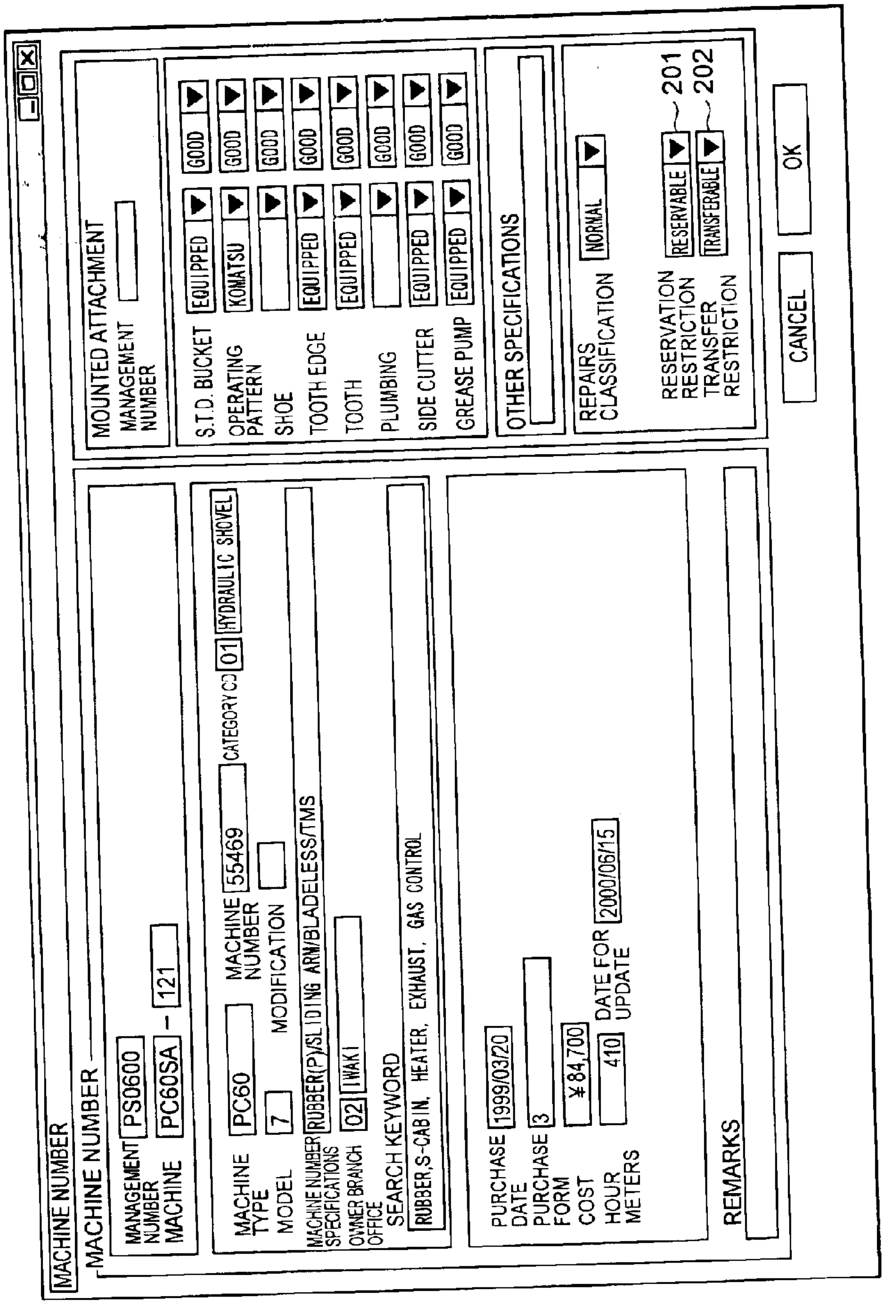
FIG. 11 shows a machine number screen used in the reservation/transfer regulations processing for each vehicle.
Figure 12:
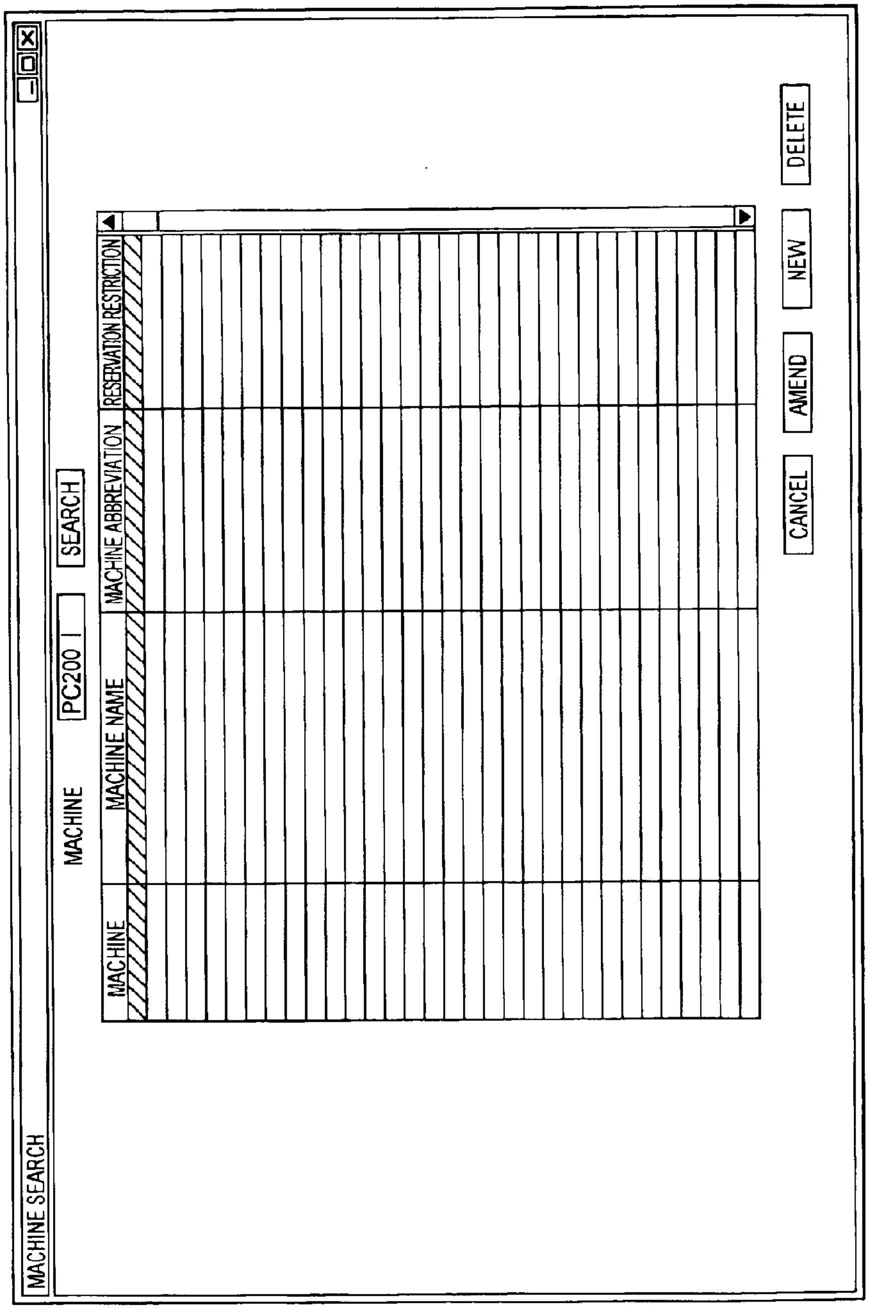
FIG. 12 shows a machine search screen used in the reservation/transfer regulations processing for each vehicle.

Next, in step S105 in FIG. 7, the operator operates the "reservation restriction" and/or "transfer restriction" select boxes 201, 202, which are on the bottom right of the screen in FIG. 11, selects the option to impose the reservation restriction and/or transfer restriction on the vehicle (or cancel restrictions thereof), and then clicks on "OK". Thereupon, in step S106 in FIG. 7, the system updates the vehicle reservation restriction flag and/or transfer restriction flag on the machine number master table 120.

The above procedure involves imposing the reservation regulation and/or transfer regulation for each vehicle by specifying a management number but the reservation regulation can also be imposed for each machine type.

Figure 13:
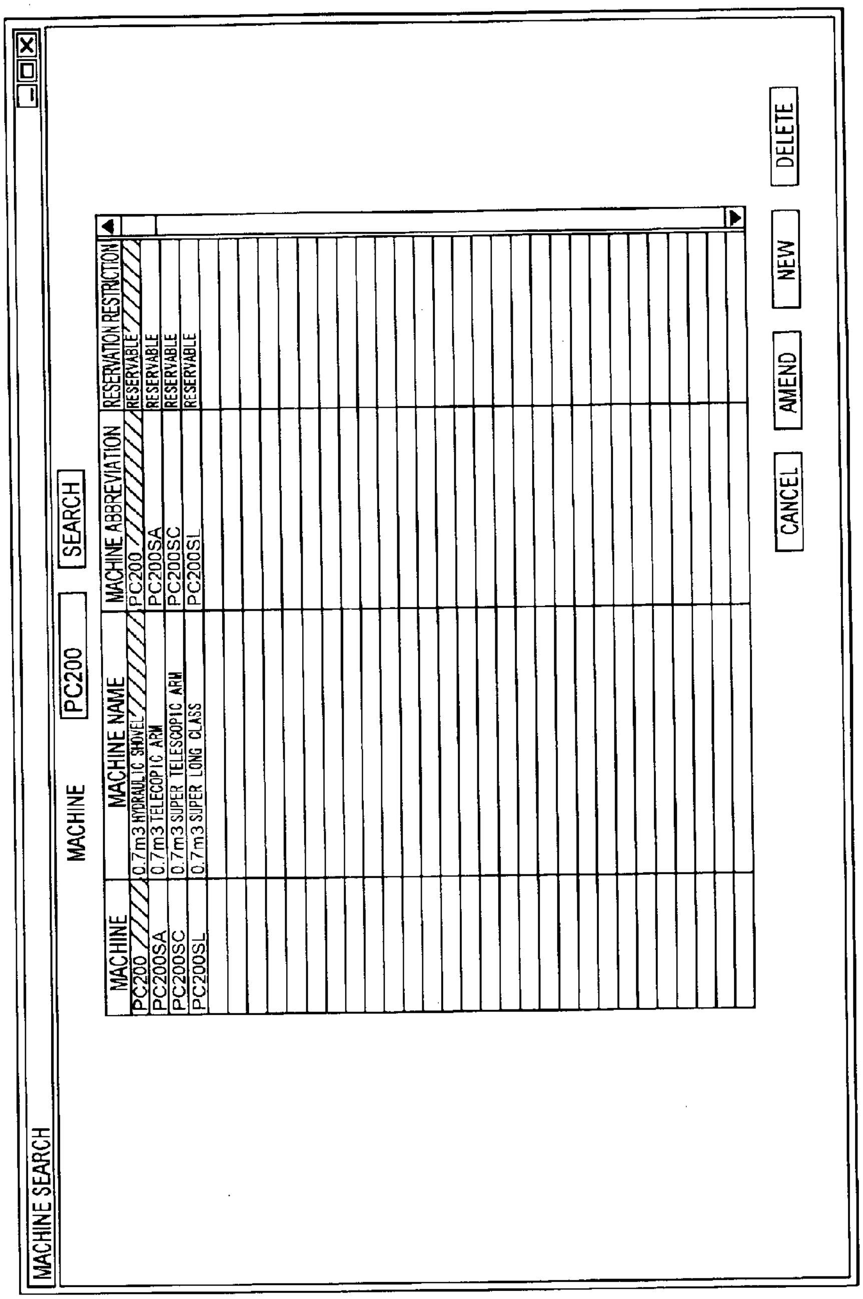
FIG. 13 shows a machine search screen (search results) used in the reservation/transfer regulations processing for each vehicle.
Figure 14:
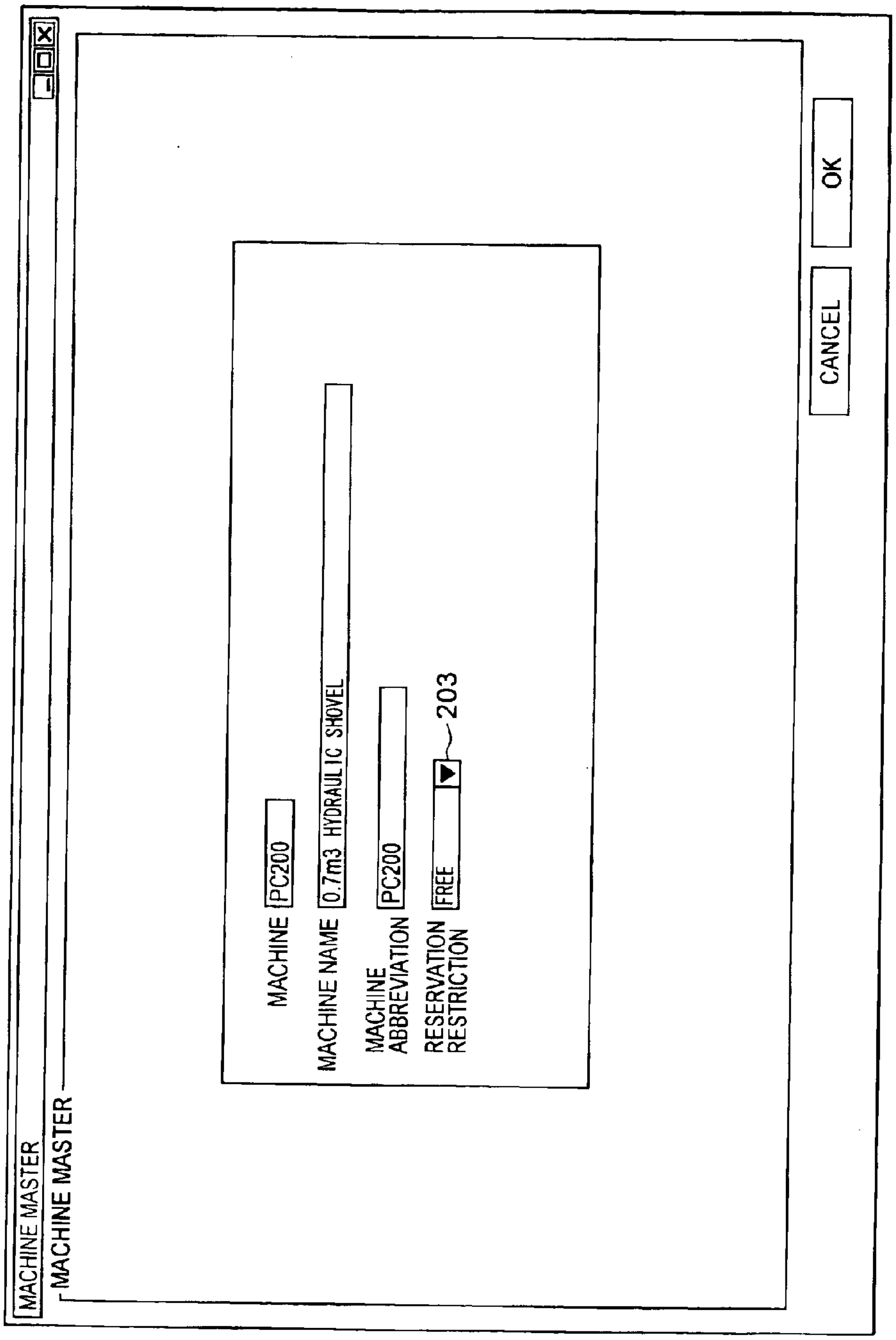
FIG. 14 shows a machine master screen used in the reservation/transfer regulations processing for each vehicle.

In such a case, the operator clicks on "Machine master (reservation restriction)" in the menu screen of FIG. 8. Thereupon, because the system displays the machine search screen shown in FIG. 12, the operator enters the machine code (for example, "PC200)" in this screen, and then clicks on "Search". Then the system retrieves the records of the machine types which correspond to the machine type thus inputted, from the machine master table 121 (refer to FIG. 2), and displays these records in the machine search screen as shown in FIG. 13, and the operator therefore selects the machine type for which regulations are to be imposed from among the machine types and clicks on "Amend". Then, because the system displays the contents of the record of the selected machine type in the machine master screen as shown in FIG. 14, if the operator operates the "reservation restriction" select box 203 in the screen, imposes the reservation restriction (or cancels the restriction) and clicks on "OK", the system updates the reservation restriction flag for this machine type on the machine master table 121, and, at the same time, also updates the reservation restriction flag for the vehicles corresponding to this machine type on the machine number table 120.

Figure 15:
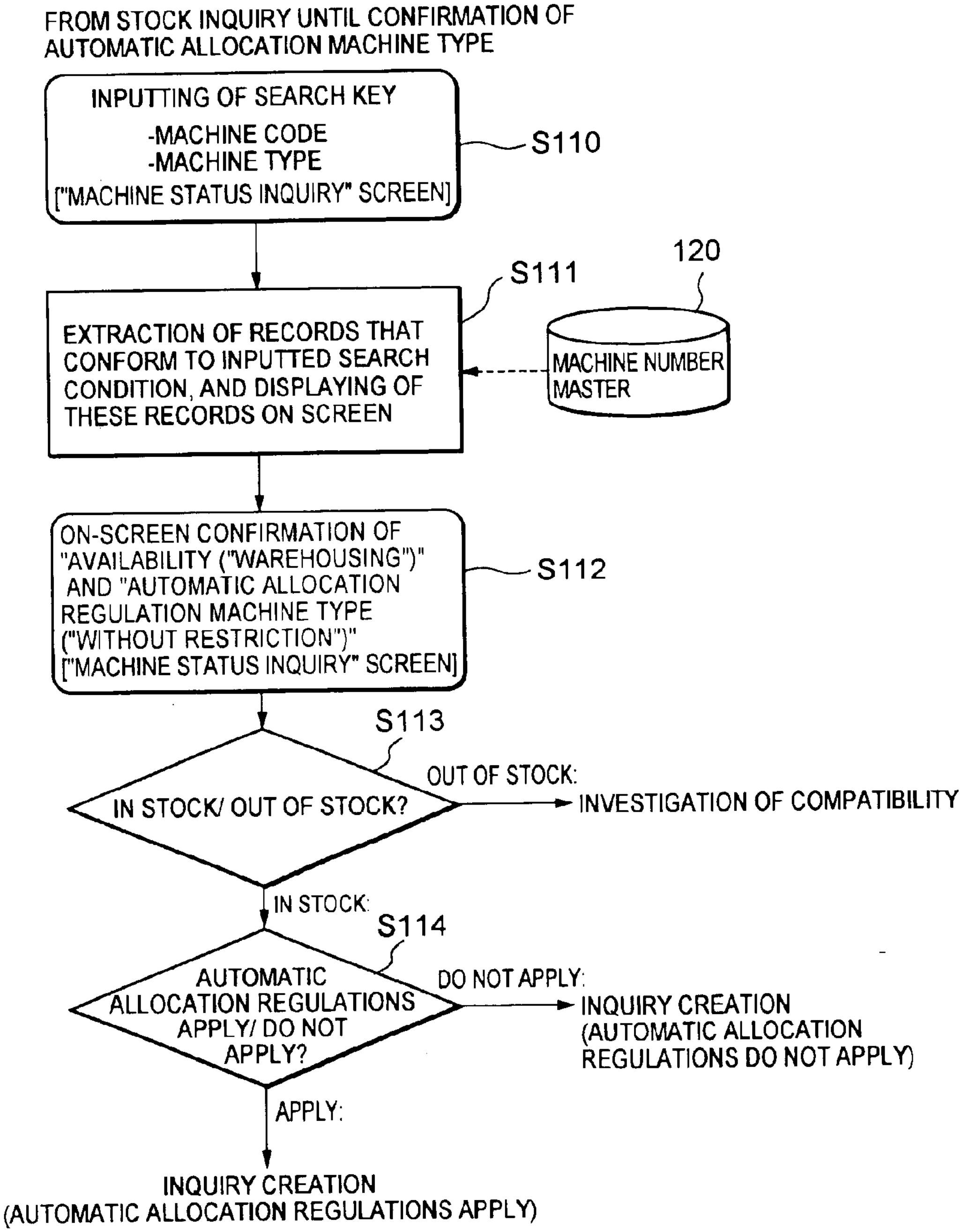
FIG. 15 is a flowchart showing the flow of "stock inquiry" processing of step S2 in FIG. 3.
Figure 16:
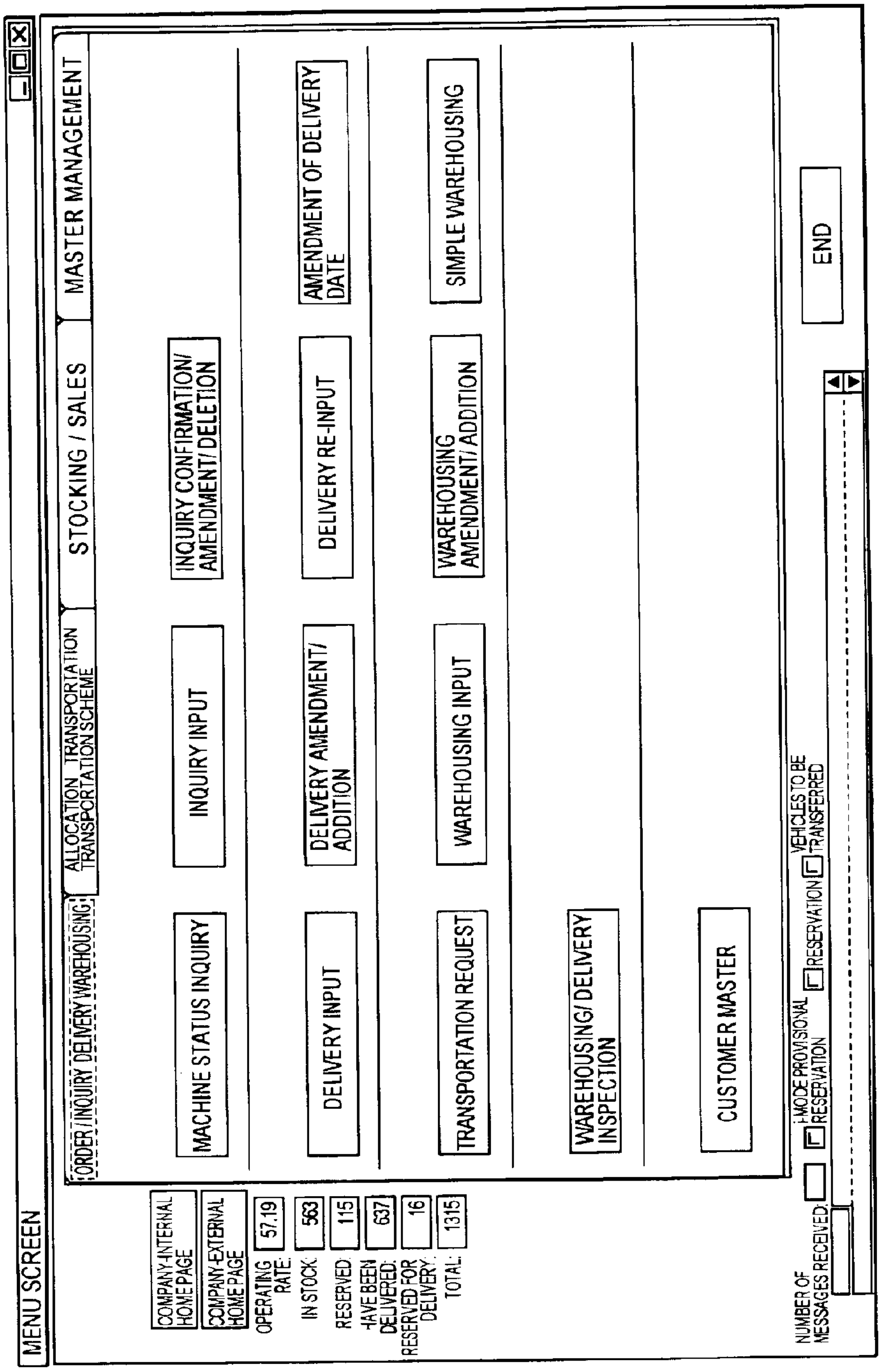
FIG. 16 shows a menu screen for accessing stock inquiry processing.

FIG. 15 shows the flow of "stock inquiry" processing of step S2 in FIG. 3. FIGS. 16 and 17 show user interface screens used in this processing.

When the operator sequentially clicks on "Order/inquiry Delivery Warehousing" and "Machine status inquiry" in the menu screen shown in FIG. 16 which is displayed by the branch store computer terminals, the system displays the machine status inquiry screen shown in FIG. 17 (in which every entry field is blank). Further, in step S110 in FIG. 15, when the operator enters, as a search key, a machine code (for example, "PC200") for the machine type of the inquiry, or a management number of the vehicle of the inquiry, or similar, in the machine status inquiry screen of FIG. 17, in step S11, the system extracts all the vehicle records which correspond with the inputted search key from the machine number master table 120, and displays the contents of these records in the machine status inquiry screen as shown in FIG. 17. The displayed contents of the records of the vehicles includes the availability state (whether the vehicle is in stock, has been reserved, is now provisionally reserved, is undergoing repair, has been delivered), the presence or absence of an automatic allocation restriction (in the example of FIG. 17, the display mark "available" is shown colored), and the management number, specifications, delivery point, and so forth. Thus, in step 112, the operator confirms, via this screen, the availability state and the presence or absence of the automatic allocation restriction, and so forth, with respect to a vehicle whose reservation is desired. As a result, if the desired vehicle is not "in stock" ("out of stock" in step S113), the vehicle is investigated for conformity. Also, if the desired vehicle is "in stock" ("in stock" in step S113) and automatic allocation regulations apply to the desired vehicle ("apply" in step S114), 'Inquiry creation (when automatic allocation regulations apply) "Provisional reservation"' processing of step S3 in FIG. 3 follows, and, if no automatic allocation regulations apply to the desired vehicle ("do not apply" in step S114), the 'Inquiry creation (when the automatic allocation regulations do not apply) "reservation"' processing of step S6 in FIG. 3 follows.

Figure 18:
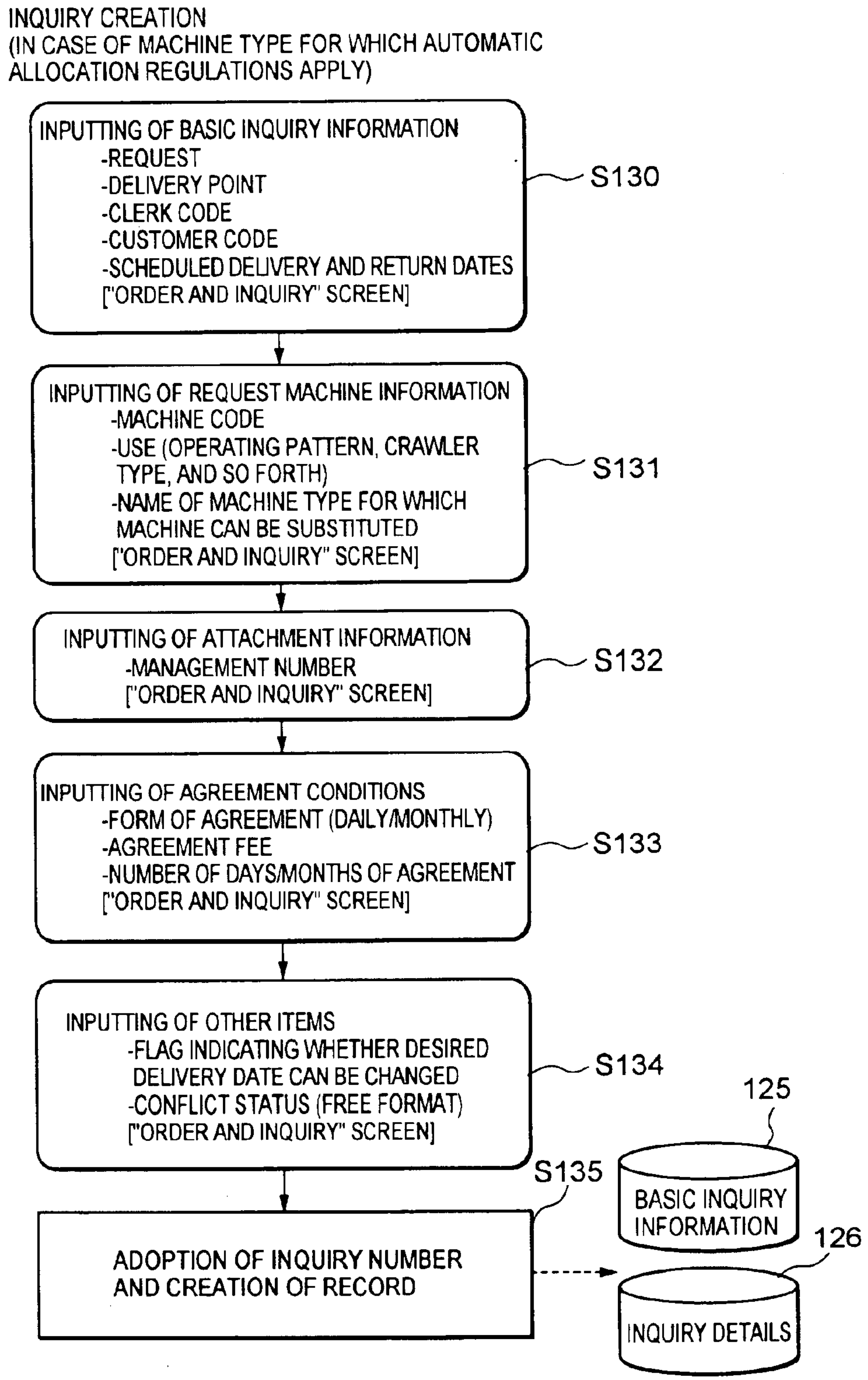
FIG. 18 is a flowchart showing the flow of processing for "inquiry creation (when automatic allocation regulations apply)" of step S3 in FIG. 3.
Figure 19:
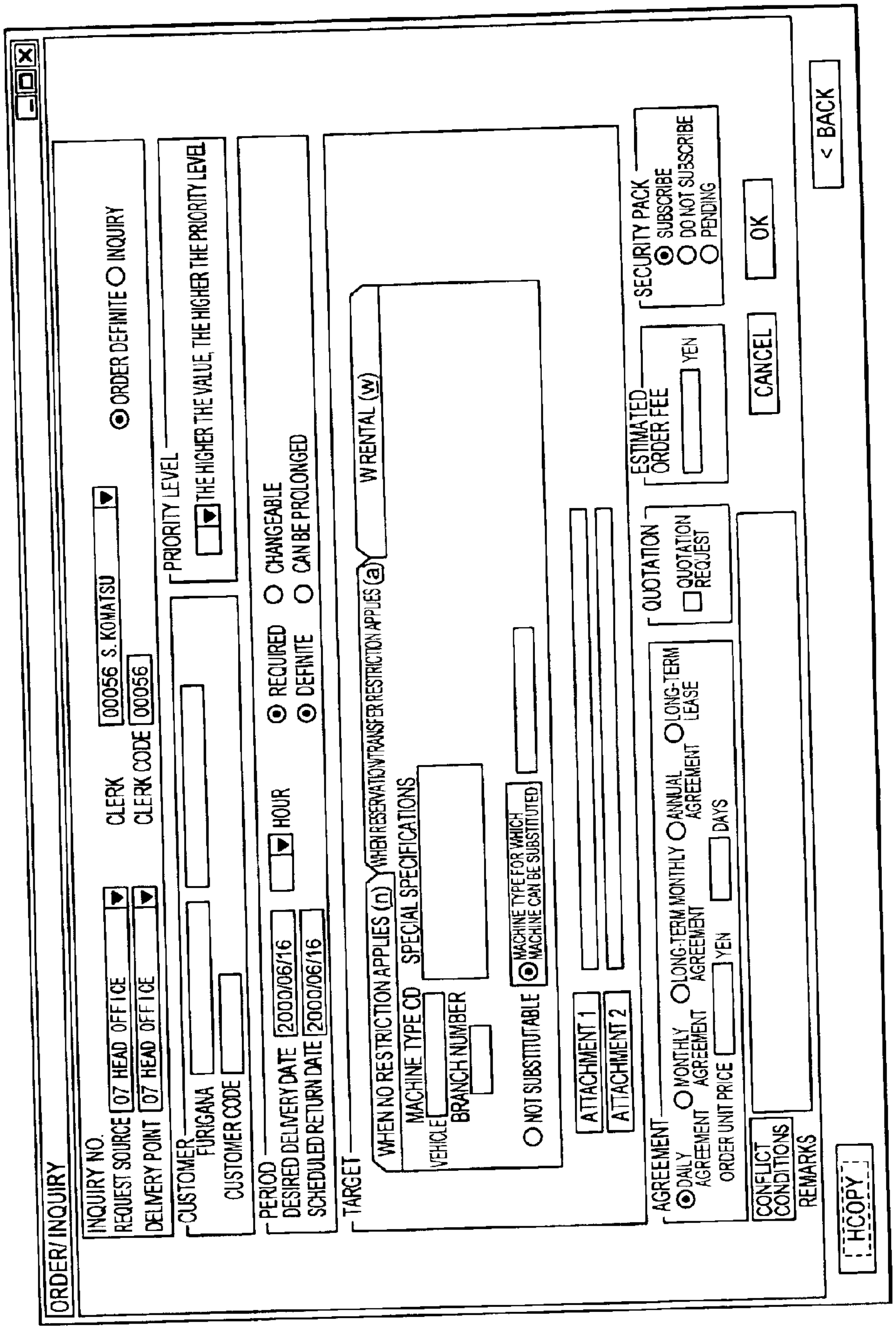
FIG. 19 shows an order and inquiry screen used in the inquiry creation (when automatic allocation regulations apply) processing.
Figure 20:
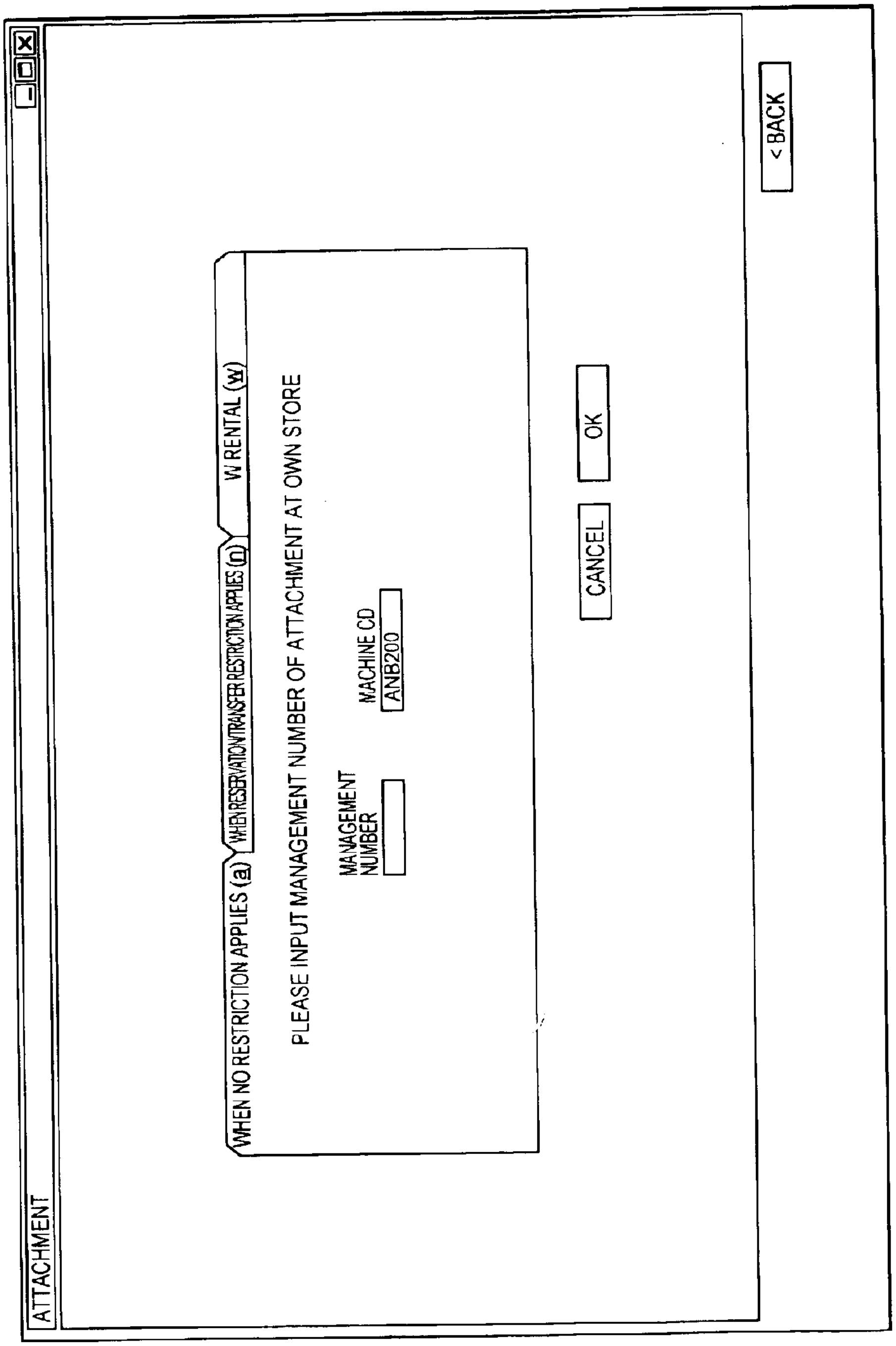
FIG. 20 shows an attachment box used in the inquiry creation (when automatic allocation regulations apply) processing.

FIG. 18 shows the flow of processing for 'Inquiry creation (when automatic allocation regulations apply) "Provisional reservation"' of step S3 in FIG. 3. FIGS. 19 and 20 show user interface screens used in this processing.

When the operator sequentially clicks on "Order/inquiry Delivery Warehousing" and "Inquiry input" in the menu screen shown in FIG. 16 which is displayed by the branch store computer terminals, the system displays the order/inquiry screen shown in FIG. 19 (in which every entry field is blank). Next, in step S130 in FIG. 18, the operator enters basic inquiry information (such as the source of the inquiry, the delivery value, clerk code, customer code, scheduled delivery and return dates, for example) in the order/inquiry of FIG. 19.

Thereafter, in step S131 in FIG. 18, the operator enters information specifying the desired machine type (such as the machine code (machine CD), specifications (operation pattern, type of crawler belt), whether the machine can be substituted by another machine type, the name of the machine type this machine can be substituted for, for example), in the "reservation/transfer restriction applies" field of the "target" field in this order/inquiry screen. Further, when, in step S132 in FIG. 18, the operator clicks on "attachment" in the order/inquiry screen, the "attachment" box shown in FIG. 20 opens, and information specifying the desired attachment (such as the management number of this attachment, for example) is entered in this box.

In addition, in steps S133 to S134 in FIG. 18, the operator enters, in the order/inquiry screen, agreement conditions (such as the form of agreement (daily/monthly and so forth), agreement fee, the number of days/months of the agreement), and other items (such as whether the desired delivery date can be changed, and conflict conditions, for example). Finally, when the operator clicks on "OK", in step S135 in FIG. 18, the system allocates an inquiry number to the inquiry, creates an inquiry record having the inputted details, and registers this record in the basic inquiry information table 125 and inquiry details table 126.

In the above-described 'Inquiry creation (when automatic allocation regulations apply) "provisional reservation"' processing, because automatic allocation regulations apply to the desired vehicle, only a "provisional reservation" is made for the machine type that is the same as the vehicle, there being no "reservation" for the specified vehicle. Thereafter, it is possible to make a "reservation" for a specific vehicle of this machine type when the "allocation processing (when automatic allocation regulations apply) "reservation" of step S4 shown in FIG. 3 is initiated.

Figure 21:
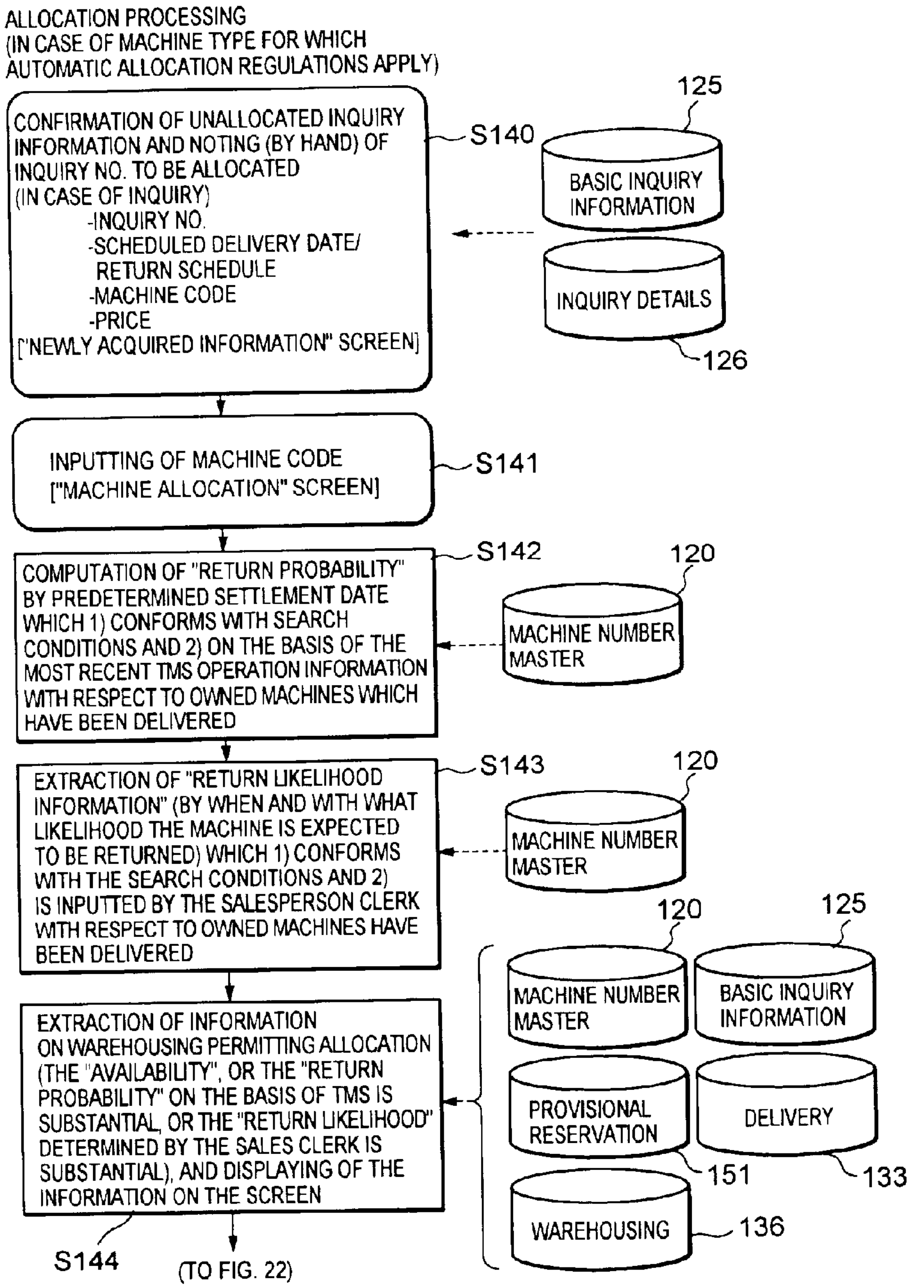
FIG. 21 is a flowchart (the former half thereof) showing the flow of the "allocation processing (when automatic allocation regulations apply)" of step S4 in FIG. 3.
Figure 22:
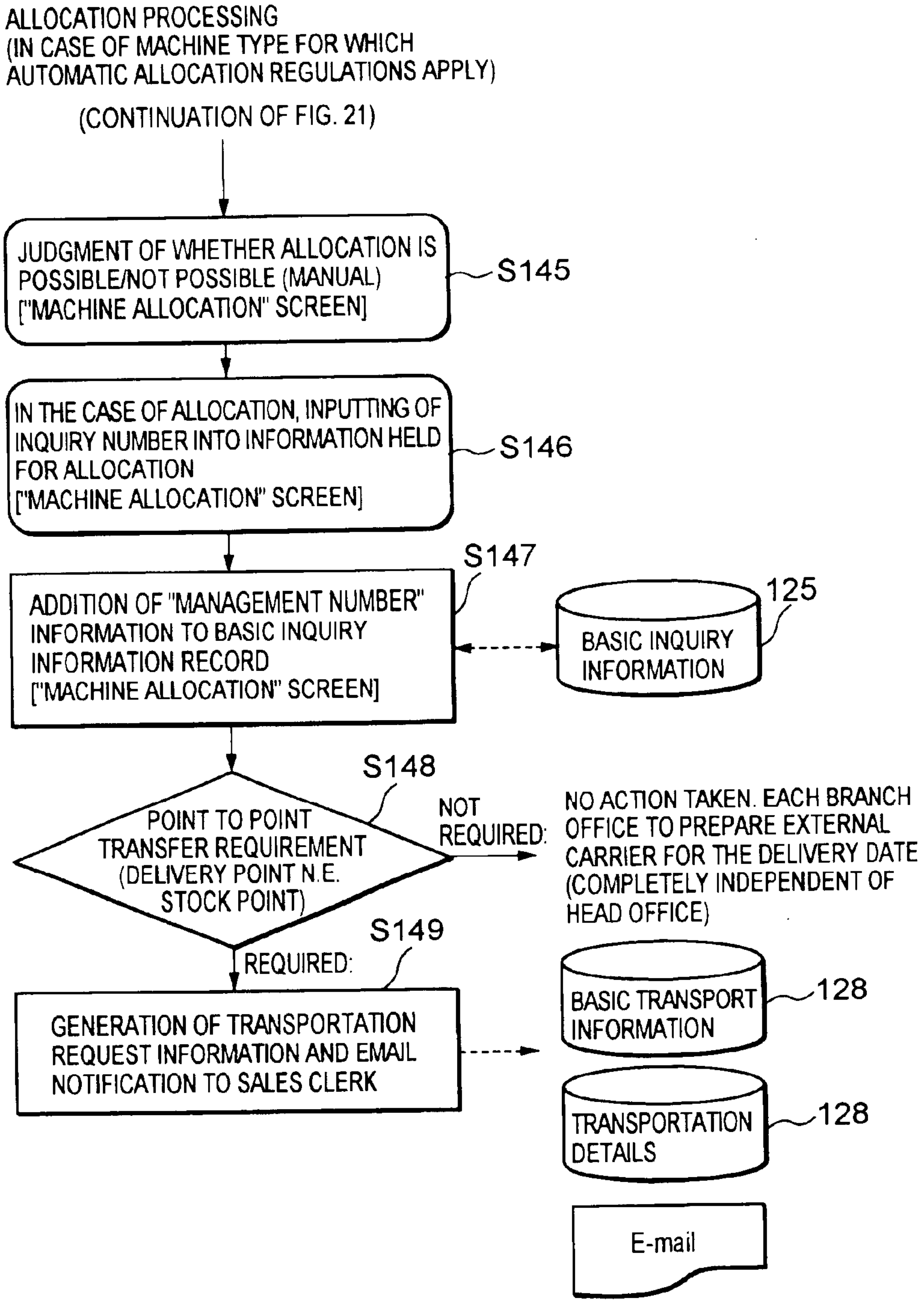
FIG. 22 is a flowchart (the latter half thereof) showing the flow of the "allocation processing (when automatic allocation regulations apply)" of step S4 in FIG. 3.
Figure 24:
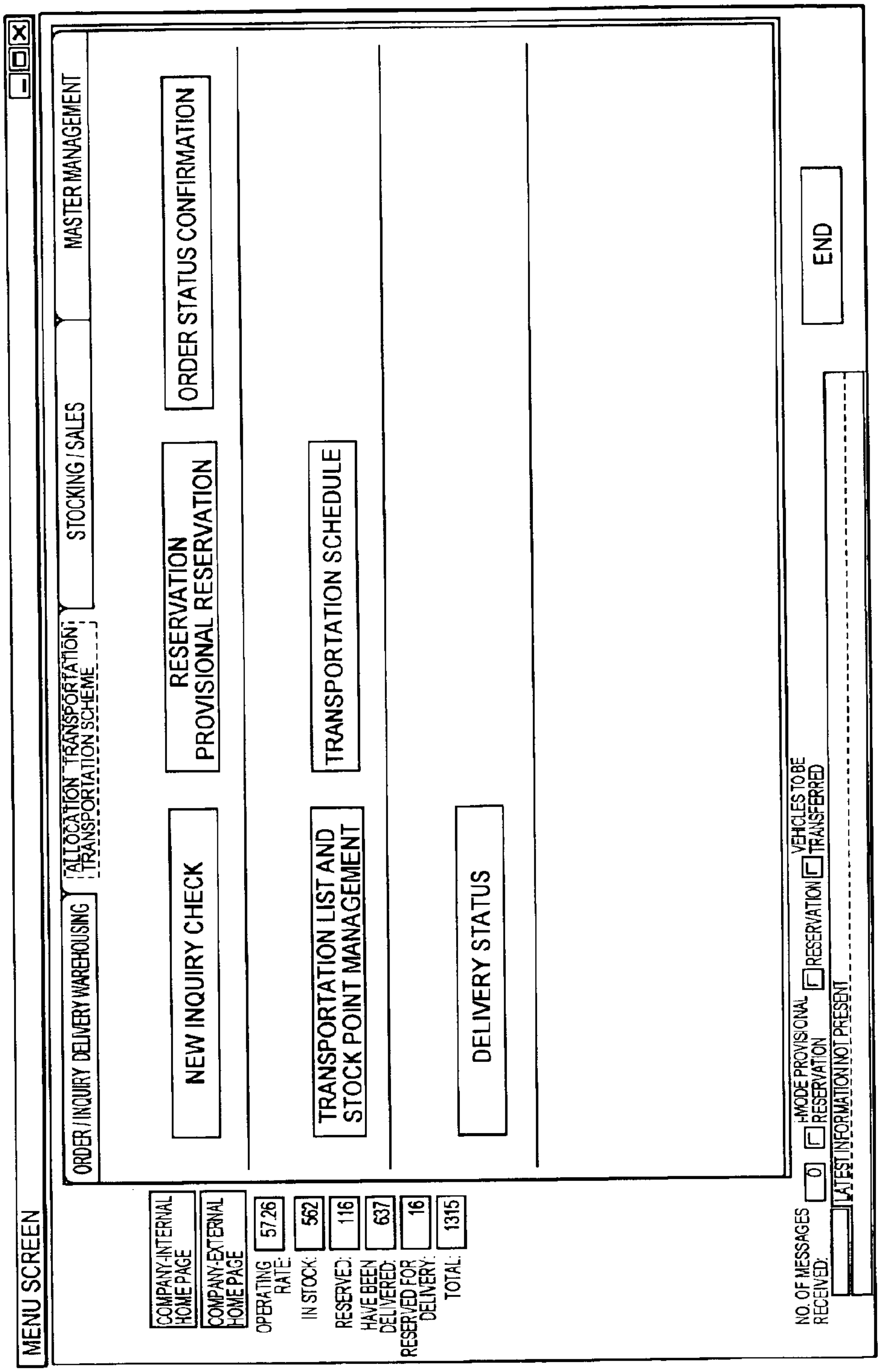
FIG. 24 shows a menu screen for accessing allocation processing (when automatic allocation regulations apply)
Figure 25:
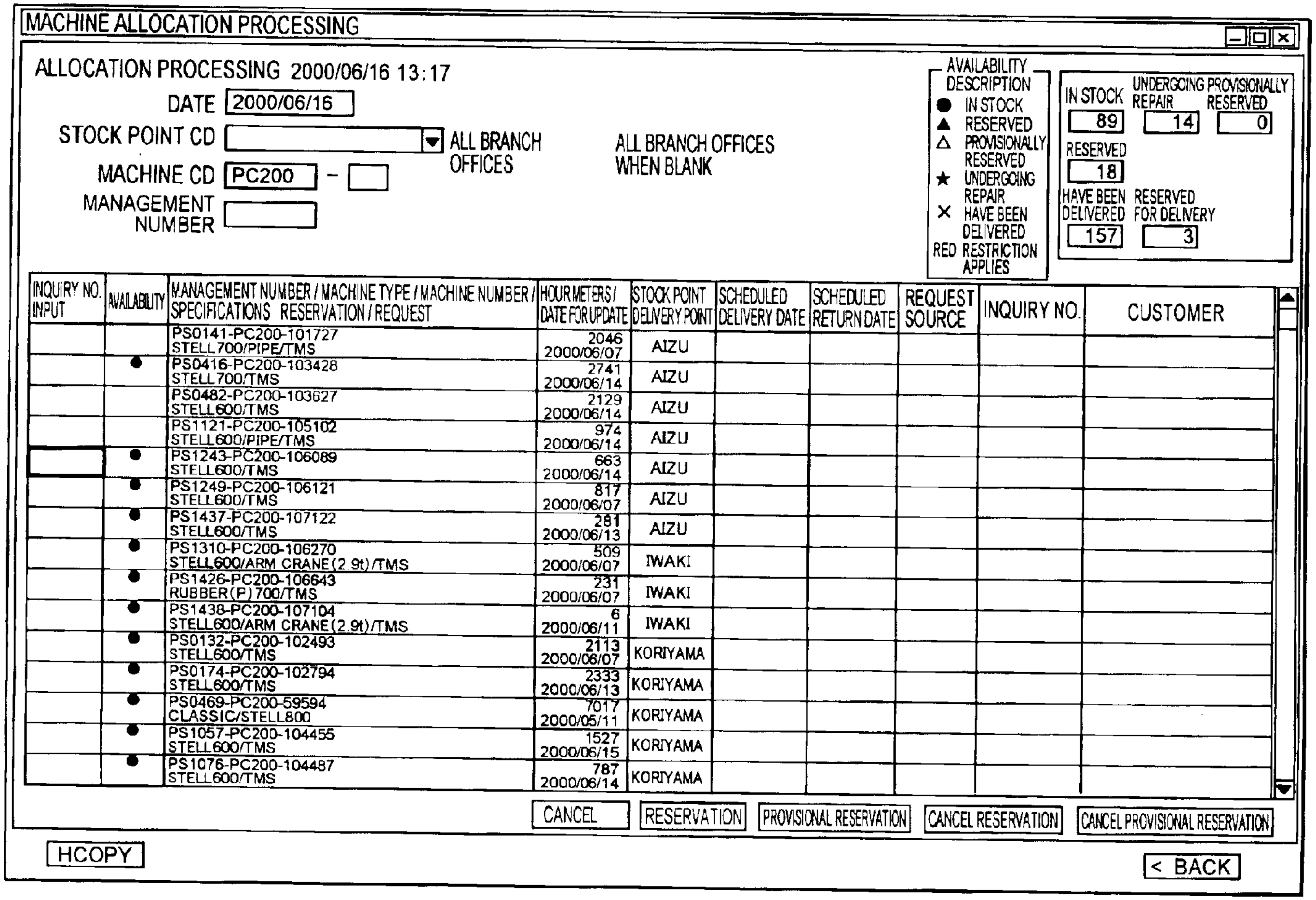
FIG. 25 shows a machine allocation processing screen used in the allocation processing (when automatic allocation regulations apply)

FIGS. 21 and 22 show the process flow for the "allocation processing (when automatic allocation regulations apply) "reservation" of step S4 shown in FIG. 3. FIGS. 23 to 25 show user interface screens used in this processing.

First, in step S140 in FIG. 21, a branch store operator opens the newly acquired information screen shown in FIG. 23 on a branch store computer terminal. Inquiry records newly inputted in the above-described 'inquiry creation (when automatic allocation regulations apply) "provisional reservation"' processing are displayed in an "Inquiries" table in the newly acquired information screen by means of the basic inquiry information table 125 and the inquiry details table 126.

Also in the newly acquired information screen, records of provisional reservations via portable telephones, which records are inputted in the "real-time search and provisional reservation by portable telephone" processing of step S5 in FIG. 3 (the procedure of which is described hereinafter), are displayed in a "portable telephone provisional reservation" table. Records of reservations inputted in the "inquiry creation (when automatic allocation regulations do not apply)" processing (the procedure of which is described hereinafter) of step S6 in FIG. 3, or the "allocation processing (when automatic allocation regulations apply) "reservation"' processing described presently are displayed in a "reservation" table.

The branch store operator views the "Inquiries" table in the newly acquired information screen of FIG. 23, confirms inquiry information appearing in this table (such as the inquiry number, machine code, desired delivery date, scheduled return date, price, for example), and makes notes on a memo of the inquiry number, machine code, and so forth, of an inquiry for which allocation processing is to be performed. Next, in step S141 in FIG. 21, the operator displays the menu screen shown in FIG. 24 on the computer terminal, and clicks sequentially on "Allocation Transportation Transportation scheme" and "Reservation Provisional reservation" to thereby open the "Machine allocation processing" screen shown in FIG. 25 (the entry fields are still blank). The operator then enters the machine code (machine CD) or similar on the memo in the "machine allocation processing" screen as a search condition.

Next, in steps S142 to S144 in FIG. 21, the system extracts only those vehicles permitting allocation from among all the vehicles conforming to the inputted search condition, and displays the records of these vehicles in the "machine allocation processing" screen as shown in FIG. 25. Here, the processing to extract vehicles permitting allocation is performed using the following procedure, for example. First, in the step S142 in FIG. 21, through reference to the machine number master table 120, vehicles conforming to the inputted search condition (the machine type of the inputted machine code, for example) are extracted, and, based on the latest TMS information (operation information and current positional information), the "probability of return" by the predetermined settlement date (for example, two days before the desired delivery date) is calculated for each of the vehicles which have been delivered (for example, vehicles for which the scheduled return date has passed and which do not operate at all during the few days closest to the scheduled return date are judged as having a high "probability of return"). Further, in step S143, "return likelihood information" (by when and with what likelihood the vehicle is expected to be returned), which is inputted by the salespeople, is extracted for the vehicles which have been delivered. Then, in step S144, of the vehicles conforming to the above-mentioned search condition, the vehicles which are in stock, and those vehicles which have been delivered but for which the "return probability" is high or for which the "return likelihood information" is substantial, are extracted as vehicles that can be allocated. Information on these vehicles is read from the machine number master table 120, the basic inquiry information table 125, the provisional reservation table 151, the delivery table 133, the warehousing table 136, and the like, and such information is then displayed in the "machine allocation processing" screen of FIG. 25.

When the information on the vehicles which can be allocated is displayed by the "machine allocation processing" screen of FIG. 25, next, in steps S145 and S146 in FIG. 22, the operator selects the vehicle which is to be allocated from the vehicles that can be allocated, enters the inquiry number previously noted, in the "Inquiry No. input" field in the screen for the vehicle thus selected, and then clicks on "Reservation". Then, in step S147, the system adds information for the management number of this vehicle to the record of this inquiry number in the basic inquiry information table 125. "Reservation" is thus performed for this vehicle.

Thereafter, in step S148, the system judges whether or not a point-to-point transfer is required for the reserved vehicle. If the vehicle stock point and the delivery point of this inquiry are the same place, the judgement is made that a point-to-point transfer is not necessary, but if different, it is judged that a point-to-point transfer will be required. When it is judged that a point-to-point transfer is not necessary, no undertaking is made by the system, rather, the clerk at the branch store arranges an external carrier for the delivery date. When it is judged that a point-to-point transfer is required, in step S149, the system generates transportation request information, registers this information in the transportation basic information table 128 and the transportation details table 129, and relays this transportation request information to the salesperson in charge by electronic mail.

Figure 26:
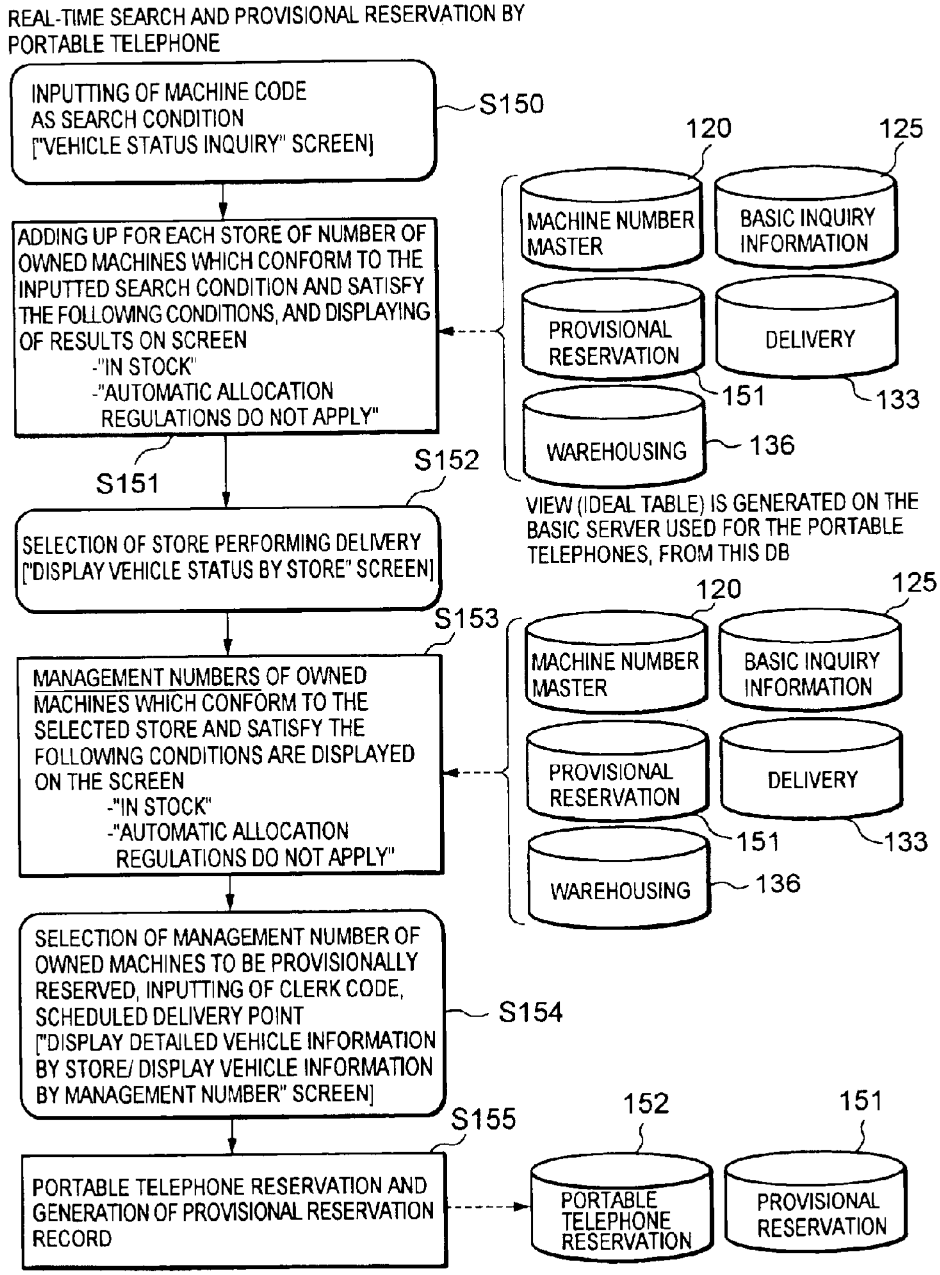
FIG. 26 is a flowchart showing the flow of the "real-time search and provisional reservation by portable telephone" processing of step S5 in FIG. 3.
Figure 27:
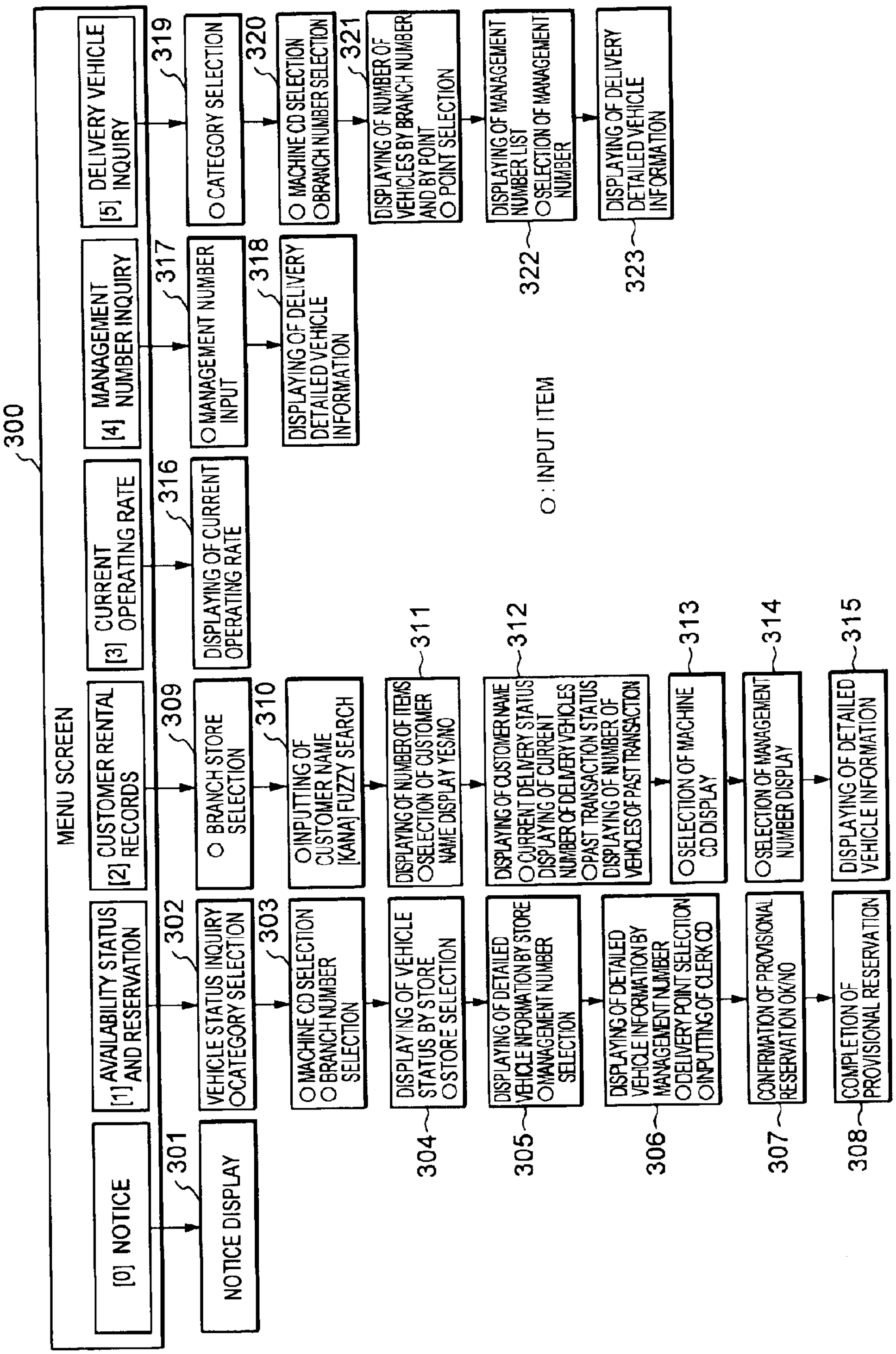
FIG. 27 shows the types of portable telephone content screen which are displayed by the portable telephone of a salesperson, along with the transitions to these screens.

FIG. 26 shows the flow of the "real-time search and provisional reservation by portable telephone" processing of step S5 in FIG. 3. FIG. 27 shows the types of portable telephone content screen displayed by the portable telephone of a salesperson, along with the transitions to these screens. Further, in FIG. 27, those items which have a white circular symbol appended on the left side thereof are items which are entered in the screen.

As described above, the "real-time search and provisional reservation by portable telephone" processing shown in FIG. 26 is processing which allows the salespeople in external locations to check on the availability of the vehicles and to make a provisional reservation of the vehicles, using the portable telephones.

In order to initiate this processing, the salesperson first causes the portable telephone to display the menu screen 300 shown in FIG. 27, and then displays the "Vehicle status inquiry" screen 302 by selecting "[1] availability status and reservation" in this menu screen 300. Then, in step S150 in FIG. 26, the salesperson enters a machine code (that is, the machine type), and the like, as the search condition, in the "Vehicle status inquiry" screen 302. Next, in step S151 in FIG. 26, the system references the machine number master table 120, the basic inquiry information table 125, the provisional reservation table 151, the delivery table 133, and the warehousing table 136, and the like, and extracts those vehicles which conform to the inputted search condition, which are in stock and for which automatic allocation regulations do not apply; the system adds up the number of vehicles (number of machines owned) for every branch store, creates the result of this addition in the form of the "Display vehicle status by store" screen 304 in FIG. 27, and sends this screen to the portable telephones so that this screen is displayed by the portable telephones.

Next, in step S152 in FIG. 26, the salesperson selects the branch store performing the delivery, on the "Display vehicle status by store" screen 304. Then, in step S153 in FIG. 26, the system references the machine number master table 120, the basic inquiry information table 125, the provisional reservation table 151, the delivery table 133, and the warehousing table 136, and the like, and extracts those vehicles which are owned by the selected branch store, which are in stock and for which automatic allocation regulations do not apply; the system creates the list of management numbers for these vehicles in the form of the "Detailed vehicle information display by store" screen 305 in FIG. 27, and sends this screen to the portable telephones so that this screen is displayed by the portable telephones.

Next, in step S154 in FIG. 26, the salesperson selects the management number of the vehicle which is to be provisionally reserved, on the "Vehicle status information display by store" screen 305. Then, the "Detailed vehicle information display by management number" screen 306 in FIG. 27 for the vehicle which has the management number selected appears, and hence the salesperson completes the inputting by entering the clerk code, the scheduled delivery point, and the like, in the screen 306. Then, because the "Provisional reservation confirmation" screen 307 in FIG. 27 appears, the salesperson selects "OK" on this screen 307. Next, based on the items thus inputted, the system creates a portable telephone reservation record and provisional reservation record and registers same in the portable telephone reservation table 152 and the provisional reservation table 151.

Thus, the contents of the provisional reservation made by portable telephone (such as the vehicle management number, machine type, machine number, stock point, clerk, for example) are displayed in the "Portable telephone provisional reservation" table of the already described "Newly acquired information" screen in FIG. 23 when the latter is opened. At the branch store, the operator views this "Portable telephone provisional reservation" table and performs the 'Inquiry creation (when automatic allocation regulations do not apply) "Reservation"' processing of step S6 in FIG. 3 for each provisional reservation listed therein.

Figure 28:
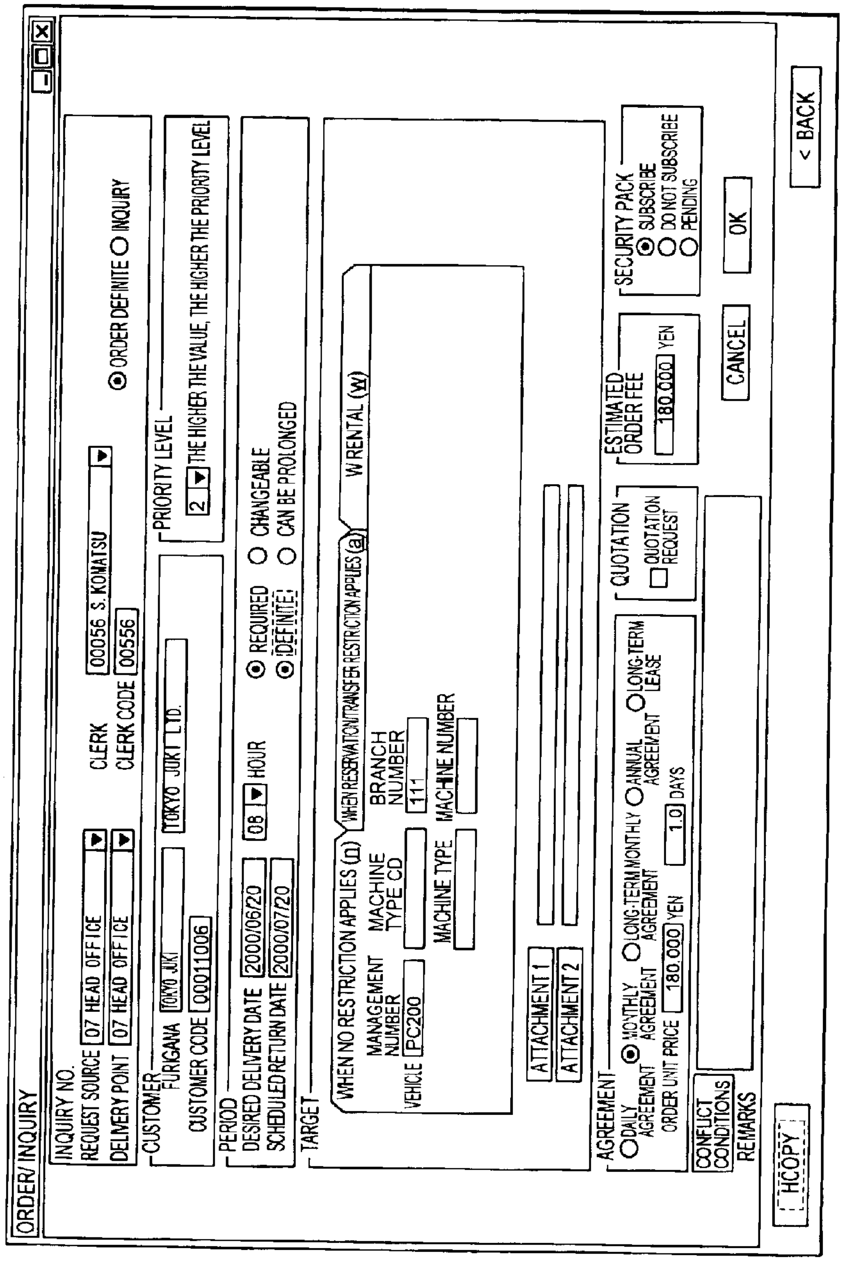
FIG. 28 shows the "Order and inquiry" screen used in the 'inquiry creation (when automatic allocation regulations do not apply) "reservation"' processing of step S6 in FIG. 3.

This 'Inquiry creation (when automatic allocation regulations do not apply) "Reservation"' processing is basically substantially the same as 'Inquiry creation (when automatic allocation regulations apply) "Provisional reservation"' [processing] described through reference to FIGS. 18 to 20, the difference being that, with 'Inquiry creation (when automatic allocation regulations do not apply) "Reservation"' processing, "Reservation" is confirmed for a specific vehicle. In other words, in this processing, as shown in FIG. 28, the operator enters the management number of the vehicle which is to be provisionally reserved in the "No restriction applies" field of the "Target" field, on the "Order and inquiry" screen, and then, after also inputting other required items, clicks on "OK". Then, in so doing, similarly to the "allocation processing (in the case of a machine type having automatic allocation regulation)" step S147 already described through reference to FIGS. 21 to 22, and to subsequent steps, the vehicle having this management number is automatically allocated by the system, and the contents of the inquiry are registered in the basic inquiry information table 125 and the inquiry details table 126. It is judged whether or not a point-to-point transfer is required for this vehicle, and, if required, transportation request information is generated, registered in the transportation basic information table 128 and the transportation details table 129, and relayed to the clerk by electronic mail.

As described hereinabove, when "reservation" of a rental of a specific vehicle is confirmed, next, as already described, the "Point transfer request" processing of step S7 in FIG. 3 is performed.

Figure 29:
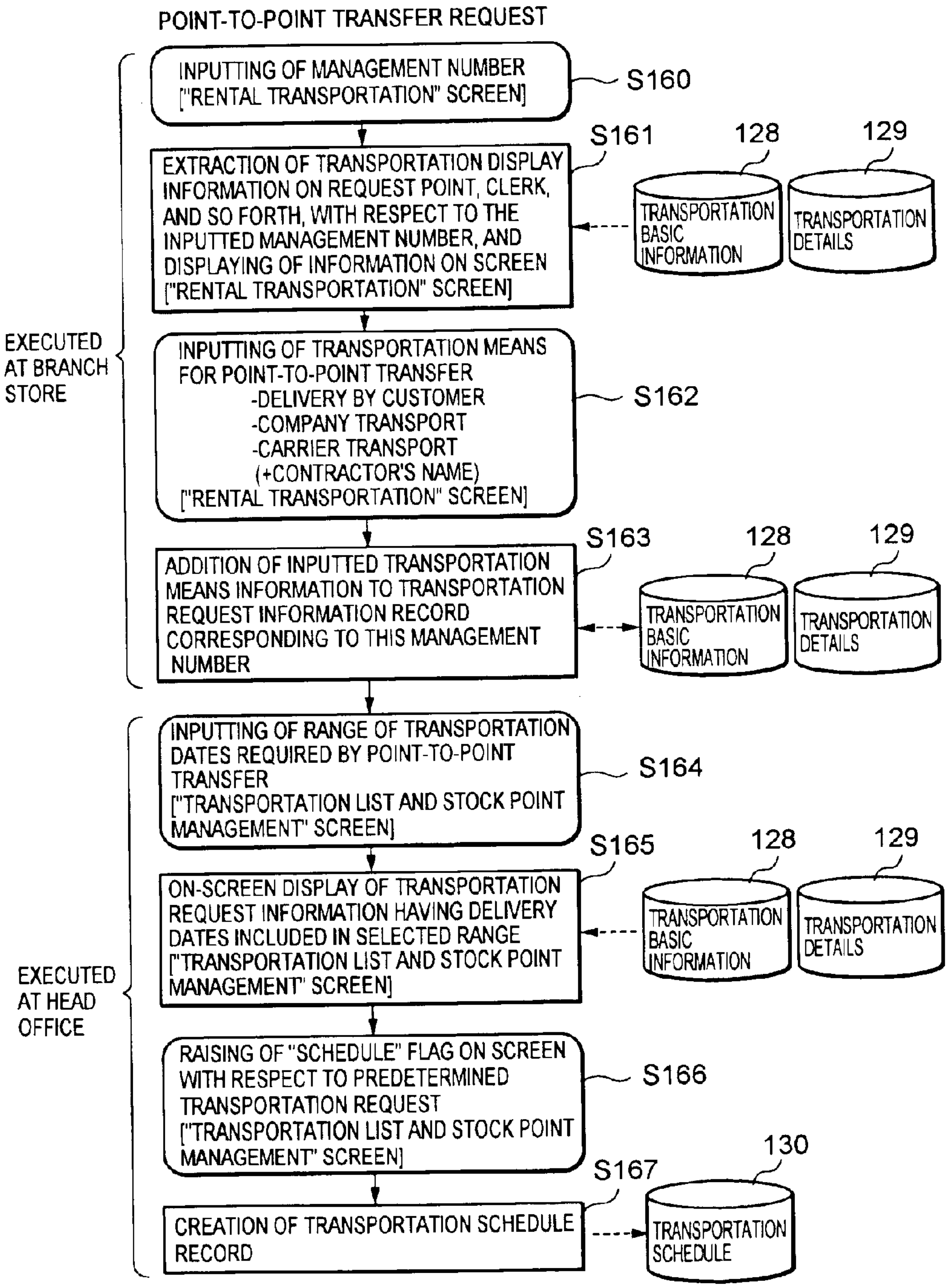
FIG. 29 is a flowchart showing the flow of the "point transfer request" processing of step S7 in FIG. 3.
Figure 30:
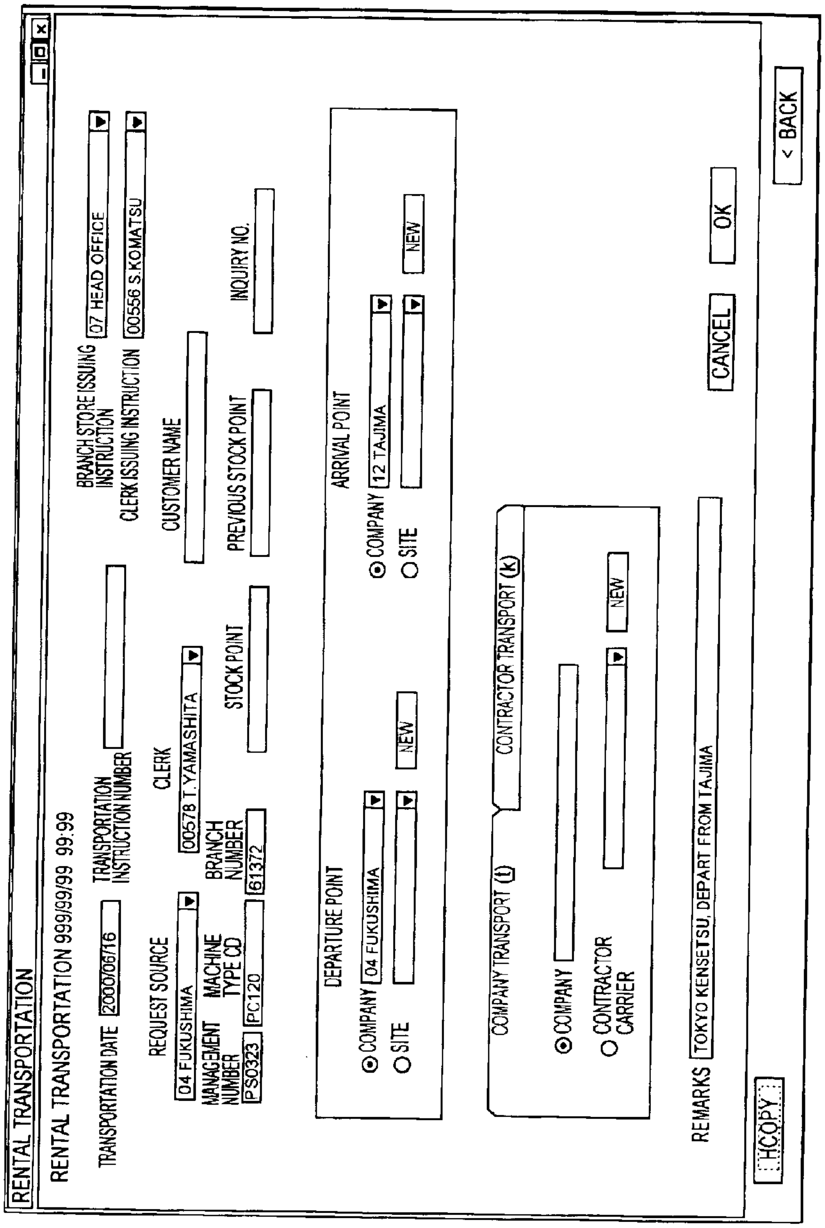
FIG. 30 shows a "Rental transportation" screen used in point transfer request processing.
Figure 31:
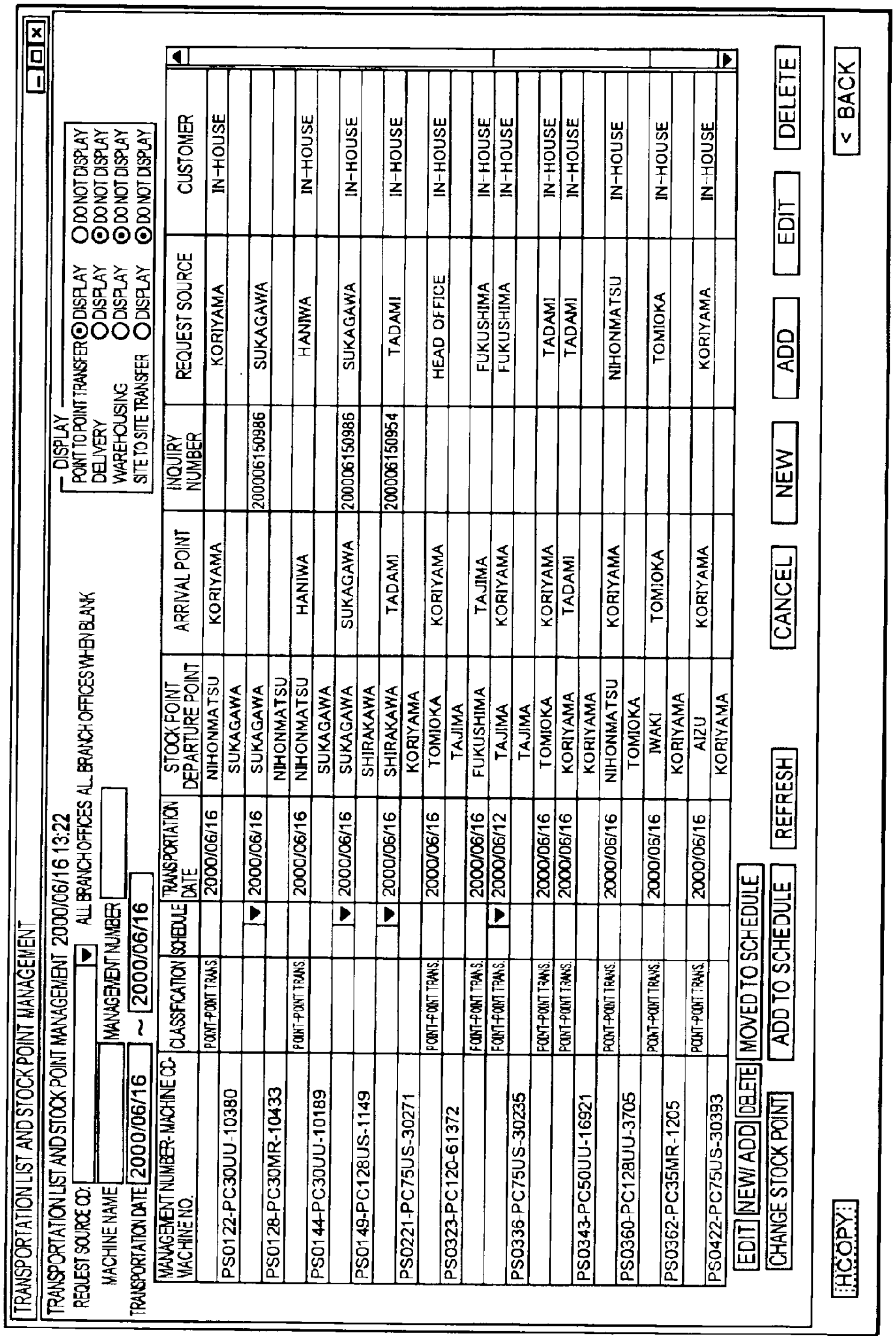
FIG. 31 shows a "Transportation list and stock point management" screen used in the point transfer request processing.

FIG. 29 shows the flow of this "Point transfer request" processing, and FIGS. 30 and 31 show user interface screens used in this processing.

First, upon sequentially clicking on "Allocation Transportation Transportation scheme" and "Transportation list and Stock point management" on the menu screen shown in FIG. 24 on the branch store computer terminal, and then clicking on "Rental transportation" (not illustrated), the "Rental transportation" screen shown in FIG. 30 is displayed. First, in step S160 in FIG. 2, the operator enters the management number of the target vehicle in the "Rental transportation" screen. Then, in step S161, the system reads out the contents of the transportation instruction information for the inputted management number (such as the source of the inquiry, the clerk, for example) from the transportation basic information table 128 and the transportation details table 129 and displays the contents in the "Rental transportation" screen as shown in FIG. 30. Next, in step S162 in FIG. 29, the operator enters the point-to-point transfer transportation means (such as delivery by the customer, company transport, carrier transport, for example), in the "Rental transportation" screen, and clicks on "OK". Then, in step S163, the system adds the inputted transportation means information to the transportation request information record which has the corresponding management number in the transportation basic information table 128 and the transportation details table 129.

Next, at the head office, upon sequentially clicking on "Allocation Transportation Transportation scheme" and "Transportation list and Stock point management" on the menu screen shown in FIG. 24, the "Transportation list and Stock point management" screen shown in FIG. 31 is displayed. First, in step S164 in FIG. 29, the operator enters the transportation date range required for the point-to-point transfer in the "Transportation list and Stock point management" screen. Then, in step S165, the system reads out the contents of all the transportation request information which has the transportation dates included in the inputted range from the transportation basic information table 128 and the transportation details table 129 and displays the contents in the "Transportation list and stock point management" screen as shown in FIG. 31.

Next, in step S166, the operator selects transportation request information for scheduling from the transportation request information displayed in the "Transportation list and stock point management" screen, raises a "schedule" flag in the selected transportation request information screen, and clicks on "Add to schedule". Then, in step S167, the system creates the transportation schedule record with respect to the transportation request information for which the "schedule" flag is raised and registers this information in the transportation schedule table 130. System-based scheduling with respect to this transportation request information is thus permitted.

Figure 32:
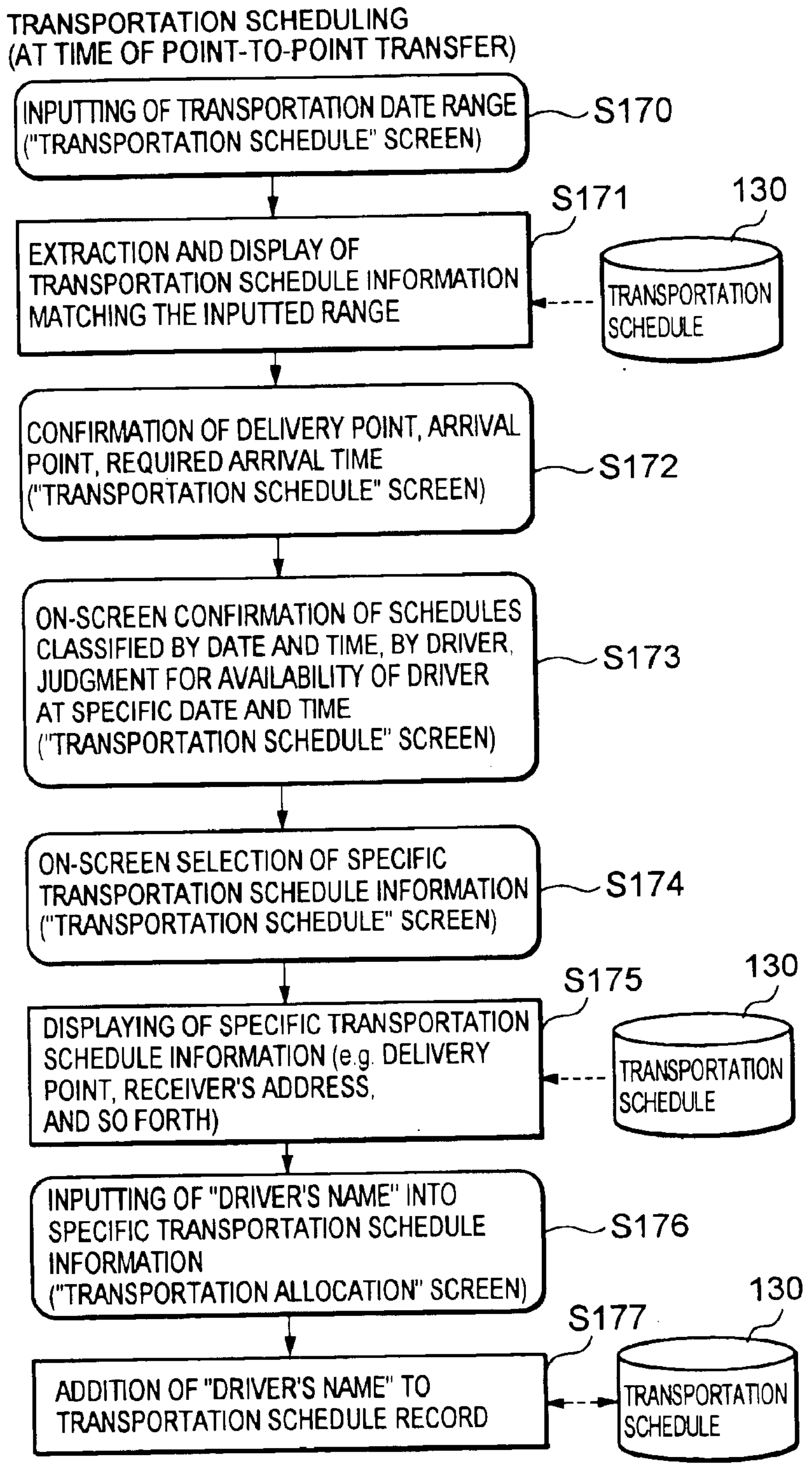
FIG. 32 is a flowchart showing the flow of "transportation scheduling (at the time of a point-to-point transfer)" processing of step S8 in FIG. 4.
Figure 34:
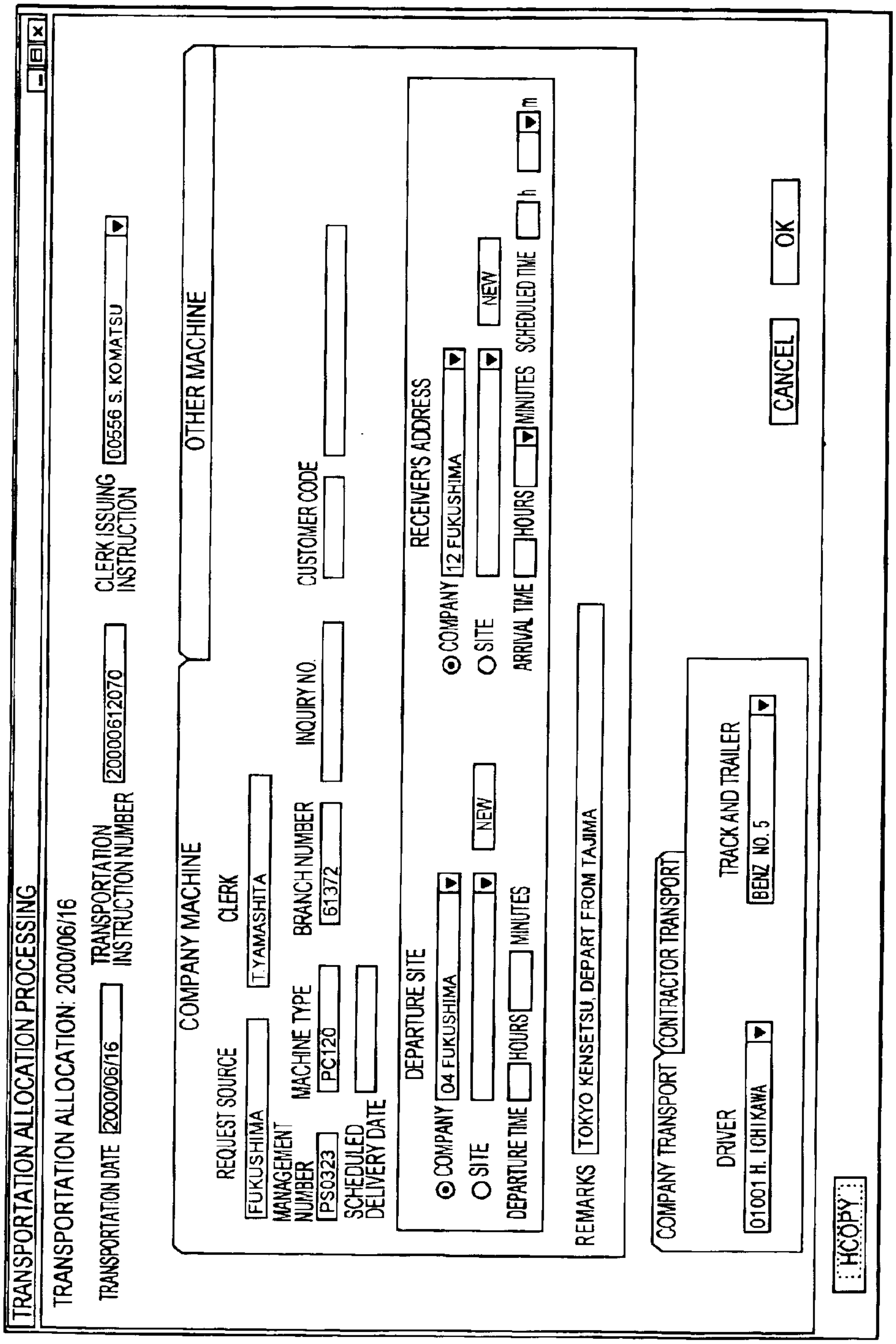
FIG. 34 shows a "Transportation allocation processing" screen used in the transportation scheduling processing.

FIG. 32 shows the flow of "transportation scheduling (at the time of a point-to-point transfer)" processing of step S8 in FIG. 4. FIGS. 33 and 34 show user interface screens used in this processing.

This processing is performed at head office as shown in FIG. 4. First, in step S170 in FIG. 32, when an operator at the head office sequentially clicks on "Allocation Transportation Transportation scheme" and "Transportation schedule" on the menu screen shown in FIG. 24, at a computer terminal, the "Transportation schedule" screen shown in FIG. 33 is displayed (with the entry fields blank), whereupon the operator enters the transportation date range in this "Transportation schedule" screen. Next, in step S171, the system extracts transportation schedule records that fit the inputted range from the transportation schedule table 130, and displays these records as shown in FIG. 33.

Next, in step S172, the operator confirms the departure point (delivery point), arrival point, arrival date and time, and so forth, of each transportation schedule in the "Transportation schedule" screen, and, then, in step S173, confirms the transportation schedules by the date and time and by the driver, and makes a judgement of driver availability on a specific date and time. Next, in step S174, the operator selects a specific transportation schedule from the "Transportation schedule" screen, and then clicks on "Edit". Next, in step S175, the system reads out the various information of the selected transportation schedule (such as the delivery point, receiver's address, for example) from the transportation schedule table 130, and this information is displayed in the "Transportation allocation processing" screen, as shown in FIG. 34.

Next, in step S176, the operator enters the "Driver name" and the like with respect to this transportation schedule, in the "Transportation allocation processing" screen, and clicks on "OK". Then, in step S177, the system adds the inputted "Driver name" and the like to the transportation schedule record of the transportation schedule table 130.

Figure 35:
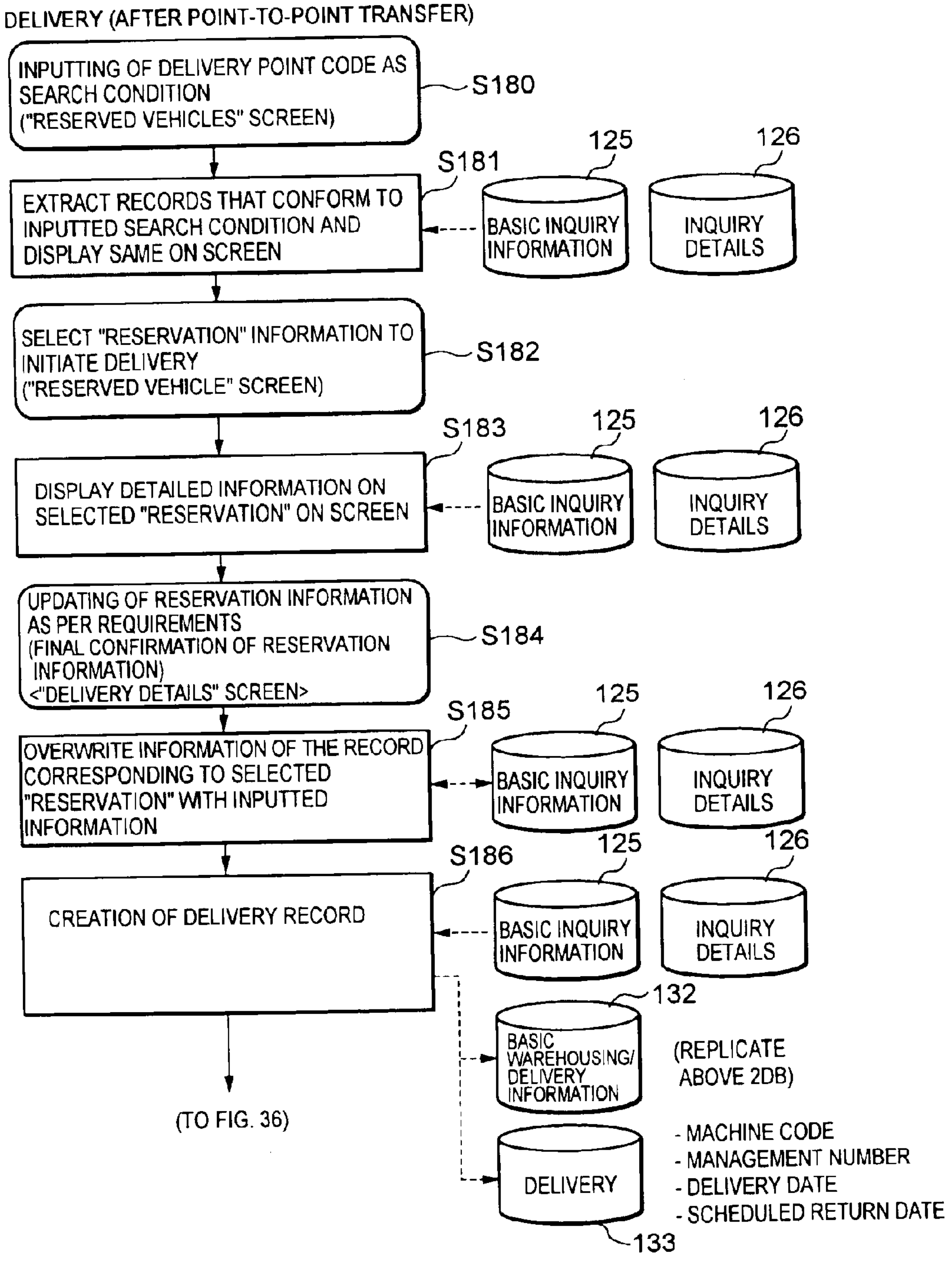
FIG. 35 is a flowchart (the former half thereof) showing the flow of the "delivery (at the time of a point-to-point transfer)" processing of step S10 in FIG. 4.
Figure 36:
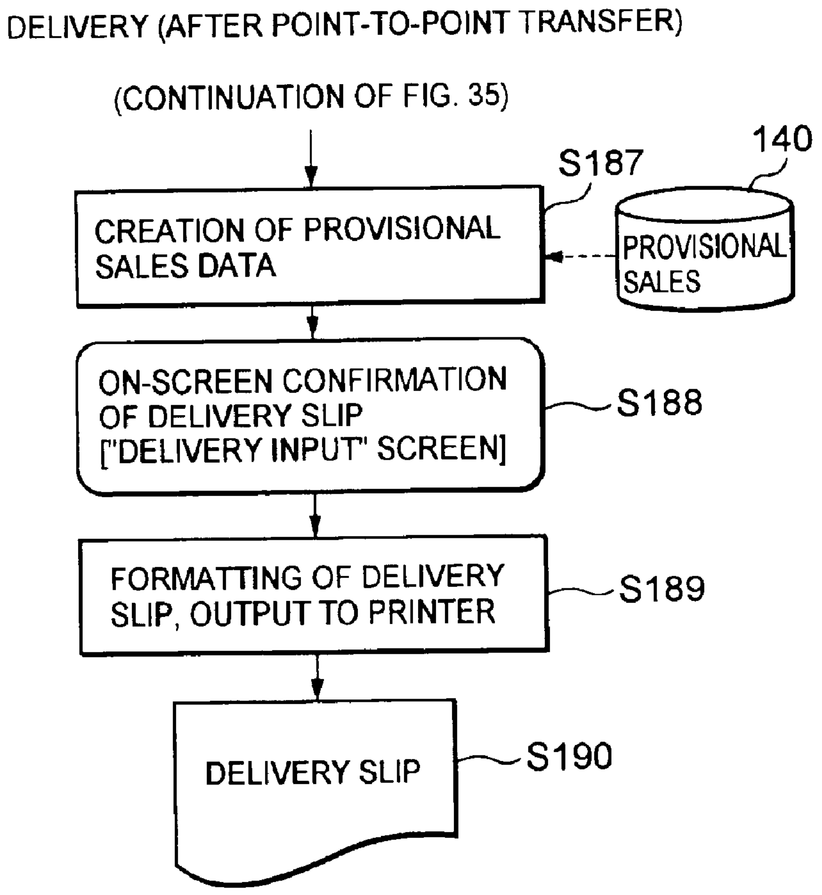
FIG. 36 is a flowchart (the latter half thereof) showing the flow of the "delivery (at the time of a point-to-point transfer)" processing of step S10 in FIG. 4.

FIGS. 35 and 36 show the flow of the "delivery (at the time of a point-to-point transfer) processing of step S10 in FIG. 4. FIGS. 37 to 44 show user interface screens used in this processing.

Figure 37:
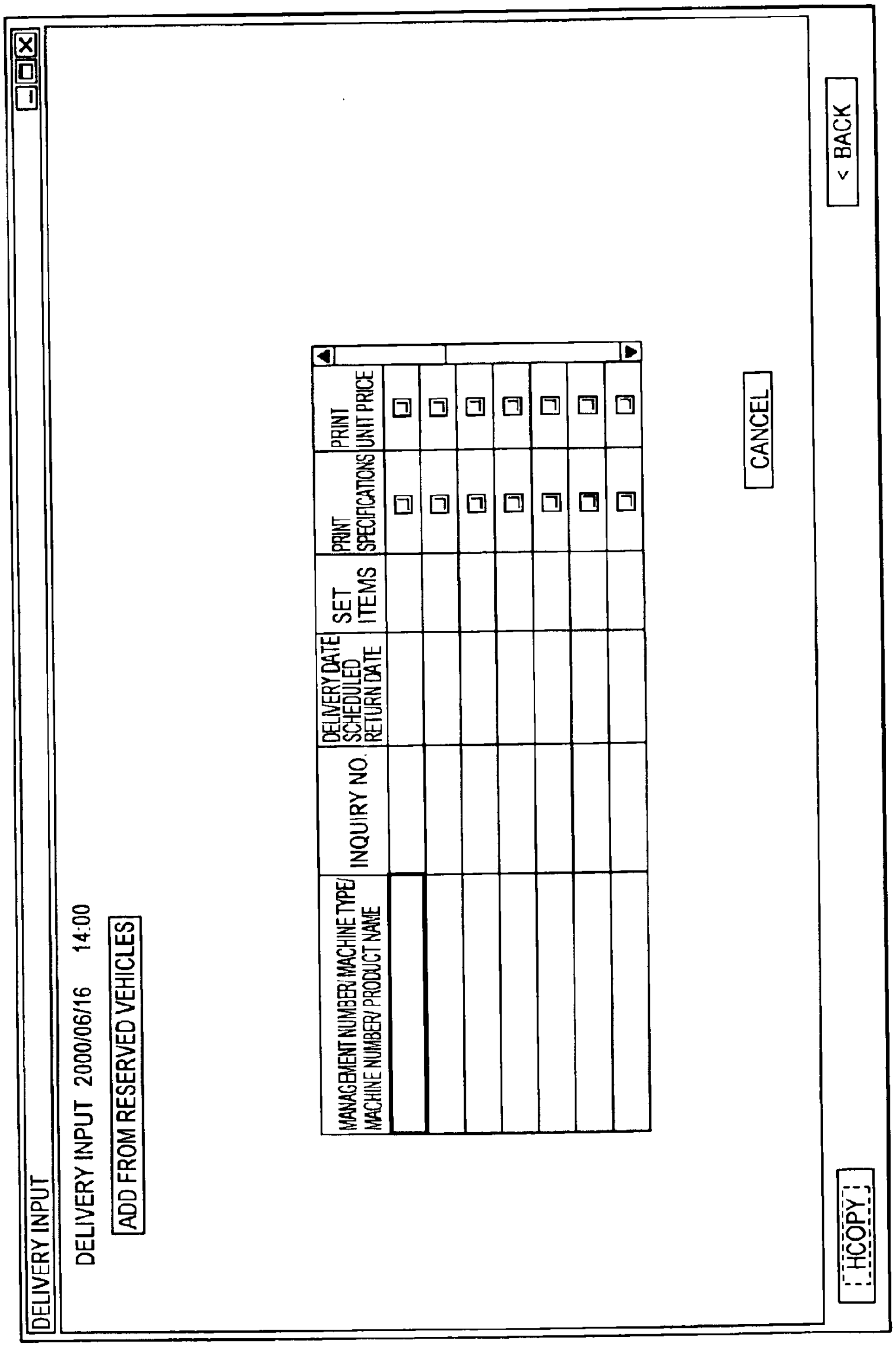
FIG. 37 shows a "Delivery input" screen used in delivery processing.
Figure 38:
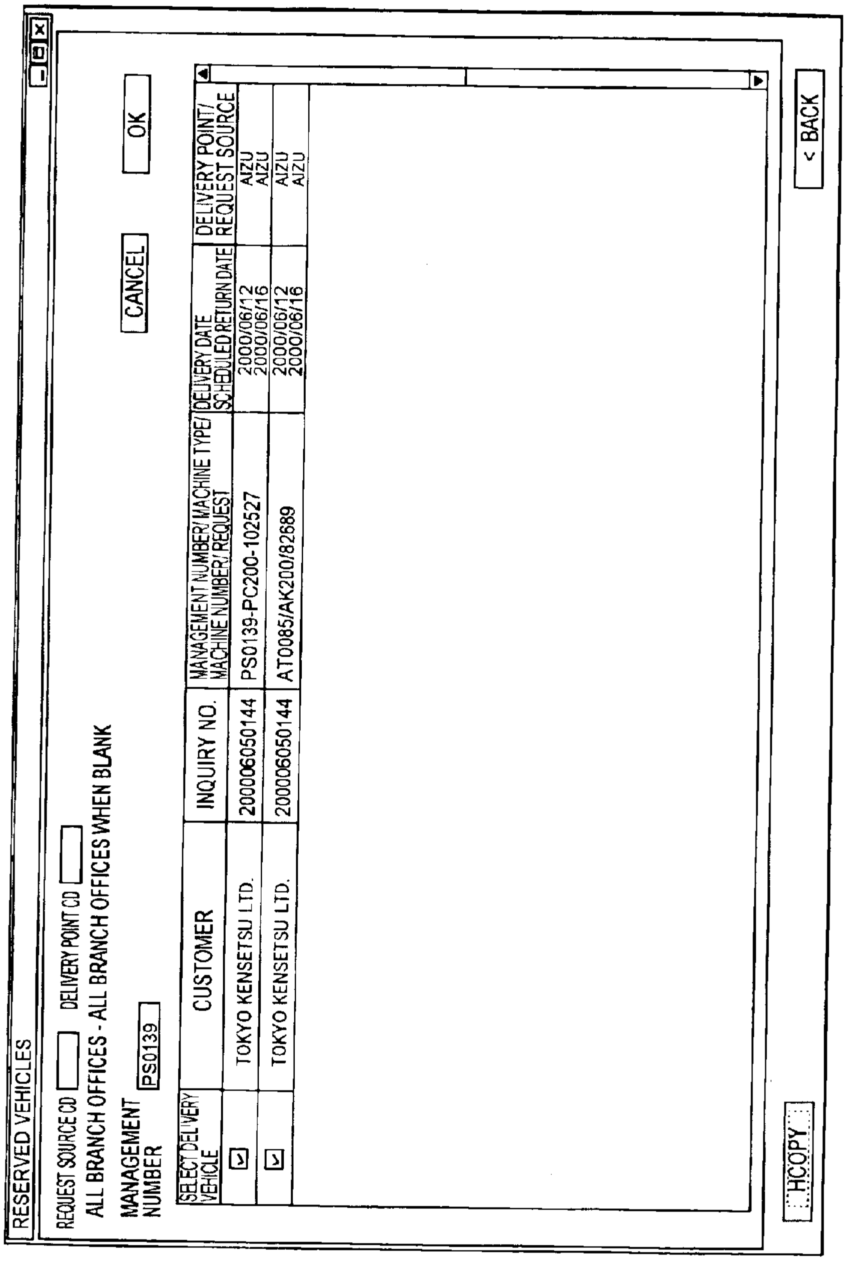
FIG. 38 shows a "Reserved vehicle" screen used in delivery processing.
Figure 39:
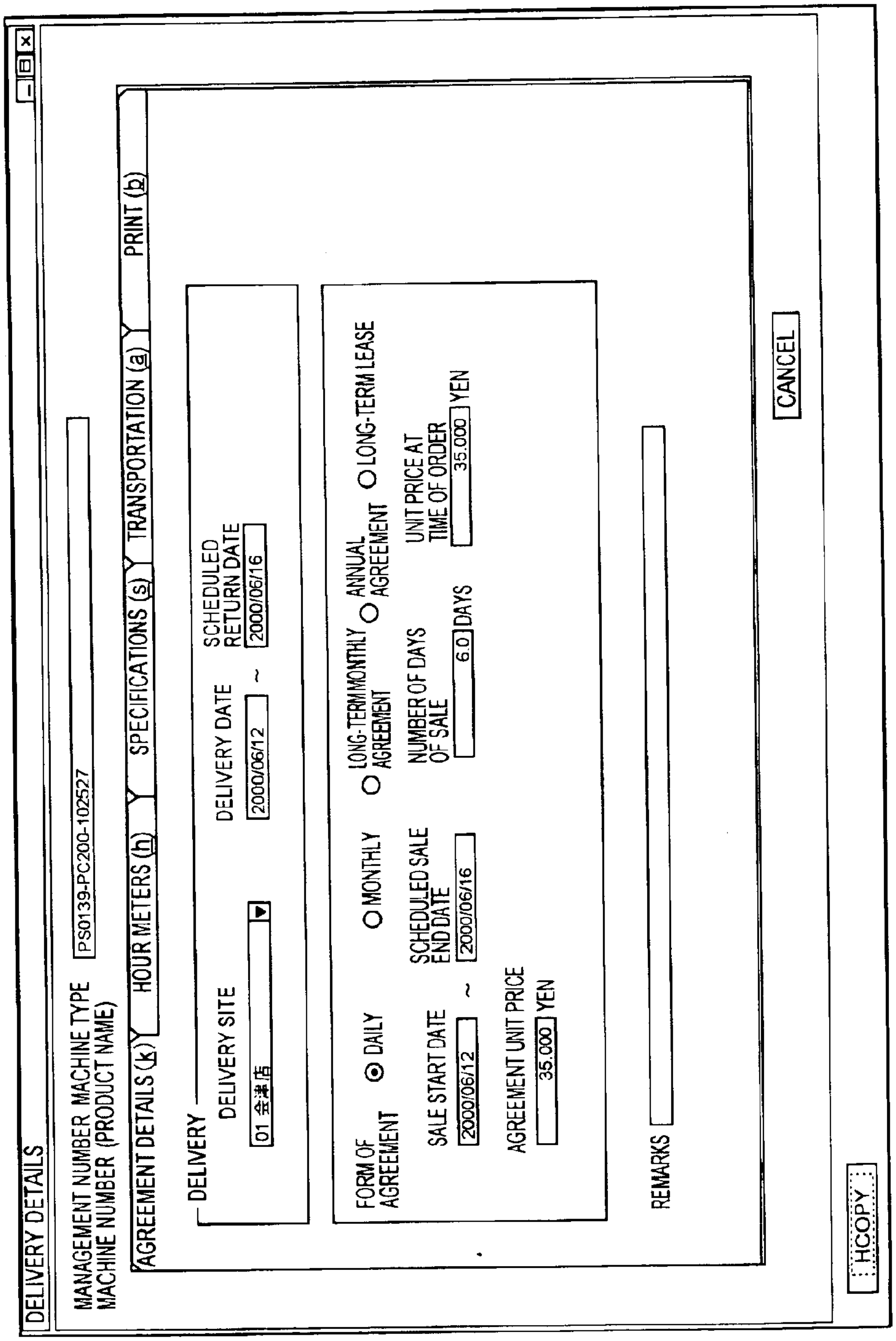
FIG. 39 shows a "Delivery details" screen used in delivery processing.
Figure 40:
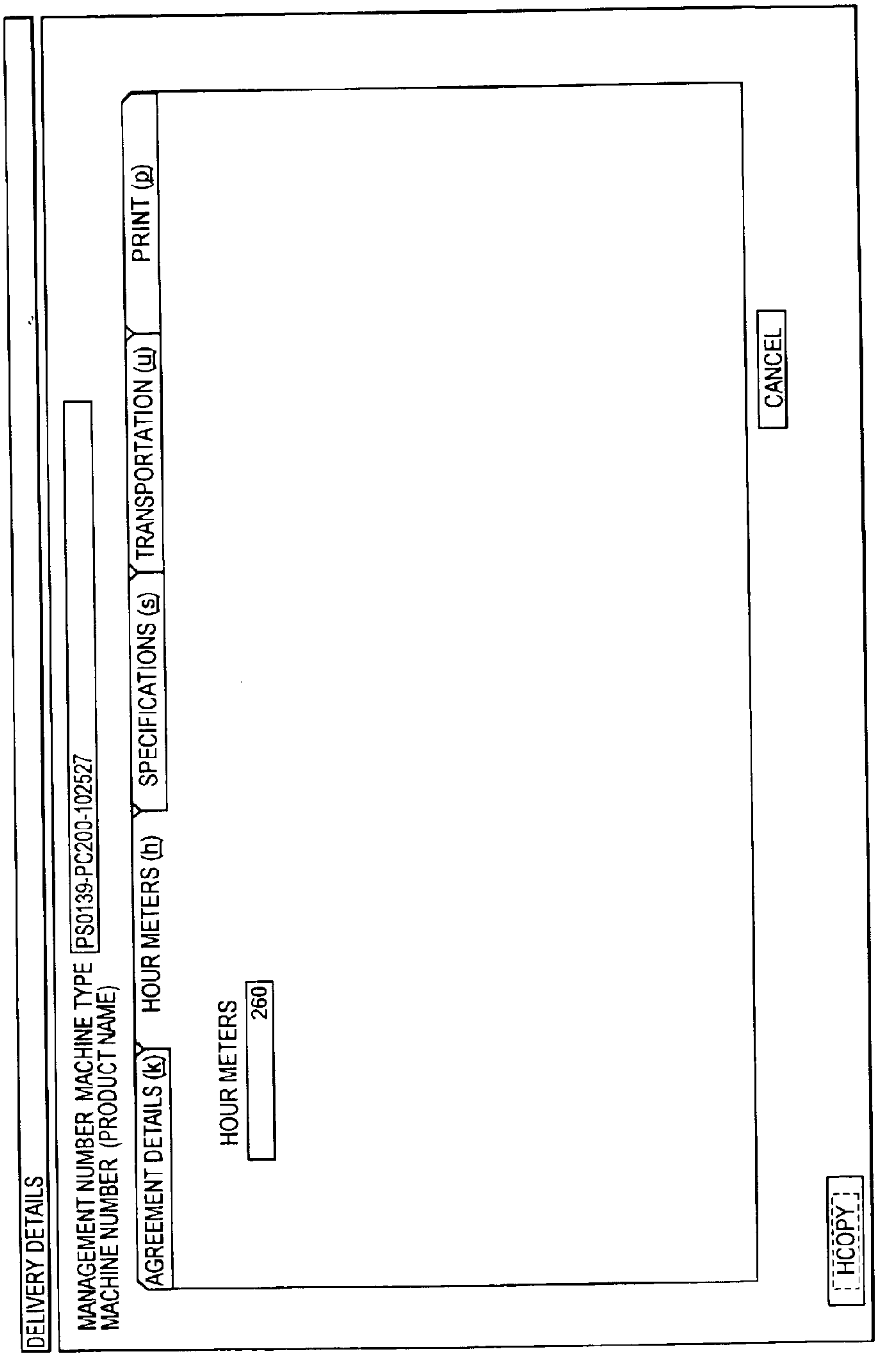
FIG. 40 shows a "Delivery details" screen used in delivery processing.
Figure 41:
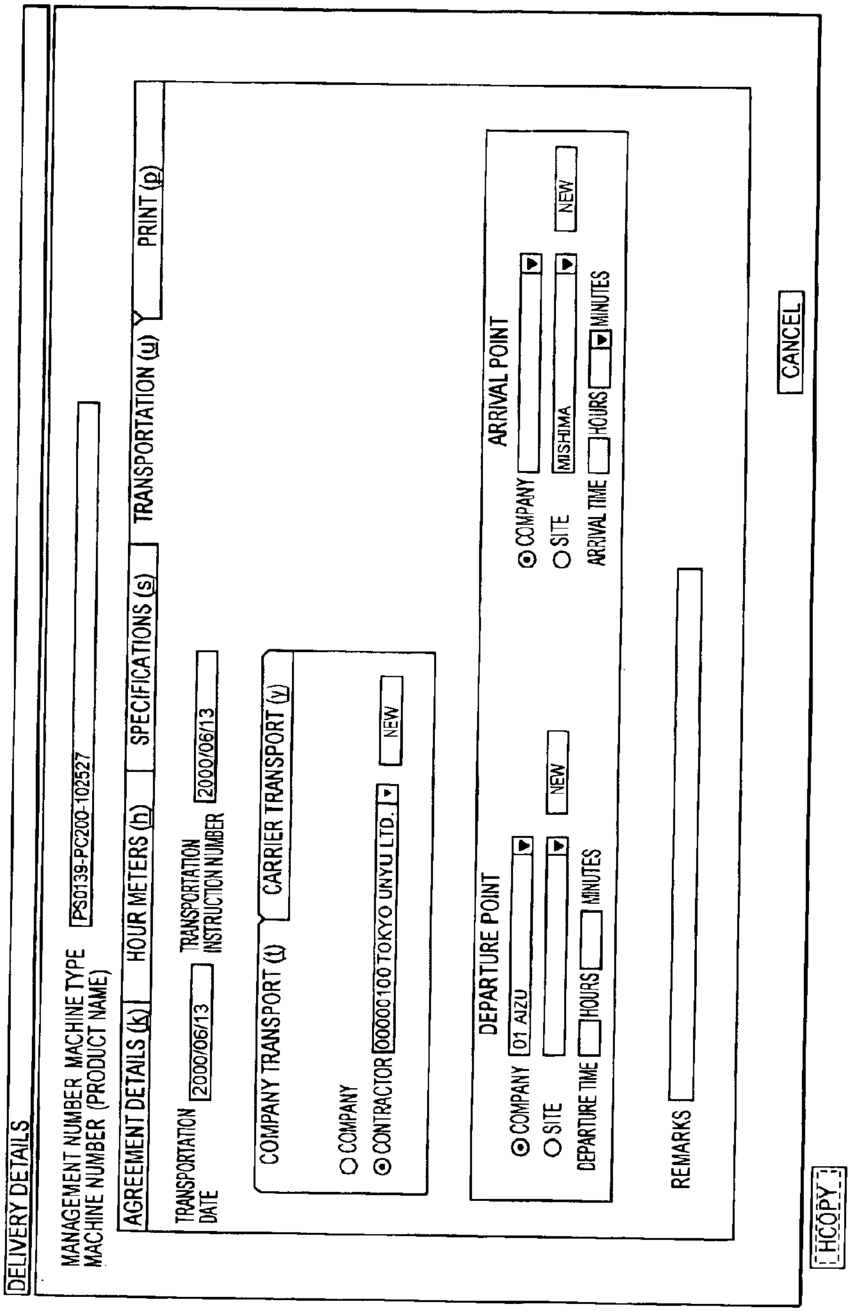
FIG. 41 shows a "Delivery details" screen used in delivery processing.
Figure 42:
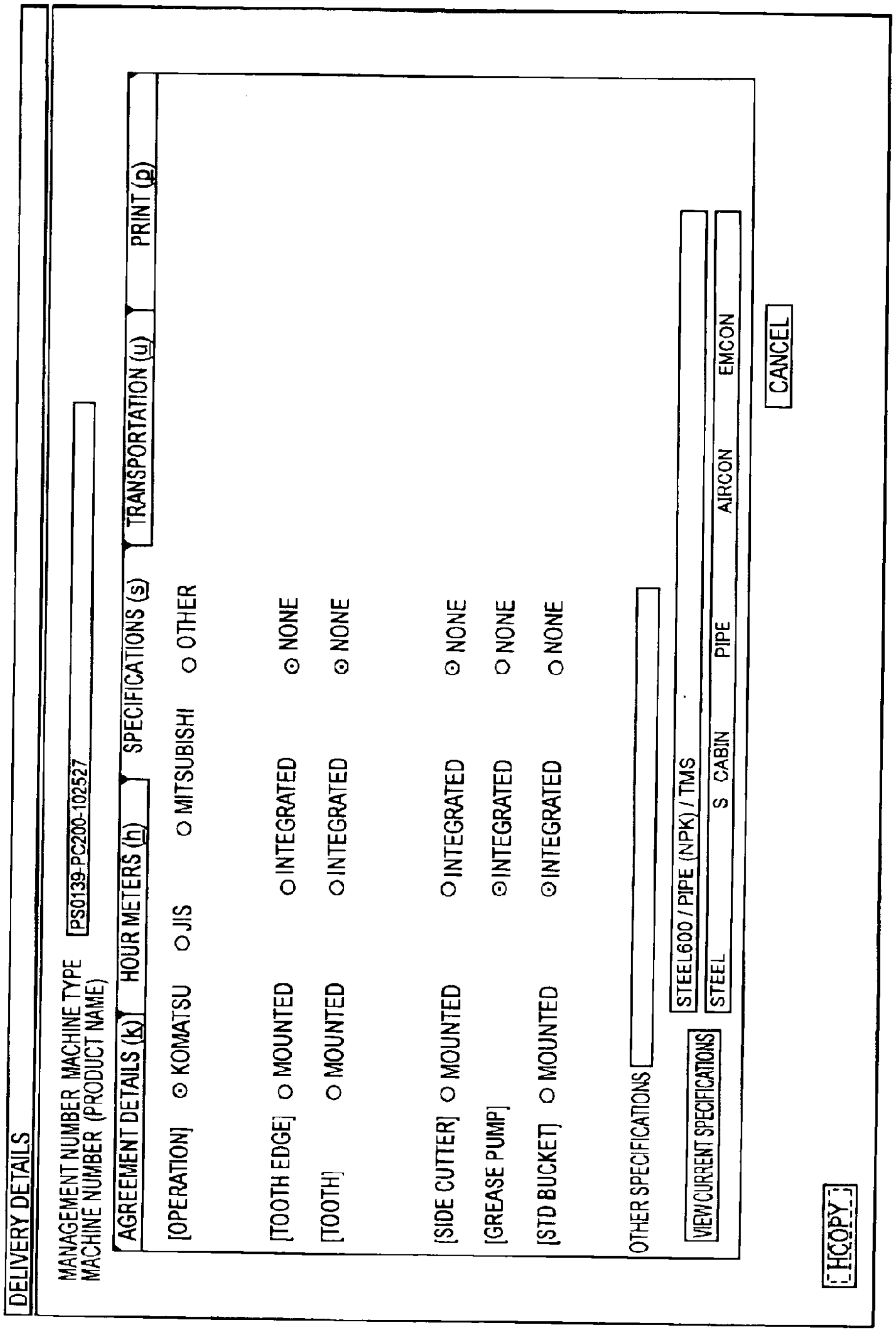
FIG. 42 shows a "Delivery details" screen used in delivery processing.

In step S180 of FIG. 35, the branch store operator sequentially clicks on "Order/inquiry Delivery Warehousing" and "Delivery input" in the menu screen shown in FIG. 16 of the computer terminal, whereby the delivery input screen shown in FIG. 37 is displayed, and clicks on "Add from reserved vehicles" in this screen, whereby the "Reserved vehicles" screen shown in FIG. 38 is displayed (with the entry fields blank), and then enters the delivery point code (delivery point CD) as the search condition in this "Reserved vehicles" screen. Then, in step S181, the system extracts the reservation (inquiry) records which conform to the inputted search condition from the basic inquiry information table 125 and inquiry details table 126, and displays these records as shown in FIG. 38.

Next, in step S182, the operator selects the reservation for which delivery is desired, on the "Reserved vehicles" screen, and clicks on "OK". Then, in step S182, the system reads out detailed information of the selected reservation from the basic inquiry information table 125 and inquiry details table 126, and displays this information in the "Delivery details" screens as shown in FIGS. 39 to 43.

Next, in step S184, the operator confirms the detailed information of the reservation in the "Delivery details" screens of FIGS. 39 to 43 and, according to requirements, updates this detailed information by inputting new information therein. Then, in step S185, the system adds the inputted information to the record of this reservation in the basic inquiry information table 125 and inquiry details table 126, and, in step S186, creates a delivery record on the basis of the record of this reservation in the basic inquiry information table 125 and inquiry details table 126, and registers this delivery record in the basic warehousing/delivery information table 132 and the delivery table 133. Step S187 in FIG. 36 then follows, whereupon the system creates the provisional sales data and registers this data in the provisional sales table 140.

Figure 44:
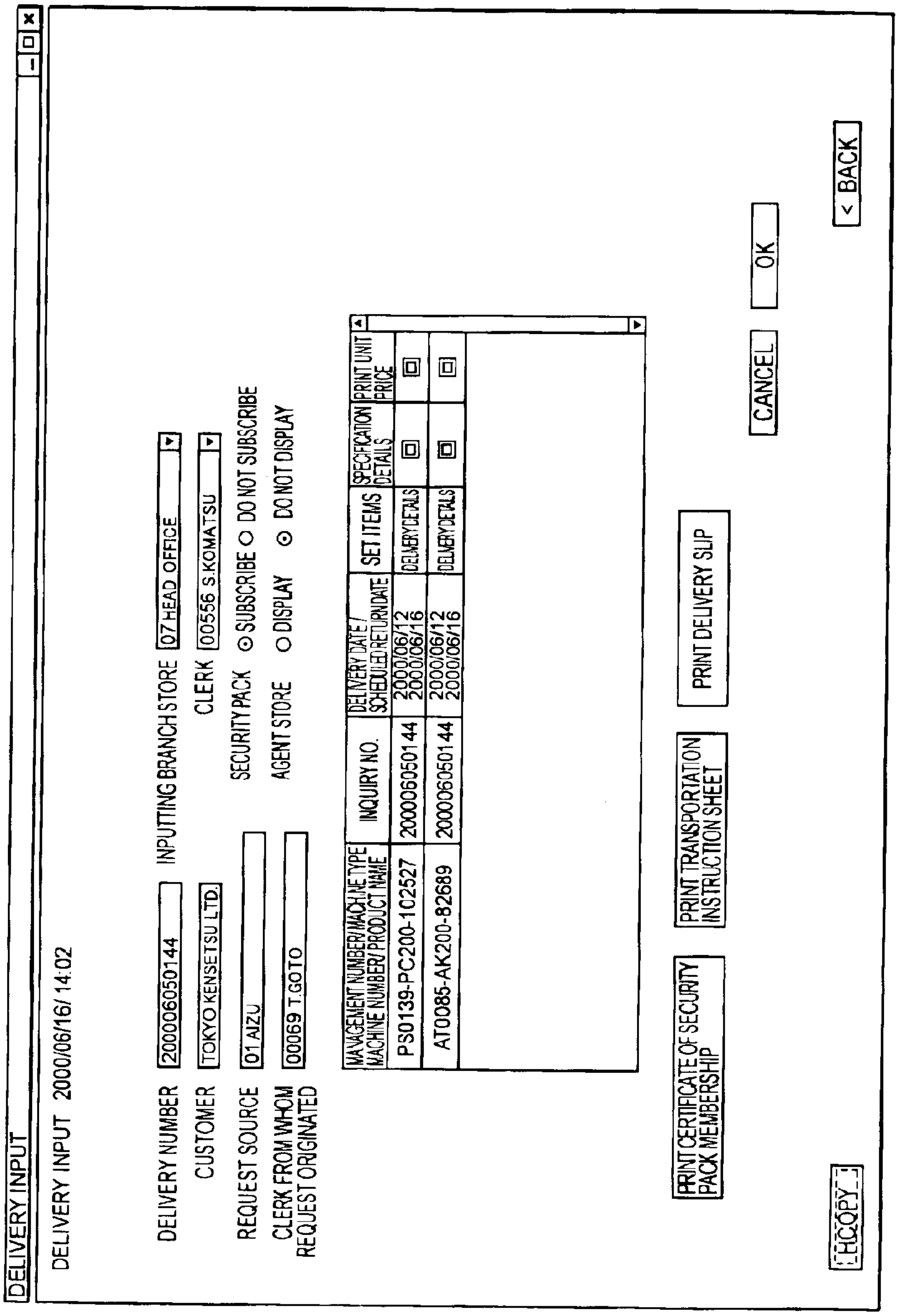
FIG. 44 shows a "Delivery input" screen used in delivery processing.
Figure 44:
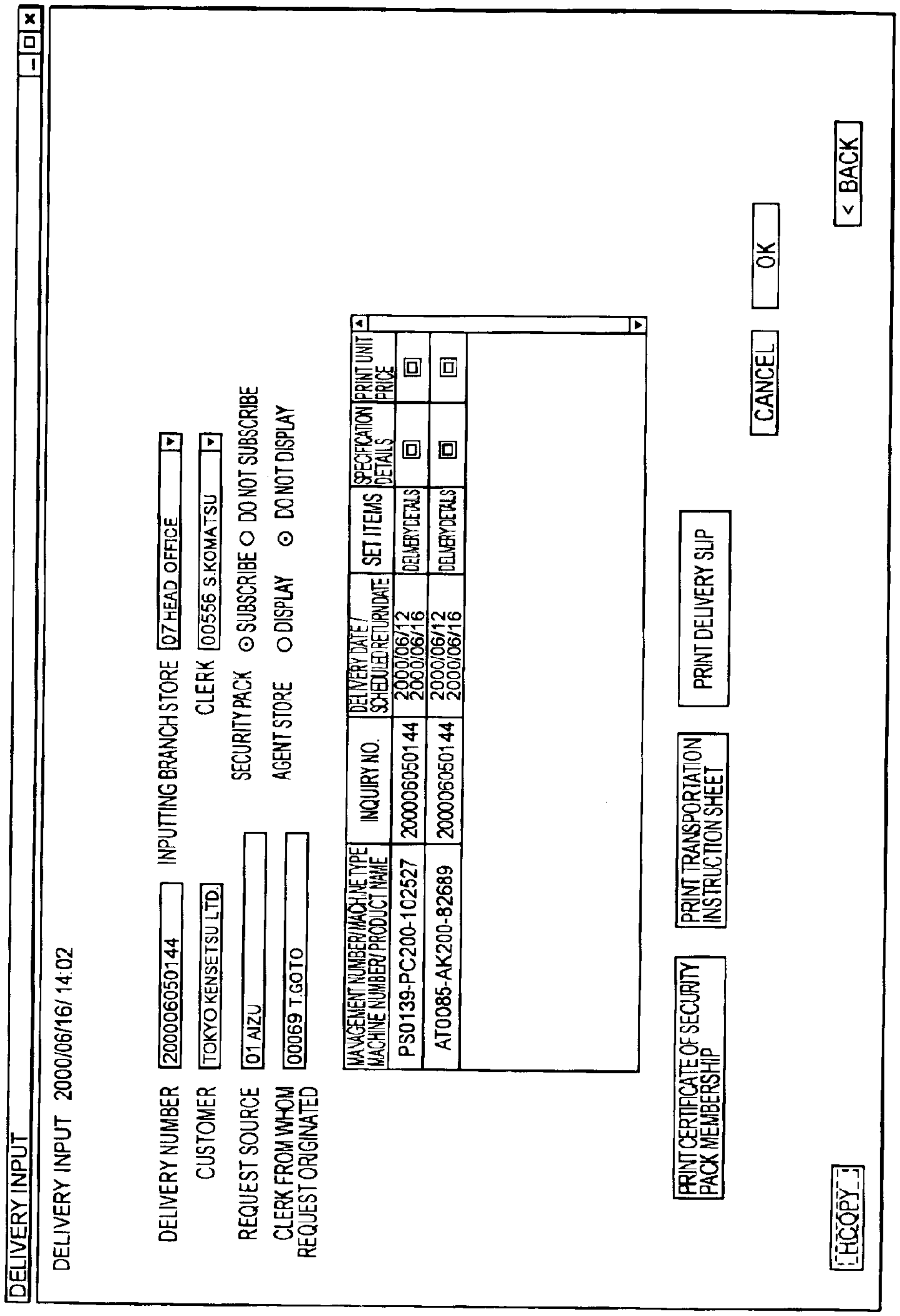

Then, in step S188, when the operator clicks on "Back" on the "Delivery details" screens of FIGS. 39 to 43 to return to the "Reserved vehicles" screen of FIG. 38, and clicks on "Back" on the "Reserved vehicles" screen to return to the "Delivery input" screen, because the contents of the delivery record are displayed in the "Delivery input" screen as shown in FIG. 44, the operator confirms these contents and then clicks on "Print delivery slip". Next, in steps S189 to S190, the system prints the delivery slip through reference to this delivery record.

Figure 45:
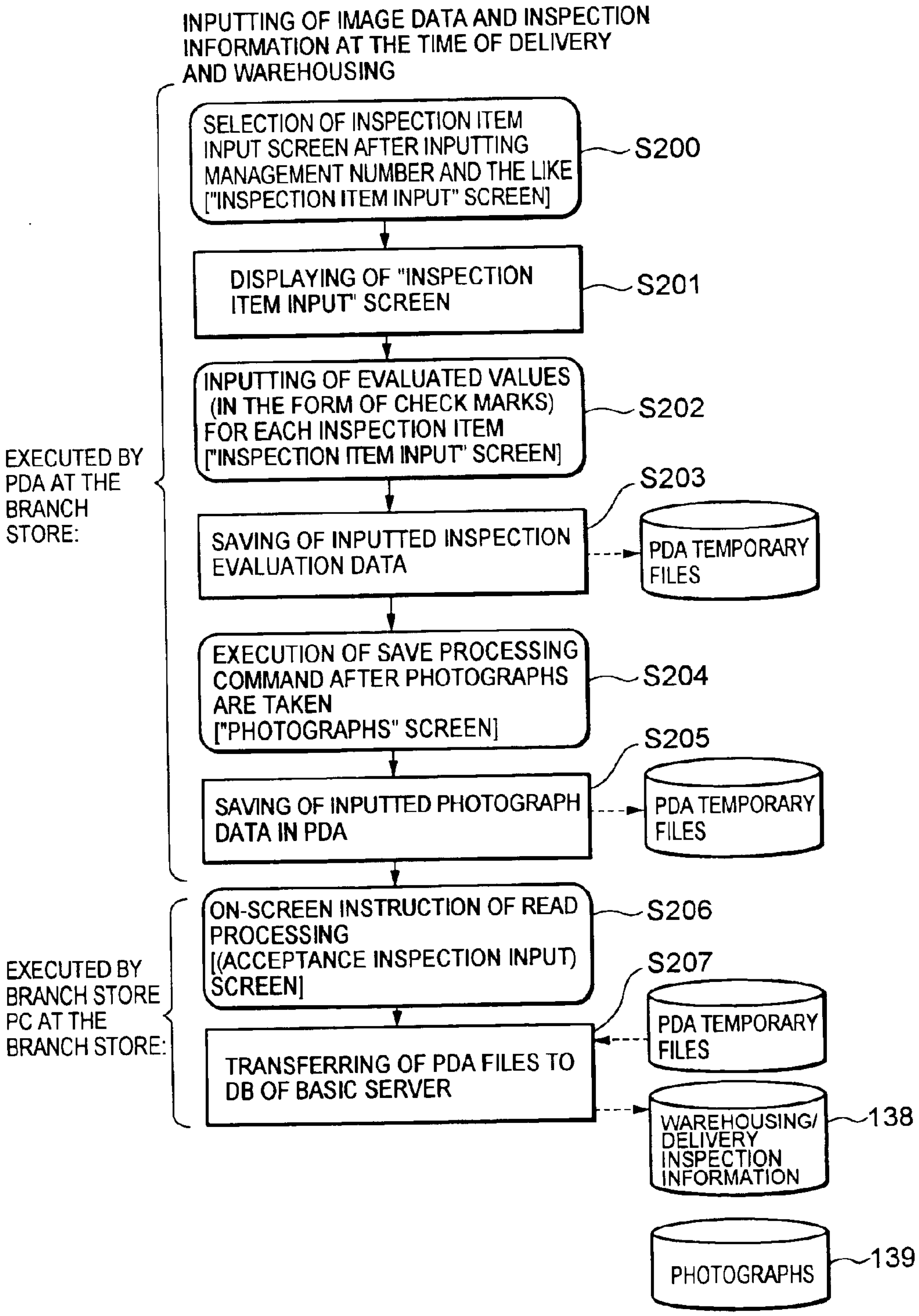
FIG. 45 is a flowchart showing the flow of "inputting of image data and inspection information" processing at the time of delivery and warehousing, of steps S11 and S12 in FIG. 4 respectively.

FIG. 45 shows the flow of "inputting of image data and inspection information" processing at the time of delivery and warehousing, of steps S11 and S12 in FIG. 4 respectively. FIGS. 46 to 50 show PDA user interface screens used in this processing.

Figure 46:
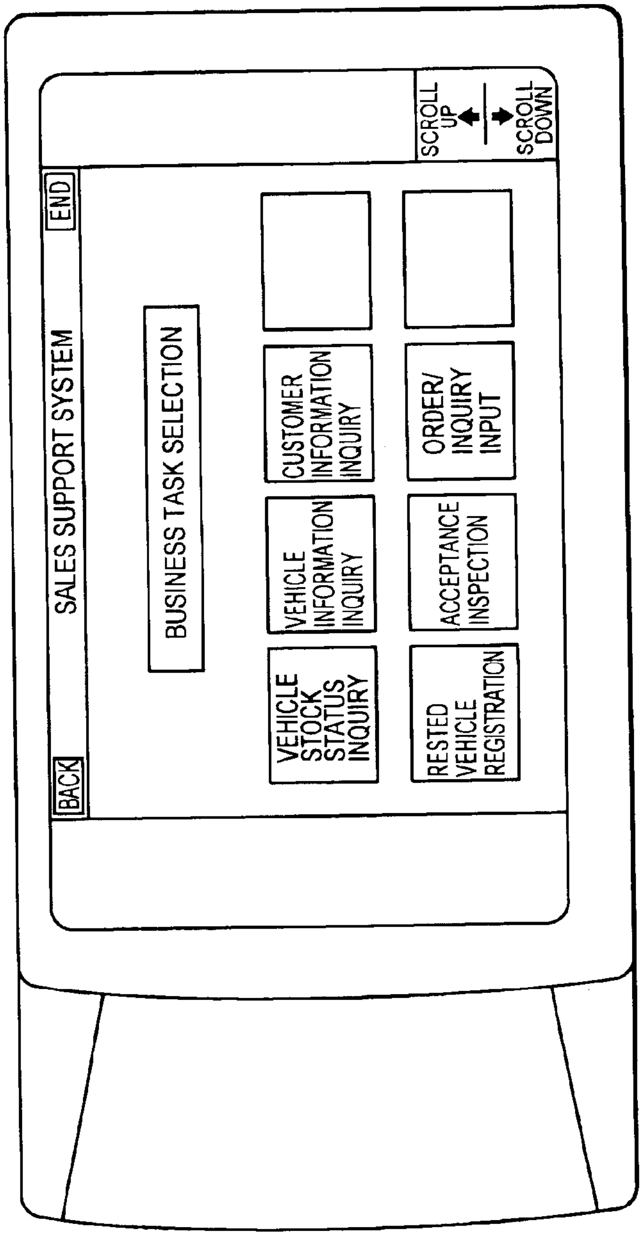
FIG. 46 shows a PDA menu screen for accessing "inputting of image data and inspection information" processing.
Figure 47:
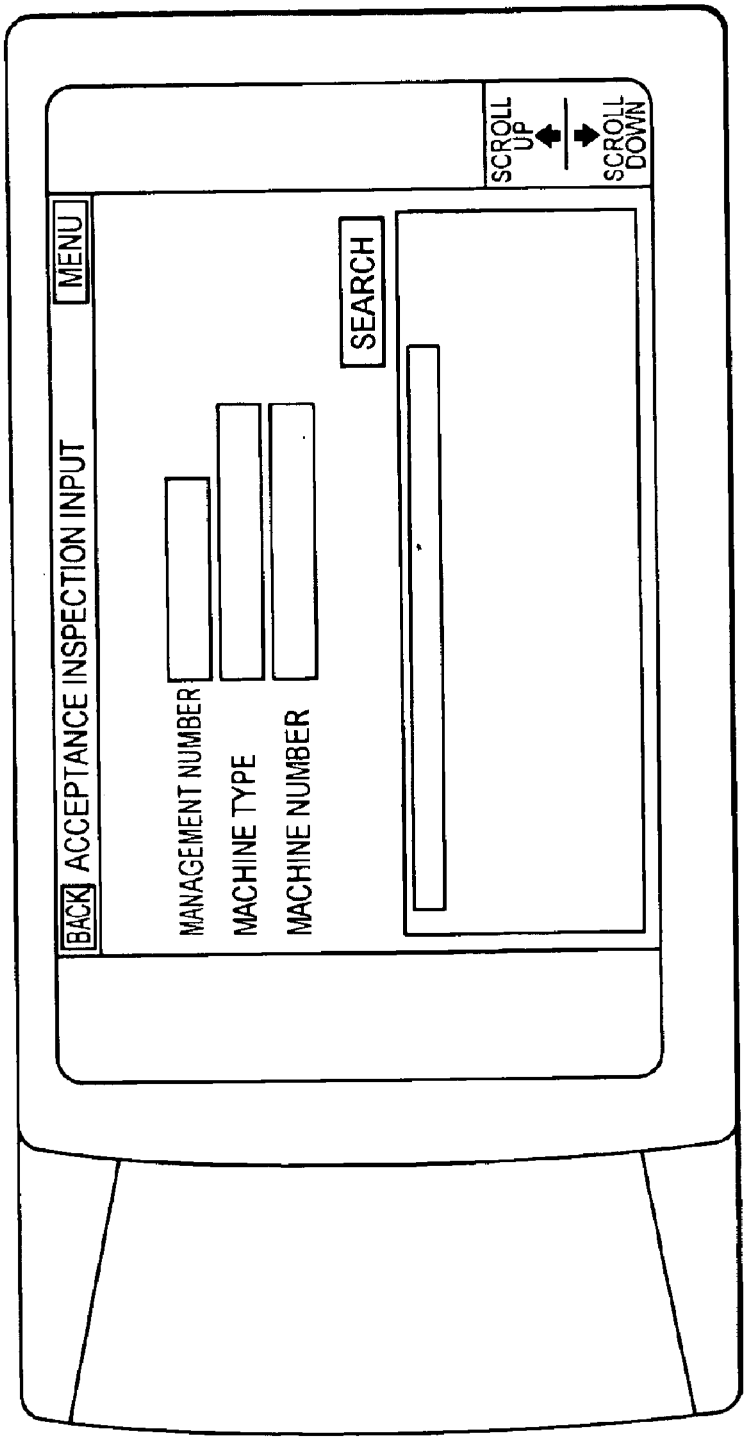
FIG. 47 shows an "Acceptance inspection input" screen used in "inputting of image data and inspection information" processing.
Figure 48:
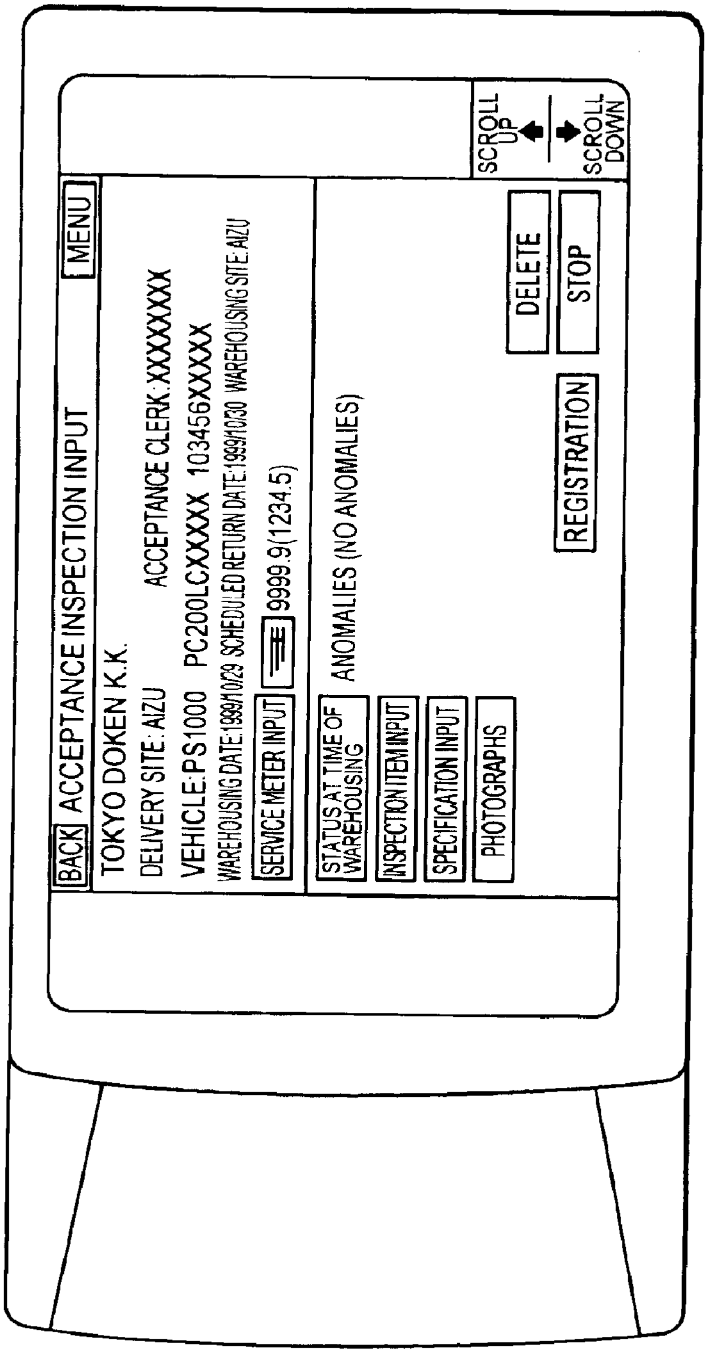
FIG. 48 shows an "Acceptance inspection input" screen used in "inputting of image data and inspection information" processing.

First, the branch store inspector takes a PDA equipped with a digital camera to the site of the vehicle to be inspected, and, in step S200 of FIG. 45, runs the business application of the PDA, opens the menu screen as shown in FIG. 46, selects "Acceptance inspection" in the menu screen, opens the "Acceptance inspection input" screen shown in FIG. 47, enters the management number (or the machine type and machine number) of the vehicle to be inspected in the "Acceptance inspection input" screen, switches the "Acceptance inspection input" screen to the contents shown in FIG. 48, and then selects "Inspection item input" in the "Acceptance inspection input" screen of FIG. 48.

Figure 49:
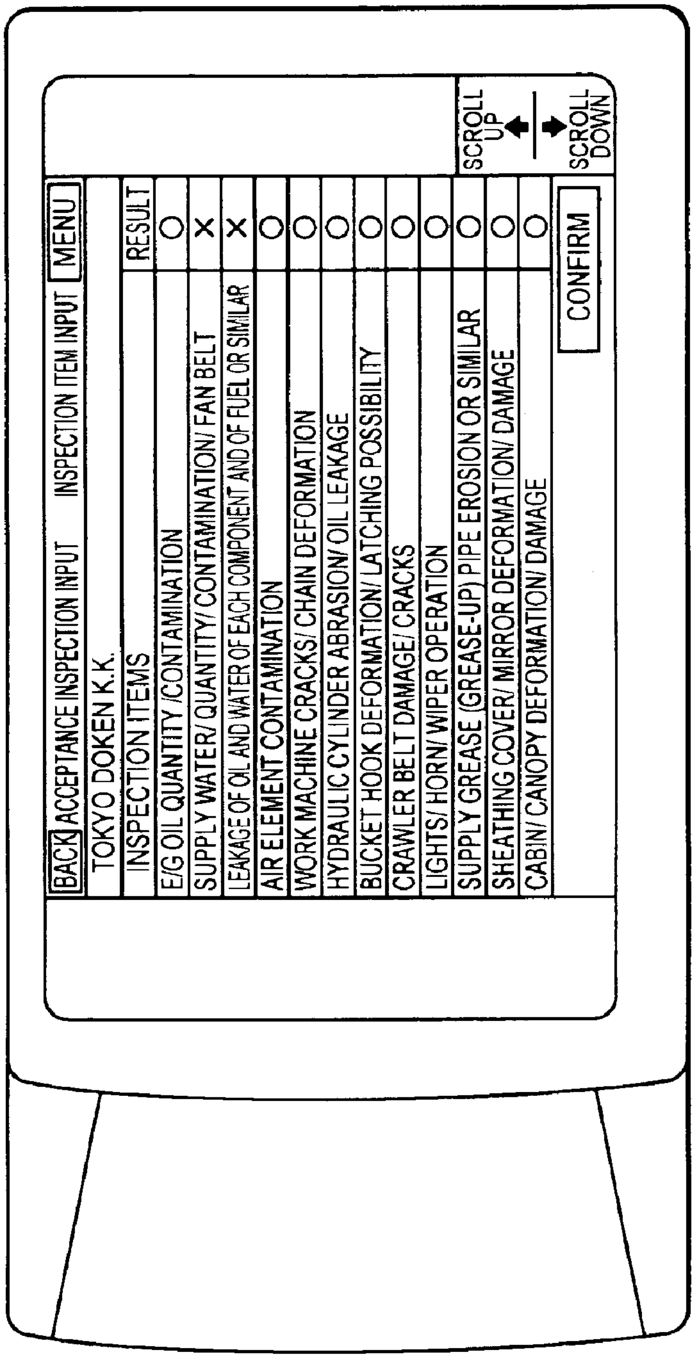
FIG. 49 shows an "Inspection item input" screen used in "inputting of image data and inspection information" processing.

Thereupon, in step S201, the PDA then displays the "Inspection item input" screen shown in FIG. 49, and hence, in step S202, the inspector inspects the vehicle with respect to each inspection item, enters the evaluation result of each inspection item in the "Inspection item input" screen with either a circle or a cross, and selects "Confirm". Then, in step S203, the PDA stores evaluation data for inputted inspection results as a PDA temporary file.

Figure 50:
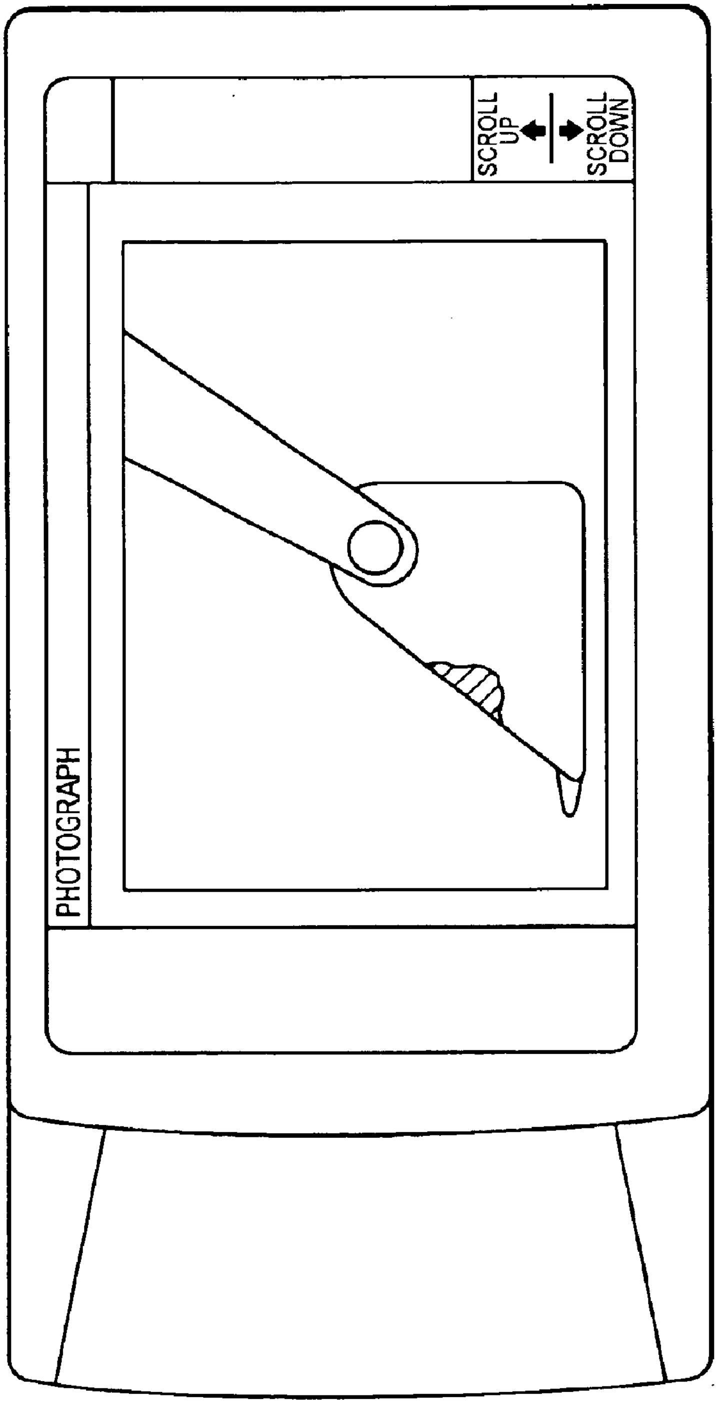
FIG. 50 shows a "Photograph" screen used in "inputting of image data and inspection information" processing.

Next, in step S204, the inspector opens the photograph screen shown in FIG. 50 by reverting the PDA screen to the "Acceptance inspection input" screen of FIG. 48 and selecting "Photographs", and uses the digital camera accompanying the PDA to take photographs of the important points of the vehicle being inspected. Thereupon, instep S205, the PDA displays the digital photographs which have been taken on the photograph screen as shown in FIG. 50, and stores these photographs as PDA temporary files.

When inspection inputting to the PDA is complete, in step S206, the inspector connects the PDA to a branch store computer terminal and, by reverting the PDA screen to the "Acceptance inspection input" screen in FIG. 48 and selecting "Register", the evaluation data of the inspection results and photograph data, which are stored as PDA temporary files, are transferred to the branch store computer terminal. Then, in step S207, the system creates an inspection information record on the basis of the evaluation data of the inspection results, registers this inspection information record in the warehousing/delivery inspection information table 138 and registers the photograph data in the photograph database 139 in a form in which this photograph data is linked to the inspection information record.

Figure 51:
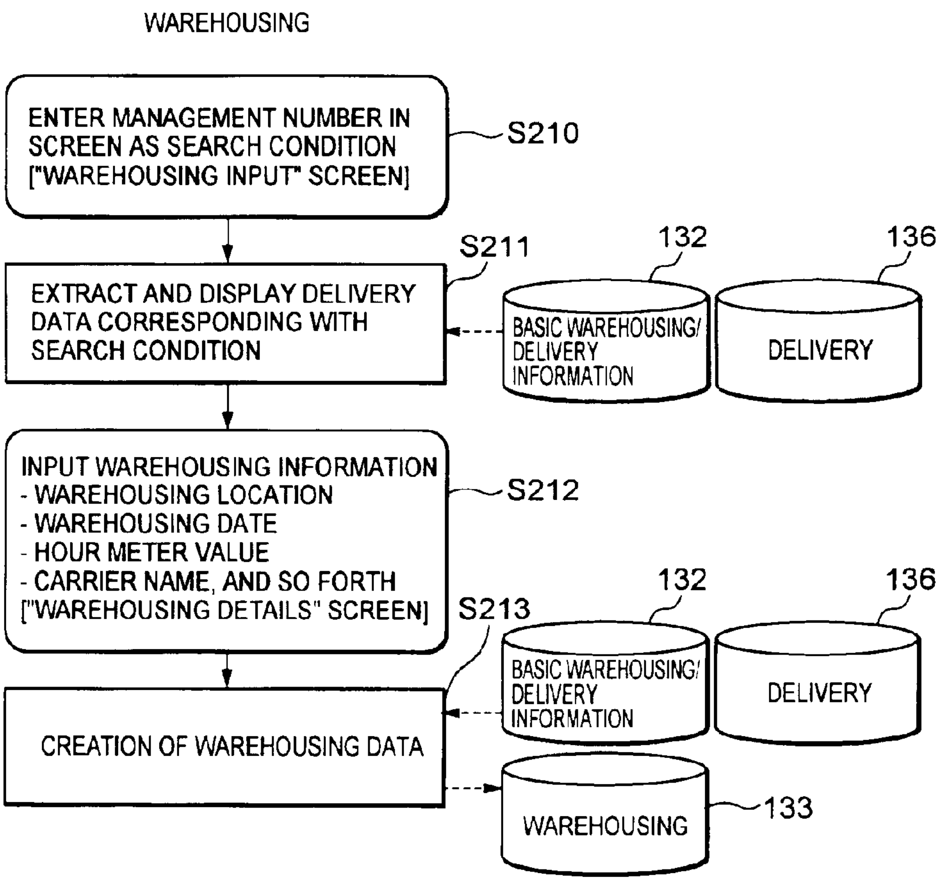
FIG. 51 is a flowchart showing the flow of the "warehousing" processing of step S13 in FIG. 4.

FIG. 51 shows the flow of the "warehousing" processing of step S13 in FIG. 4. FIGS. 52 to 57 show user interface screens which are used in this processing.

Figure 52:
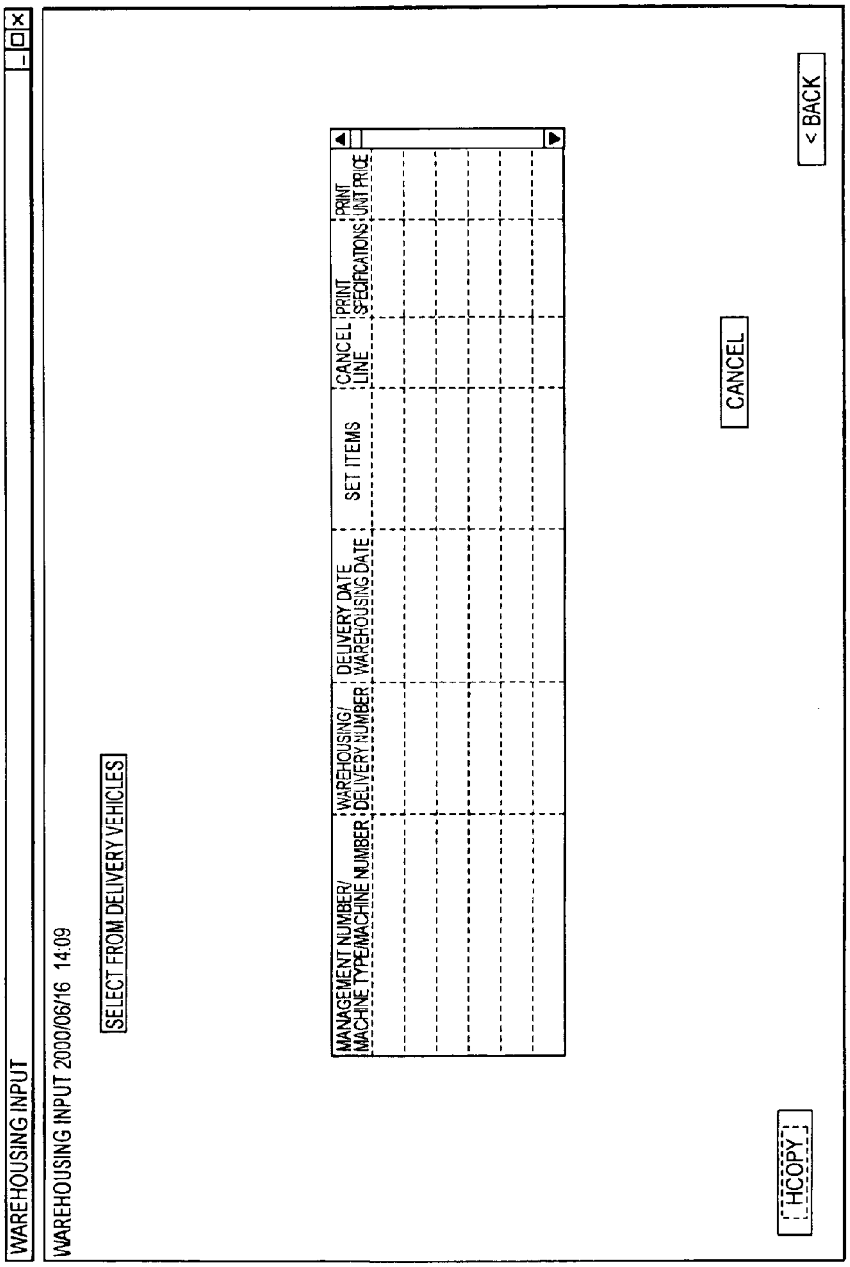
FIGS. 52 to 57 show user interface screens which are used in this processing.

In step S210 in FIG. 51, the branch store operator sequentially clicks on "Order/inquiry Delivery Warehousing" and "Warehousing input" in the menu screen shown in FIG. 16 of the computer terminal, whereby the "Warehousing input" screen shown in FIG. 52 is displayed, and enters the "management number" of the vehicle to be stored as the search condition in this screen. Then, in step S211, the system extracts delivery records that conform to the inputted search condition from the basic warehousing/delivery information table 132 and the delivery table 136, and displays these records in the "Warehousing details" screen as shown in FIGS. 53 to 56.

Figure 53:
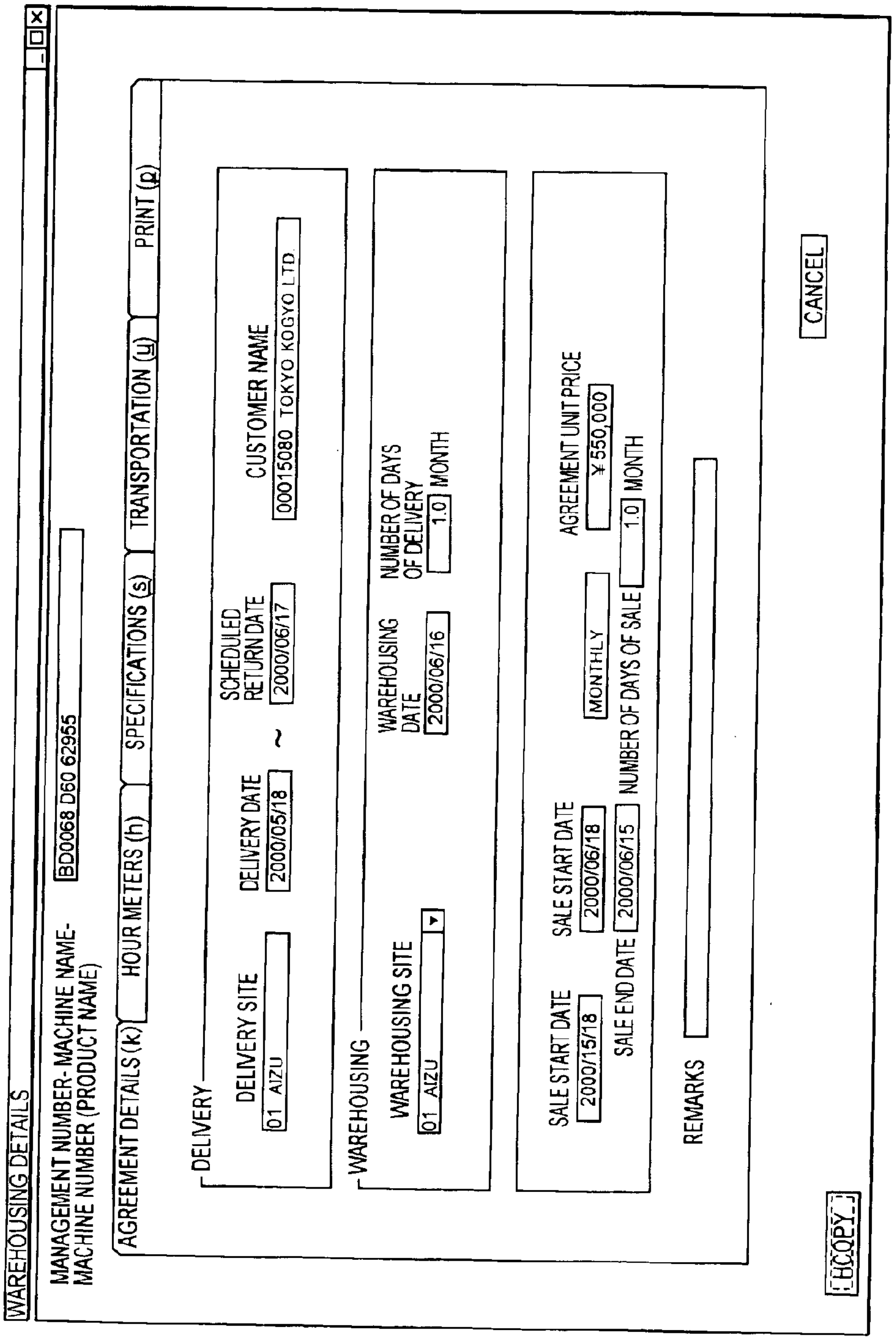
Figure 54:
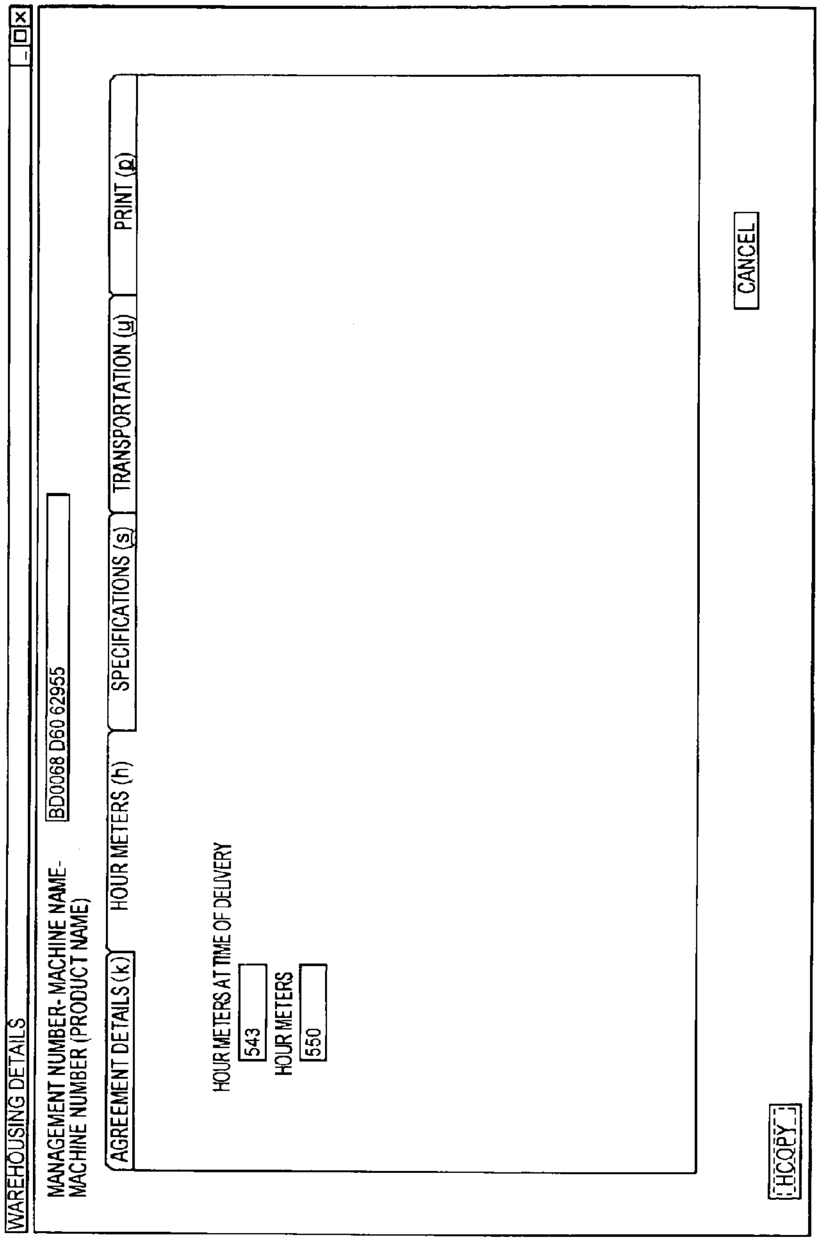
Figure 55:
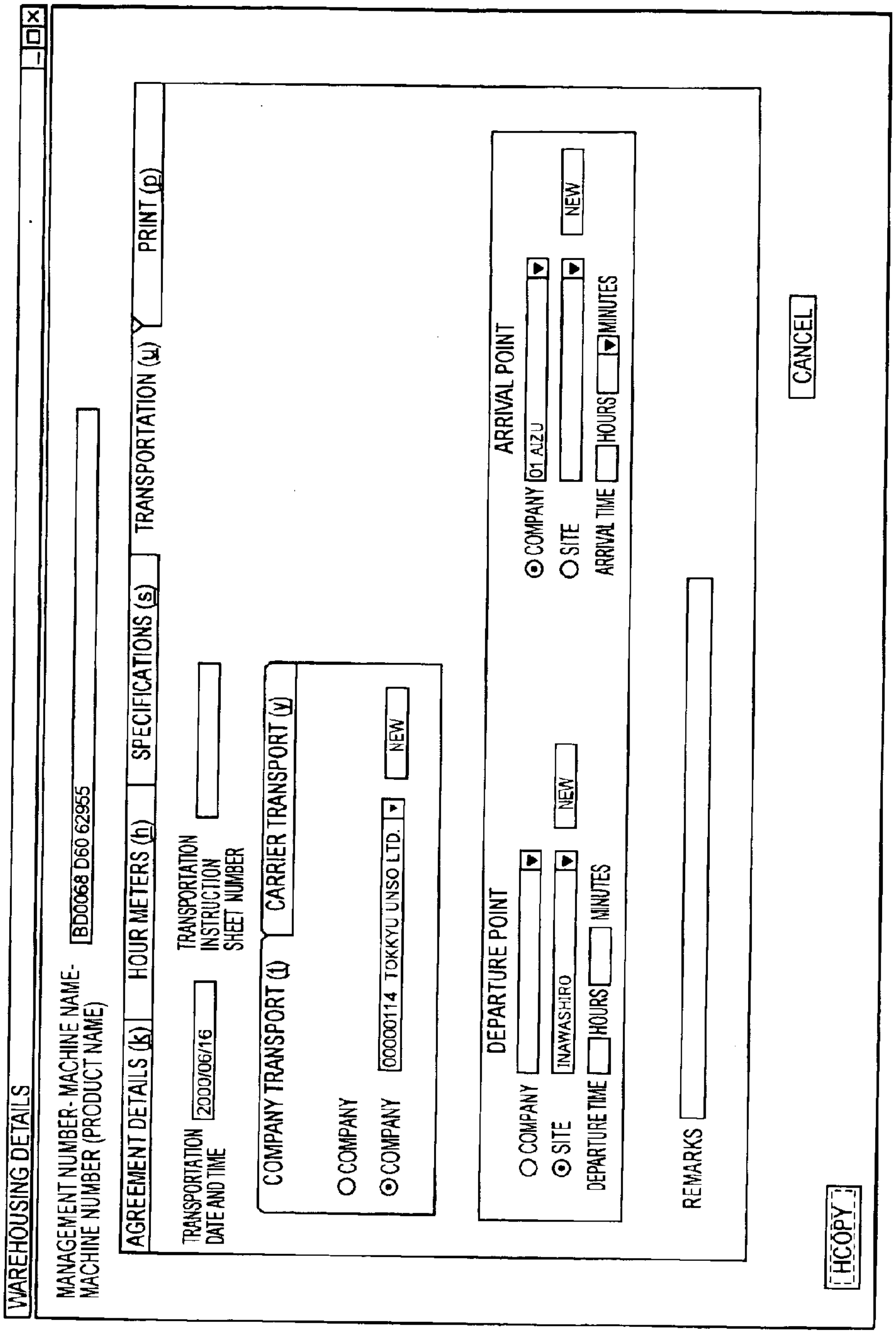
Figure 56:
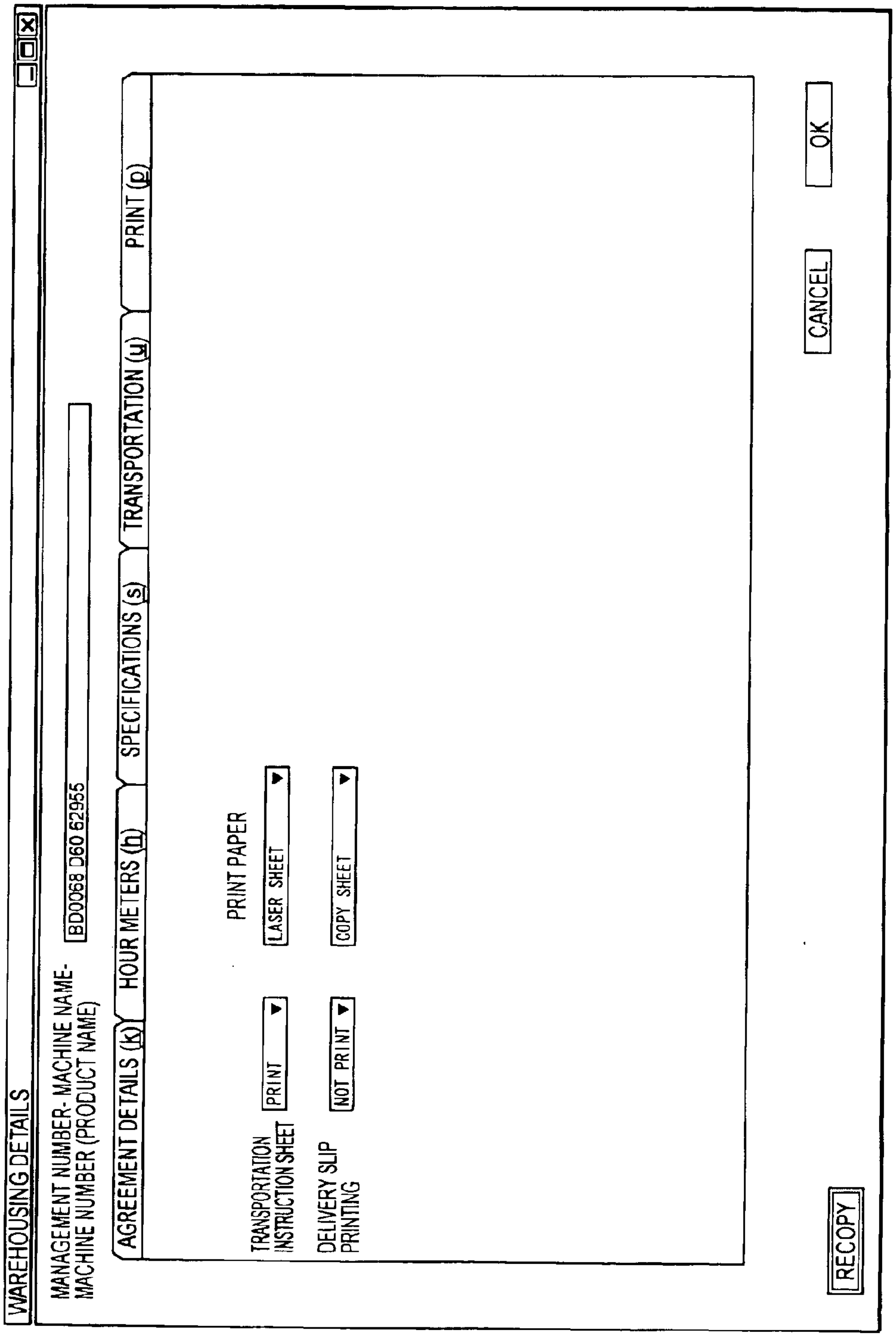

Next, in step S212, the operator enters warehousing information (such as the warehousing site, warehousing date, hour meter value, carrier name, for example) in the "Warehousing details" screens of FIGS. 53 to 55. Then, instep S213, the system creates warehousing data on the basis of the above-mentioned delivery record, which is read out from the basic warehousing/delivery information table 132 and the delivery table 136, as well as on the basis of the warehousing information entered in the "Warehousing details" screens, and registers this warehousing data in the warehousing table 133.

Figure 57:
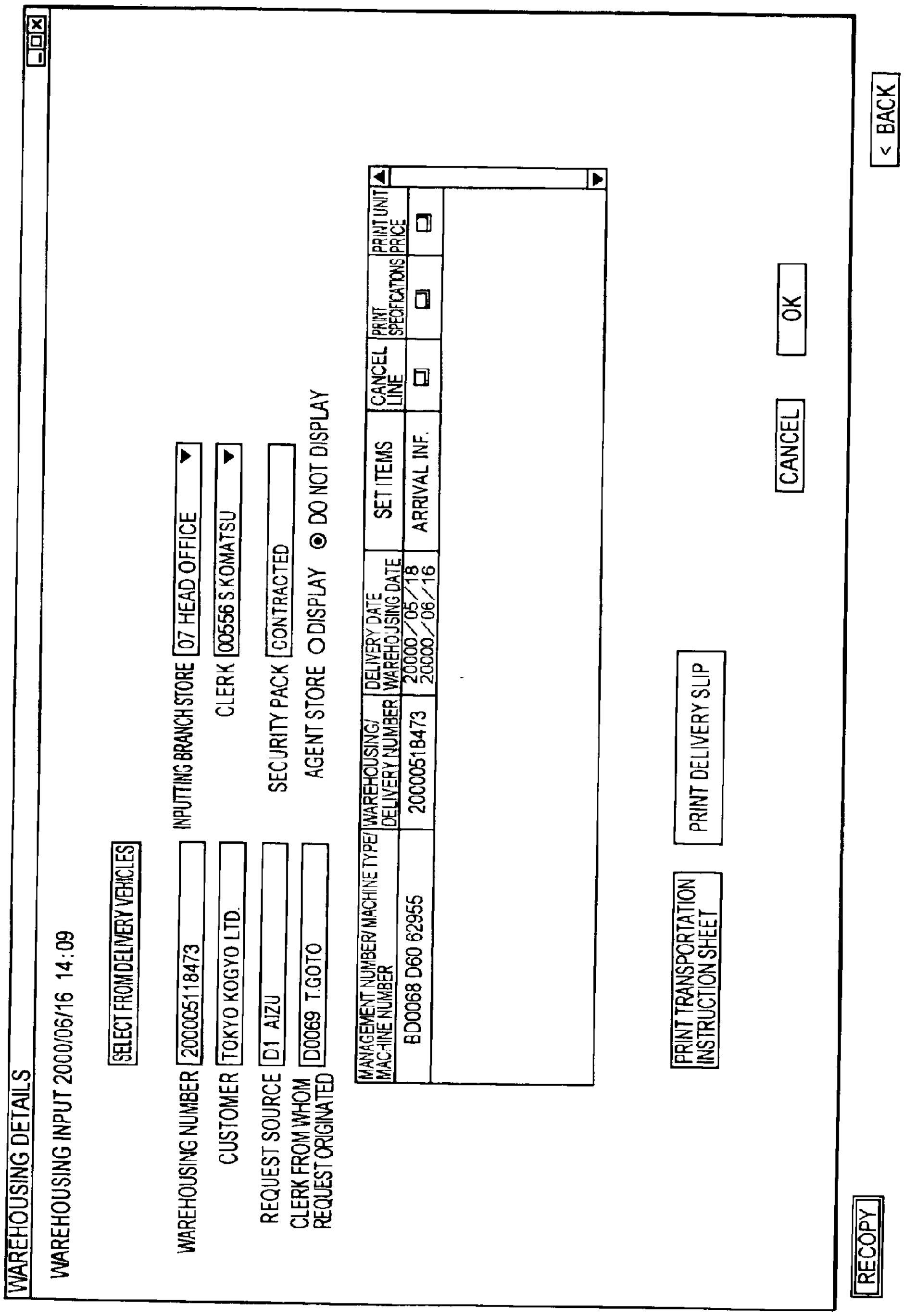

Thereafter, when the operator returns to the "Warehousing input" screen, the contents of the warehousing record are displayed in the "Warehousing input" screen, as shown in FIG. 57, and hence, upon confirming these contents and clicking on "Print warehousing slip", a warehousing slip is printed with reference to this warehousing record.

Figure 58:
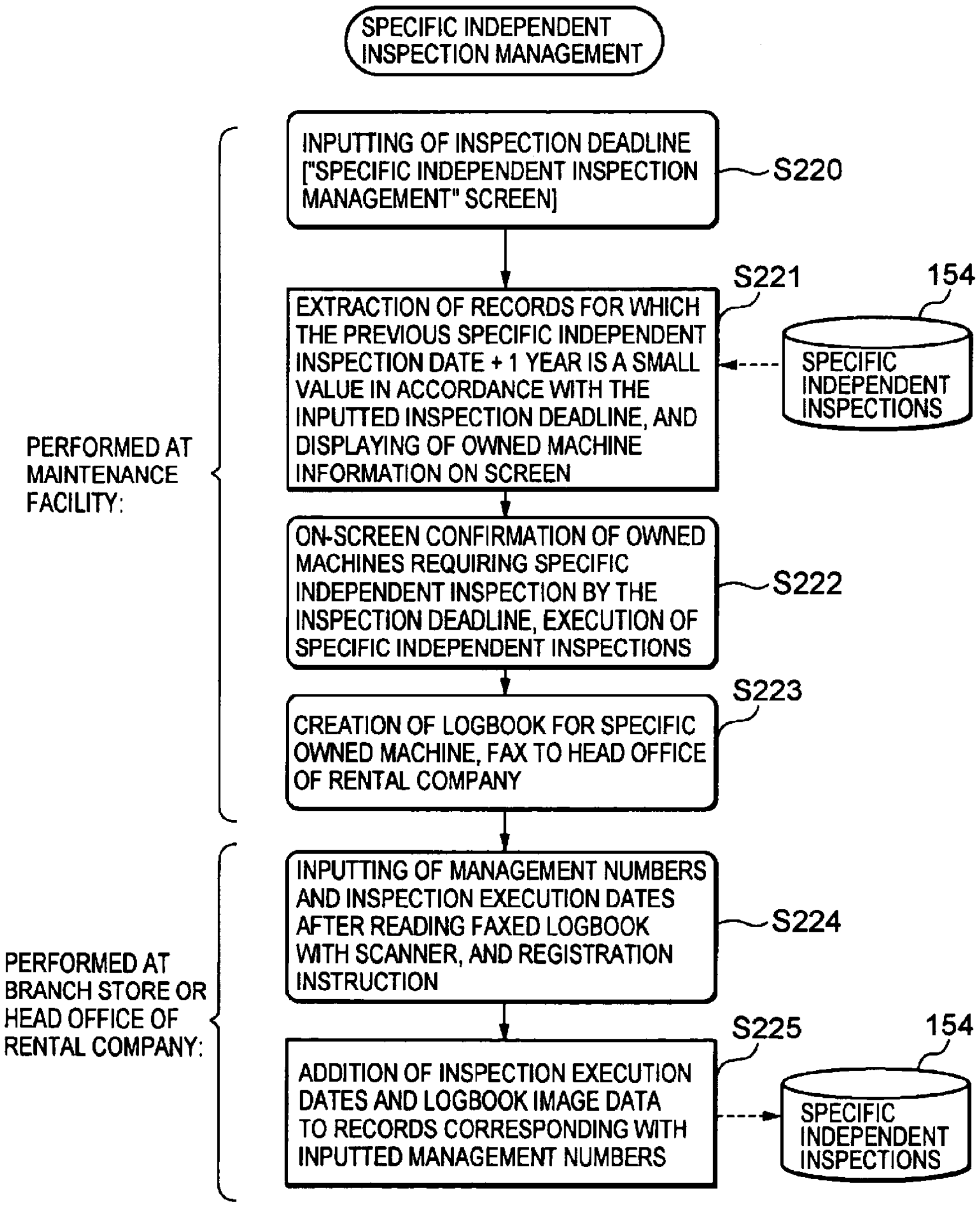
FIG. 58 is a flowchart showing the flow of the "specific independent inspection" processing of step S14 in FIG. 5.

FIG. 58 shows the flow of the "specific independent inspection" processing of step S14 in FIG. 5. FIGS. 59 to 62 show user interface screens used in this processing.

Figure 59:
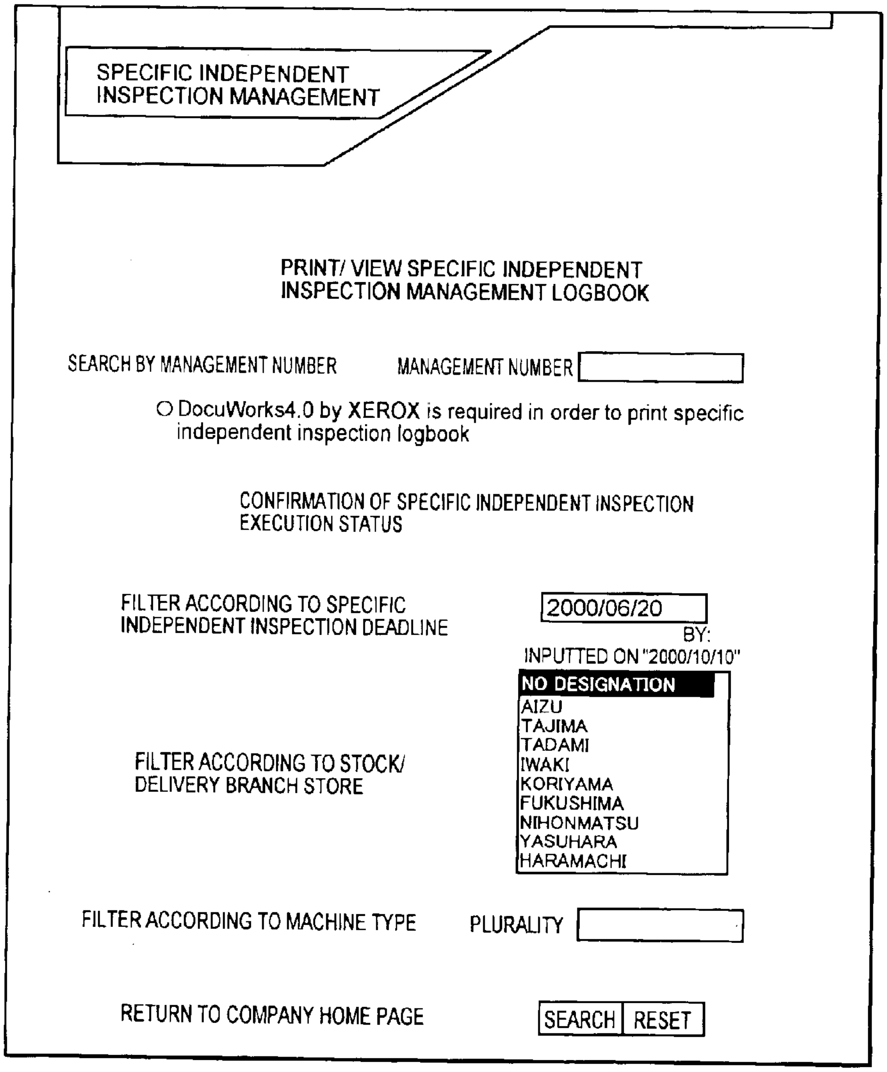
FIG. 59 shows a "specific independent inspection management" screen used in the specific independent inspection processing.

At a predetermined maintenance facility outside the company that performs specific independent inspections and maintenance, and so forth, for the vehicles (naturally, if this maintenance can be carried out within the rental company, the branch stores, head office, service plant, and the like, of the rental company, can also be used), first of all, in step S220 shown in FIG. 58, the operator displays the "Specific independent inspection management" screen shown in FIG. 59 on the computer terminal, enters the inspection deadline in this screen, and clicks on "Search". Then, in step S221, the system retrieves specific independent inspection records for those vehicles requiring a specific independent inspection by the inputted inspection deadline (that is, on dates one year after the previous specific independent inspection date which are before the inputted inspection deadline) from the specific independent inspection table 154 and displays these records in the "Specific independent inspection management" screen as shown in FIG. 60.

Figure 61:
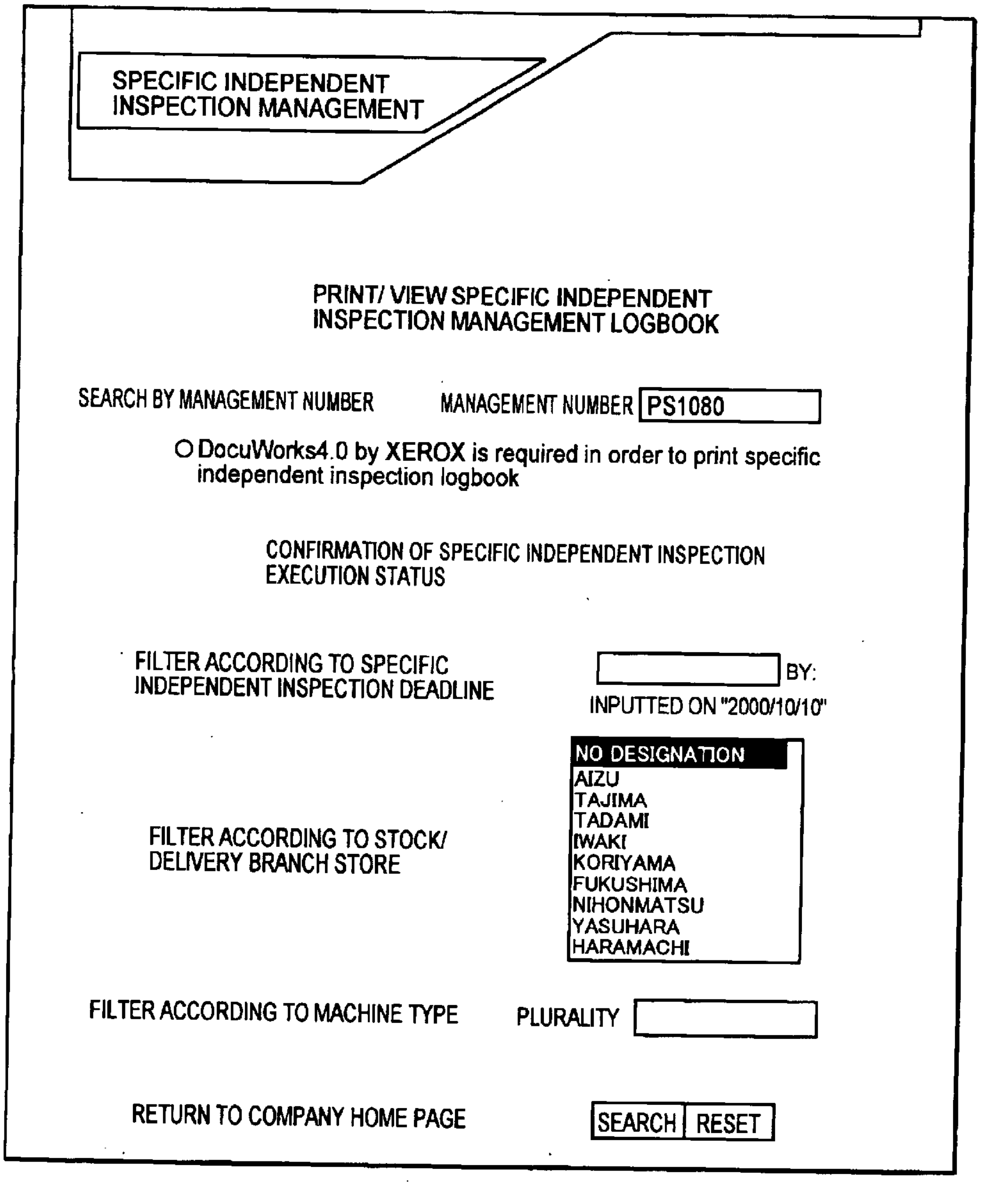
FIG. 61 shows a "specific independent inspection management" screen used in the specific independent inspection processing.
Figure 62:
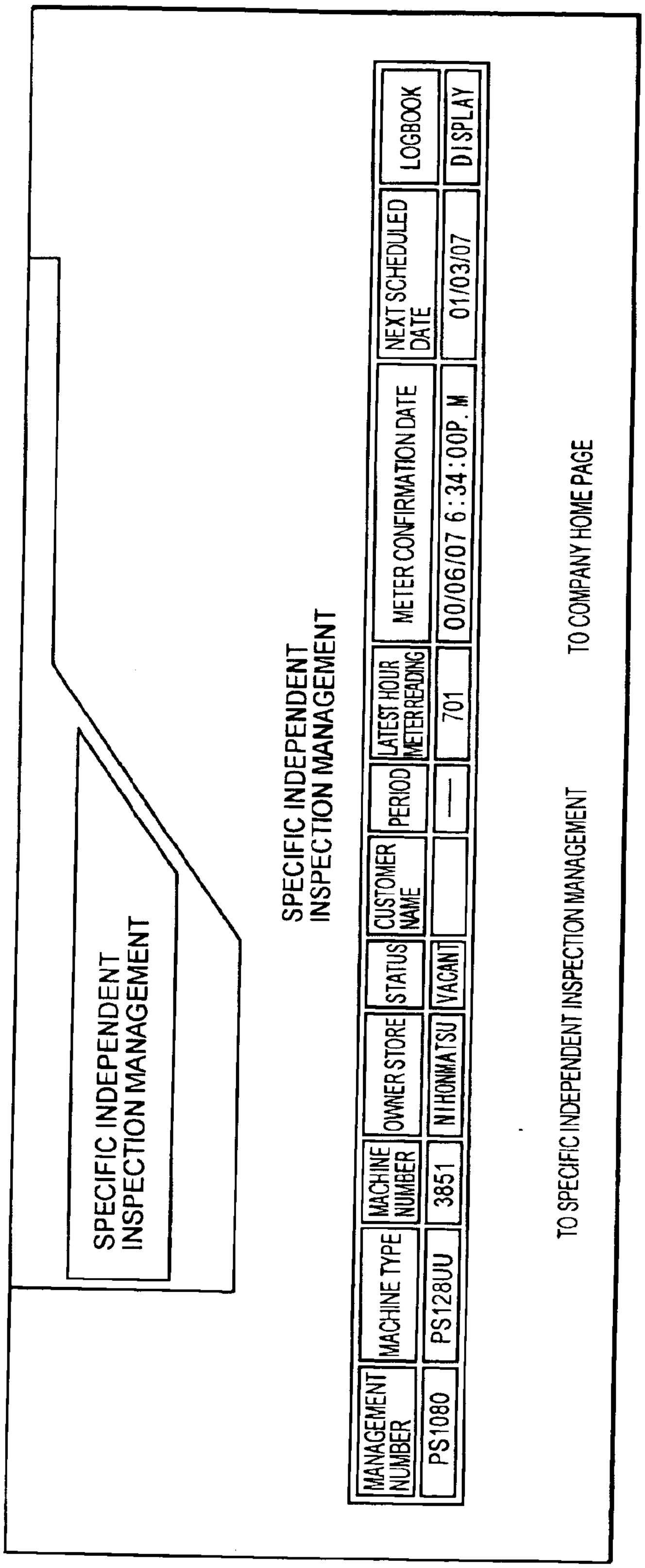
FIG. 62 shows a "specific independent inspection management" screen used in the specific independent inspection processing.

Alternatively, when a vehicle for inspection is specified from the start, the operator enters the management number of the vehicle in the "Specific independent inspection management" screen as shown in FIG. 61, and clicks on "Search", whereupon the system retrieves the specific independent inspection record which corresponds to this management number from the specific independent inspection table 154, and displays this record in the "Specific independent inspection management" screen as shown in FIG. 62.

When the specific independent inspection record of the vehicle to be inspected is thus displayed in the "specific independent inspection management" screen, next, in step S222, the maintenance facility carries out a specific independent inspection, by the inspection deadline, of the vehicle whose specific independent inspection record is displayed, creates a specific independent inspection logbook as designated by law in step S223, and transmits this logbook by facsimile to a branch store or the head office of the rental company.

At a branch store or the head office of the rental company, in step S224, the operator uses an image scanner, which is connected to the computer terminal, to read the logbook received by facsimile, inputs the vehicle management number and the inspection date to the computer terminal, and issues a registration instruction. Then, in step S225, the system adds the inspection date and the logbook image data to the record within the specific independent inspection table 154 which corresponds to the inputted management number.

Figure 63:
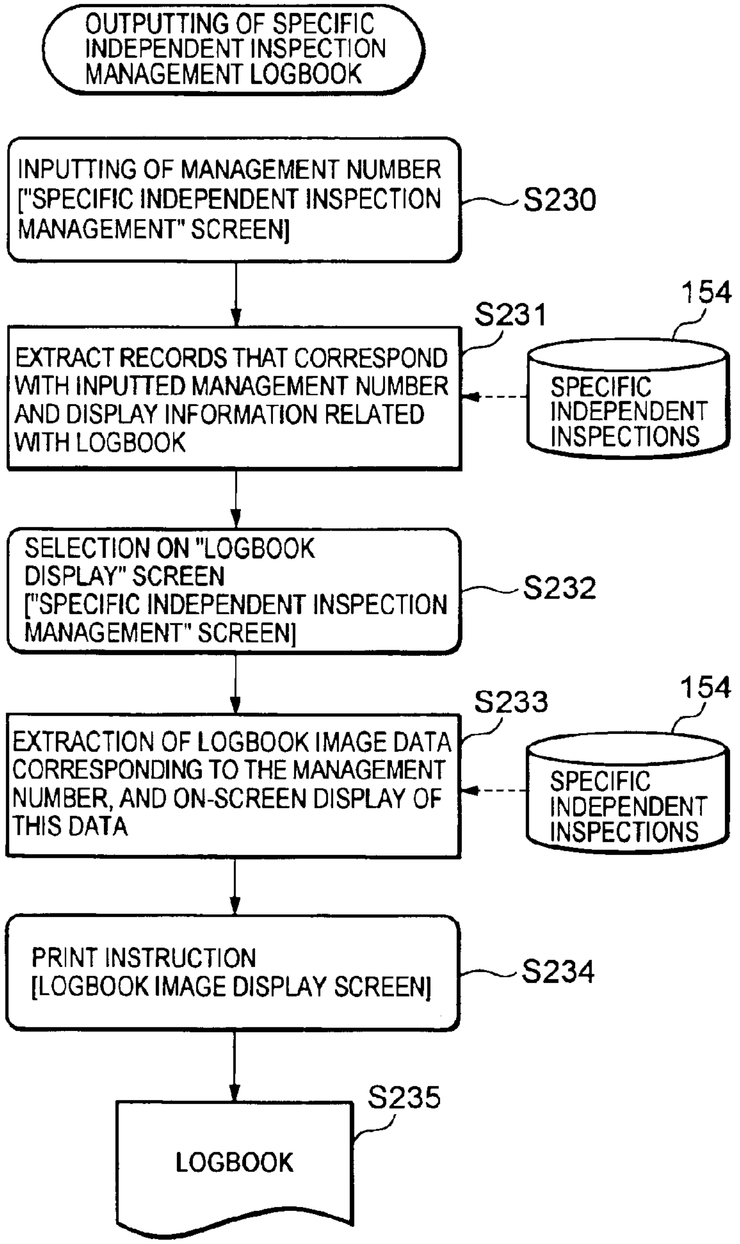
FIG. 63 is a flowchart showing the flow of the "specific independent inspection logbook output" processing of step S15 in FIG. 5.

FIG. 63 shows the flow of the "specific independent inspection logbook output" processing of step S15 in FIG. 5. FIG. 64 shows a user interface screen used in this processing.

First, in step S230, the branch store operator displays a predetermined "specific independent inspection management" screen (not illustrated) on the computer terminal, and enters the management number of the vehicle for which a logbook is to be outputted, in this screen. Then, in step S231, the system reads out the record corresponding to this management number from the specific independent inspection management table 154, and displays information linked to the logbook in this record in the "specific independent inspection management" screen.

Next, in step S232, when the operator selects "Logbook display" on the "specific independent inspection management" screen, in step S233, the system reads out logbook image data corresponding to this management number from the specific independent inspection table 154, and, as shown in FIG. 63, opens a predetermined "Logbook image display" screen (not illustrated) and displays the logbook image in the "Logbook image display" screen.

Next, in step S234, when the operator issues a print instruction on the "Logbook image display" screen of FIG. 63, in step S235, this logbook image is printed.

Figure 65:
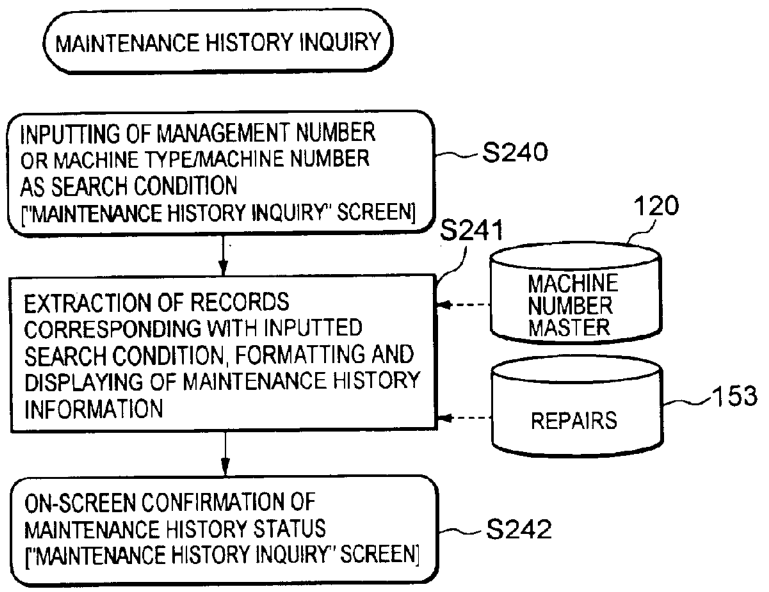
FIG. 65 is a flowchart showing the flow of the "maintenance history inquiry" processing of step S16 in FIG. 5.
Figure 66:
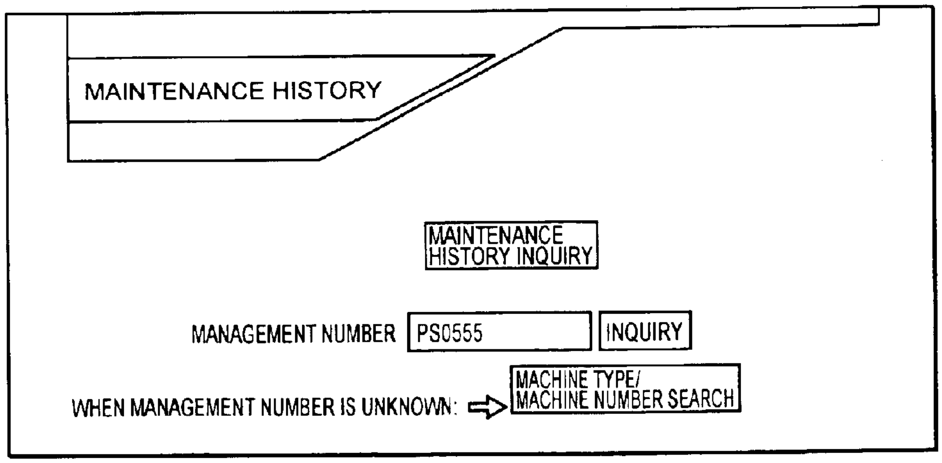
FIG. 66 shows a "Maintenance history" screen used in the maintenance history inquiry processing.
Figure 67:
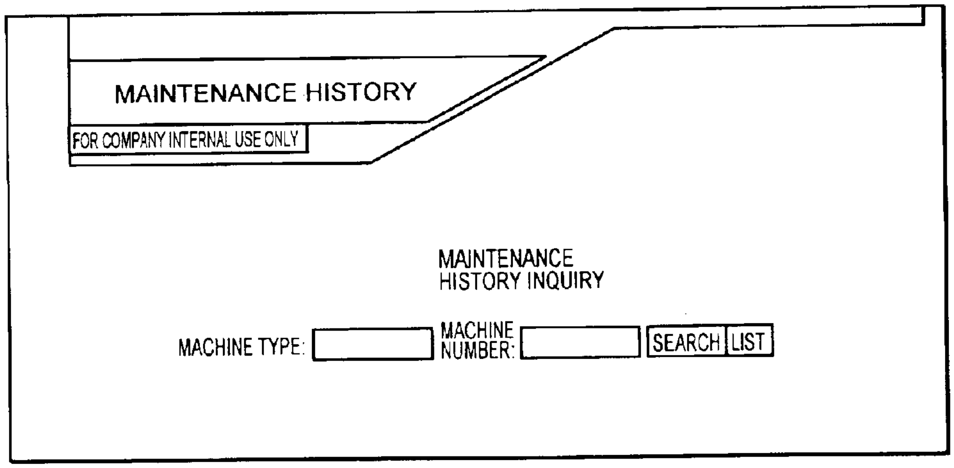
FIG. 67 shows a "Maintenance history" screen used in the maintenance history inquiry processing.

FIG. 65 shows the flow of the "maintenance history inquiry" processing of step S16 in FIG. 5. FIGS. 66 to 68 show user interface screens used in this processing.

At the maintenance facility, in step S240 in FIG. 65, the operator displays the "Maintenance history" screen shown in FIG. 66 on the computer terminal, enters the management number of the vehicle to be referenced as the search condition, in this screen, or clicks on "Machine type/ Machine number search" on this screen to display the screen shown in FIG. 67, enters the machine type and machine number of the vehicle to be referenced as the search condition, in this screen, and clicks on "Search". Then, in step S241, the system extracts the record which corresponds with the inputted search condition from the machine number master table 120 and the repairs table 153, and information relating to the maintenance history within this record is displayed in the "Maintenance history" screen as shown in FIG. 68, and hence, in step S242, the operator confirms the maintenance history in the "Maintenance history" screen.

Figure 69:
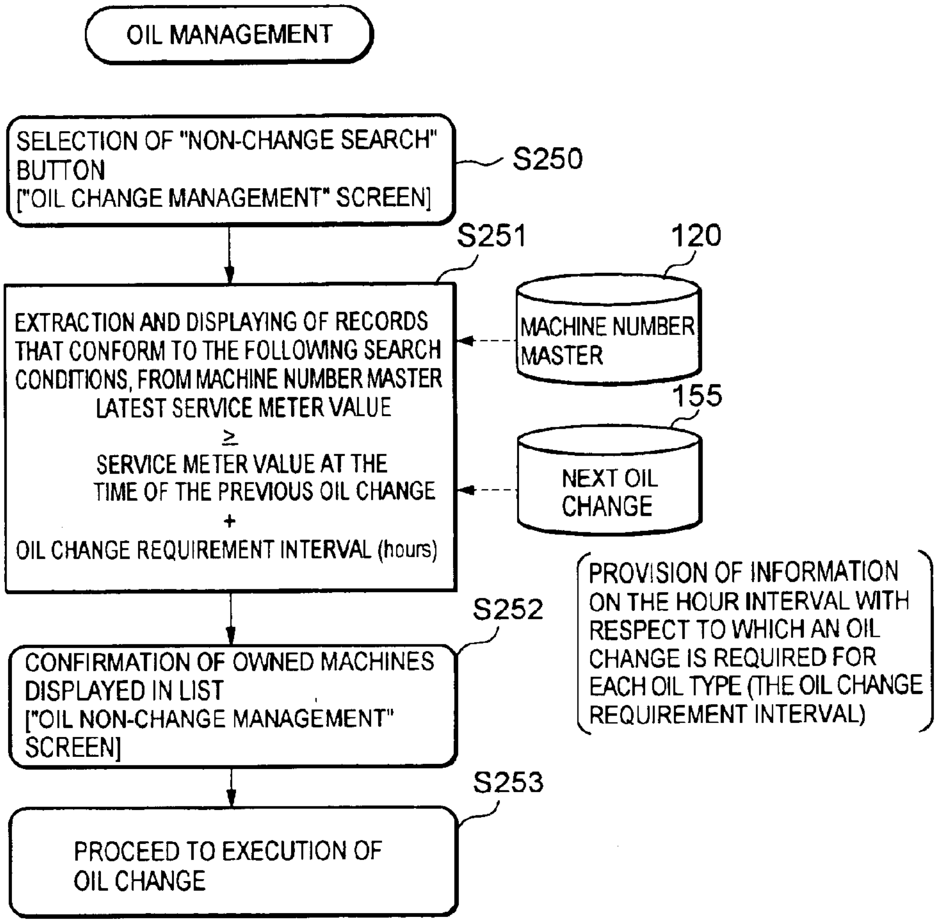
FIG. 69 is a flowchart showing the flow of "oil change" processing of step S17 in FIG. 6.
Figure 70:
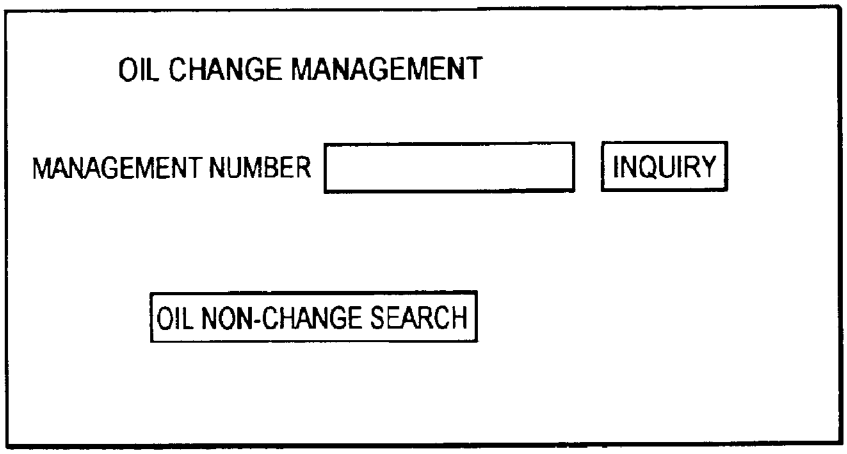
FIG. 70 shows an "Oil change management" screen used in the oil change processing.

FIG. 69 shows the flow of "oil change" processing of step S17 in FIG. 5. FIGS. 70 to 71 show user interface screens used in this processing.

At the maintenance facility, in step S250 in FIG. 69, the operator displays the "Oil change management" screen shown in FIG. 70 on the computer terminal, and clicks on "Oil non-change search" on this screen. Then, in step S251, the system reads out the records of vehicles requiring an oil change (that is, the latest service meter value thereof exceeds a value produced by adding a predetermined oil change requirement interval corresponding to the oil type to the service meter value at the time of the previous oil change) from the machine number master table 120 and the subsequent oil change table 155, and displays these records in the "Oil non-change management" screen as shown in FIG. 71, and hence, in step S252, the operator confirms the listed vehicles and, in step S253, performs an oil change for these vehicles.

Figure 72:
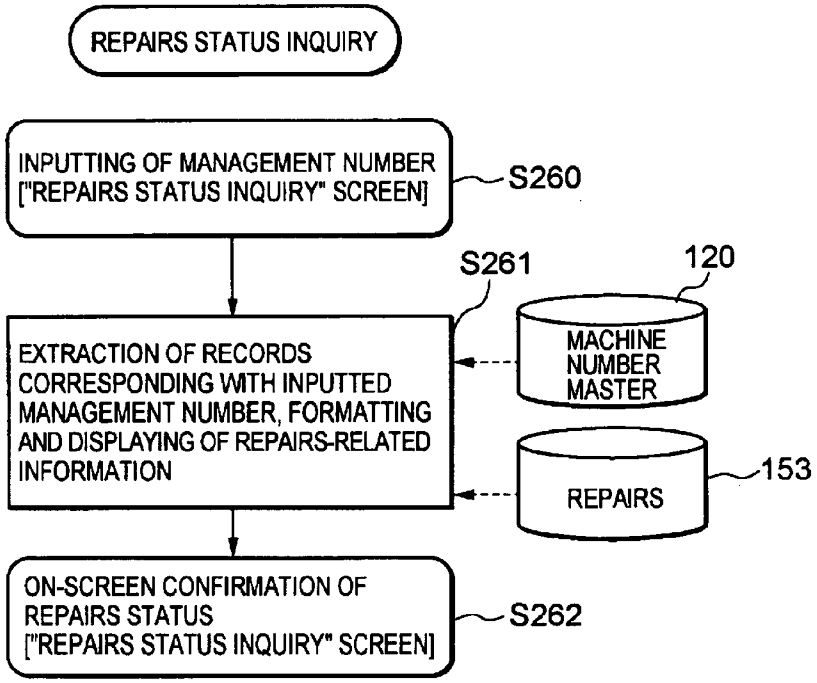
FIG. 72 is a flowchart showing the flow of the "repairs status inquiry" processing of step S18 in FIG. 5.
Figure 73:
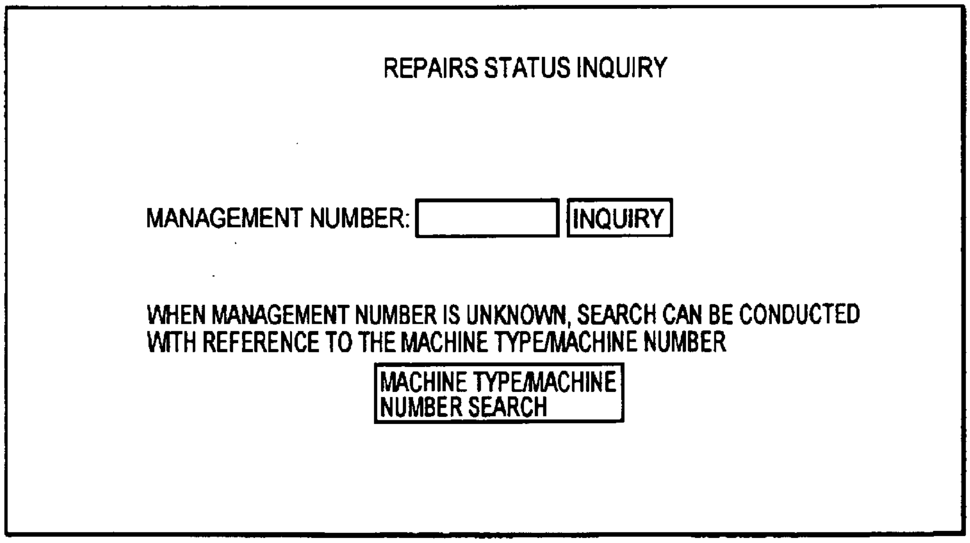
FIG. 73 shows a "repairs status inquiry" screen used in the repairs status inquiry processing.

FIG. 72 shows the flow of the "repairs status inquiry" processing of step S18 in FIG. 5. FIGS. 73 to 74 show user interface screens used in this processing.

At the maintenance facility, in step S260 in FIG. 72, the operator displays the "Repairs status inquiry" screen shown in FIG. 71 on the computer terminal, enters the "management number" in this screen and clicks on "Inquiry". Then, in step S26, the system reads out the record which corresponds with the inputted management number from the machine number master table 120 and the repairs table 153, and displays this record in the "Repairs status inquiry" screen as shown in FIG. 74. Hence, in step S262, the operator confirms the repairs status.

An overall description for the rental system was provided hereinabove. With this rental system, the operator of the branch store computer terminal 112 performs maintenance business tasks as detailed below. Hereinbelow, those parts of the embodiment which relate directly to the present invention will be described, with reference to FIGS. 75 to 80.

Figure 75:
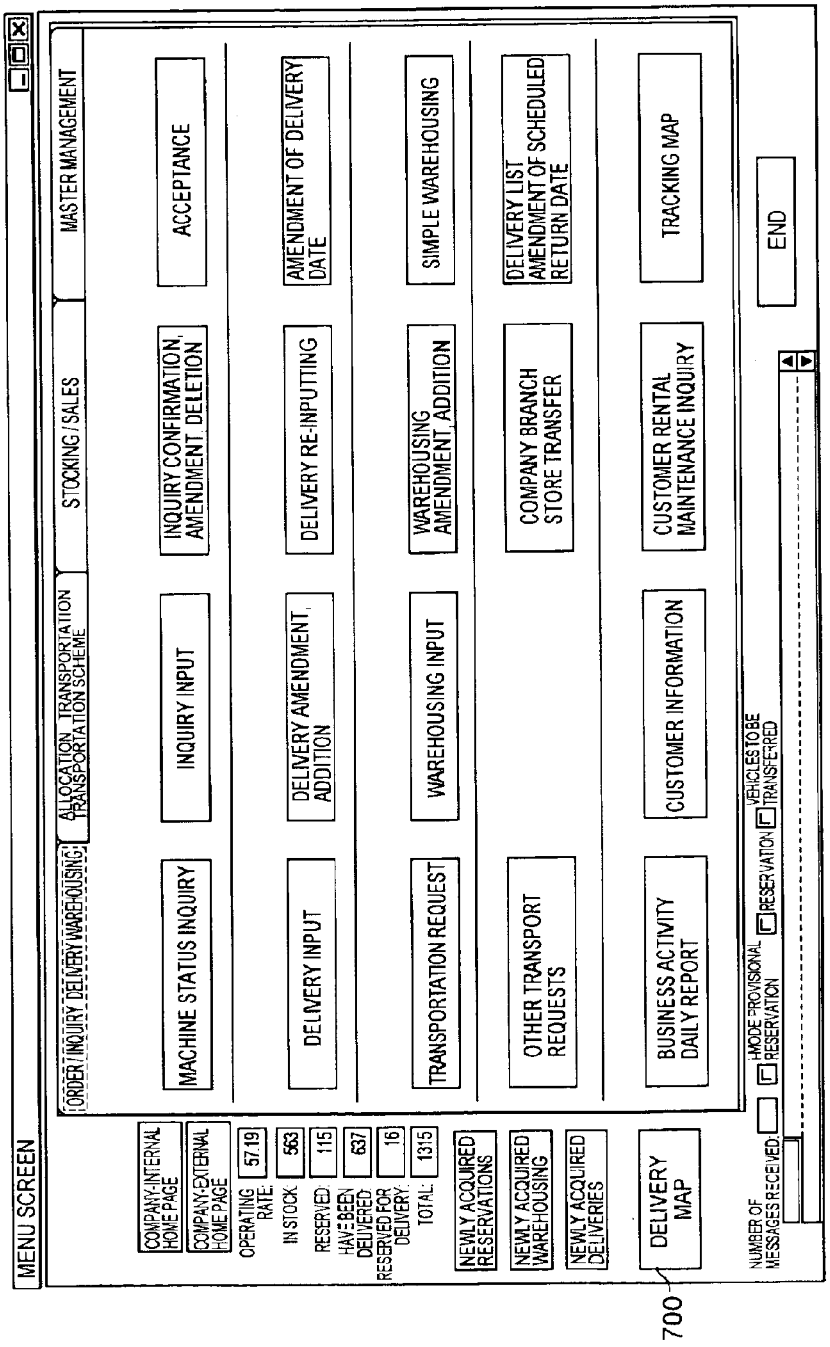
FIG. 75 shows an example of a menu screen displayed by a branch store computer terminal 112.

When the operator of the branch store computer terminal 112 performs a predetermined operation on a screen displayed on the computer terminal 112, the system transmits the menu screen shown in FIG. 75 (the configuration of which is slightly different to that of the menu screen shown in FIG. 16) to the computer terminal 112 such that same displays this menu screen. When the branch store operator clicks on the "Delivery map" button 700 on this menu screen, the system acquires map data from a map data source (the basic server 108 contains a storage medium in which map data is stored, for example) in a predetermined location (on the company network 110, for example), and transmits a map screen displaying a two-dimensional map representing this acquired map data to the branch store computer terminal 112 such that same displays this map screen, as shown in FIG. 76.

Figure 76:
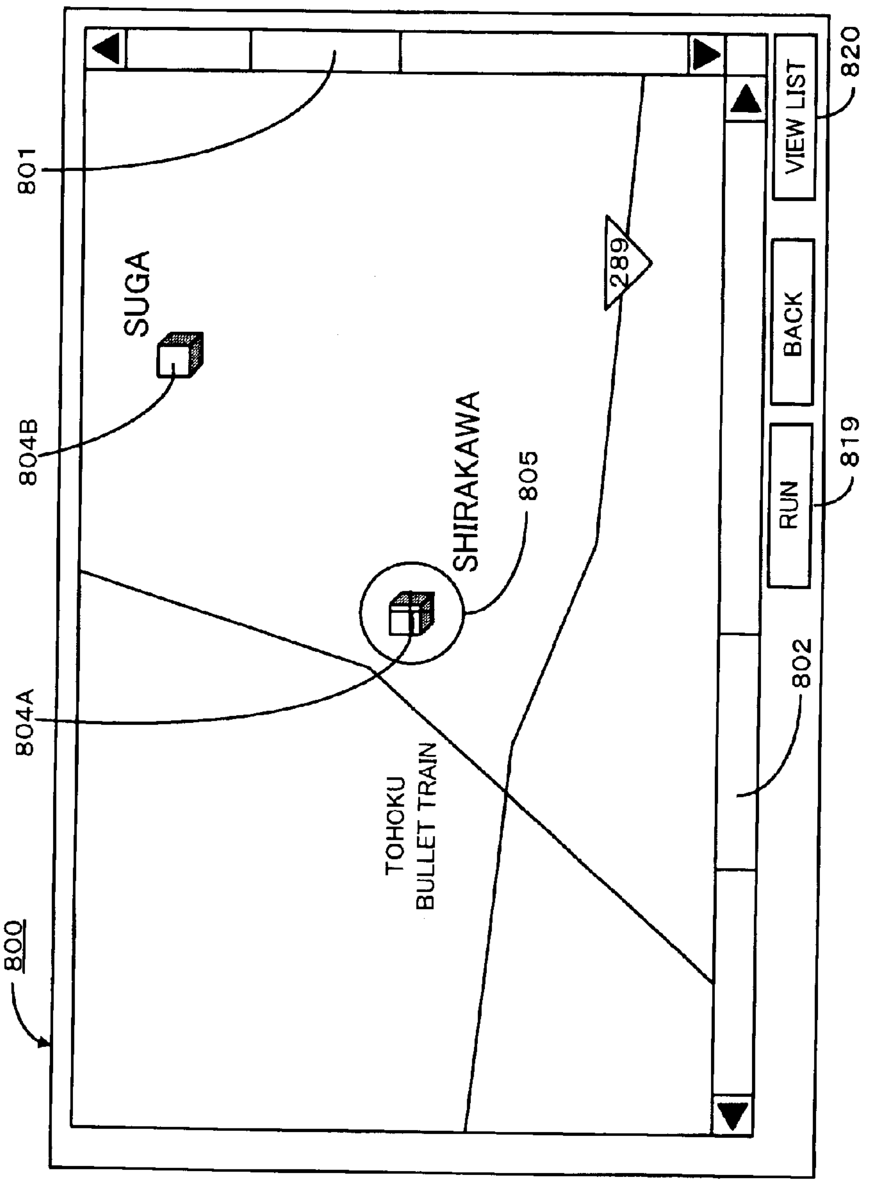
FIG. 76 shows an example of a map screen 800.

FIG. 76 shows a map screen 800 which the system causes the branch store computer terminal 112 to display. The map illustrated is simply drawn, but, in actuality, a more detailed map can be displayed.

The system displays a map at a given reduced scale (such as a predetermined scale, or the scale at the time the previous maintenance business task was completed, for example) such that a given position (such as the position of a branch store in which the computer terminal 112 is installed, or the position designated by the operator when the previous maintenance business task was completed, for example) is at the center of the map screen 800 which the computer terminal 112 first displays. When a predetermined operation (such as that of sliding the slider bar 801 or 802 vertically or laterally respectively, or dragging the mouse with the right button of the mouse depressed, for example) is performed by the operator on this map screen 800, the system scrolls, enlarges or reduces the map displayed in the map screen 800, in accordance with this operation.

On the basis of the above-mentioned map data, the system displays marks representing branch stores ("branch store marks" hereinafter) 804A, 804B, as shown in FIG. 76, in those locations on the map displayed in the map screen 800 which correspond to the respective positions of branch stores. Here, the system can display characters indicating the branch stores (the names of the branch stores, for example) so that these characters are highlighted (displayed in a color different from that of characters indicating the names of locations, or using a given type (bold characters, underlined characters, italics, and the like), for example), in place or in addition to the branch store marks 804A, 804B. Not only branch store marks, but also marks representing other bases such as the head office, branch offices, or sites, can also be displayed on the map displayed in the map screen 800. In such a case, the system displays only displayed mark types such as only marks for head office and branch stores, for example, in accordance with an operator request, it being possible to switch between displaying marks for branch offices or sites, in place of or in addition to marks for the head office and branch stores.

Figure 77:
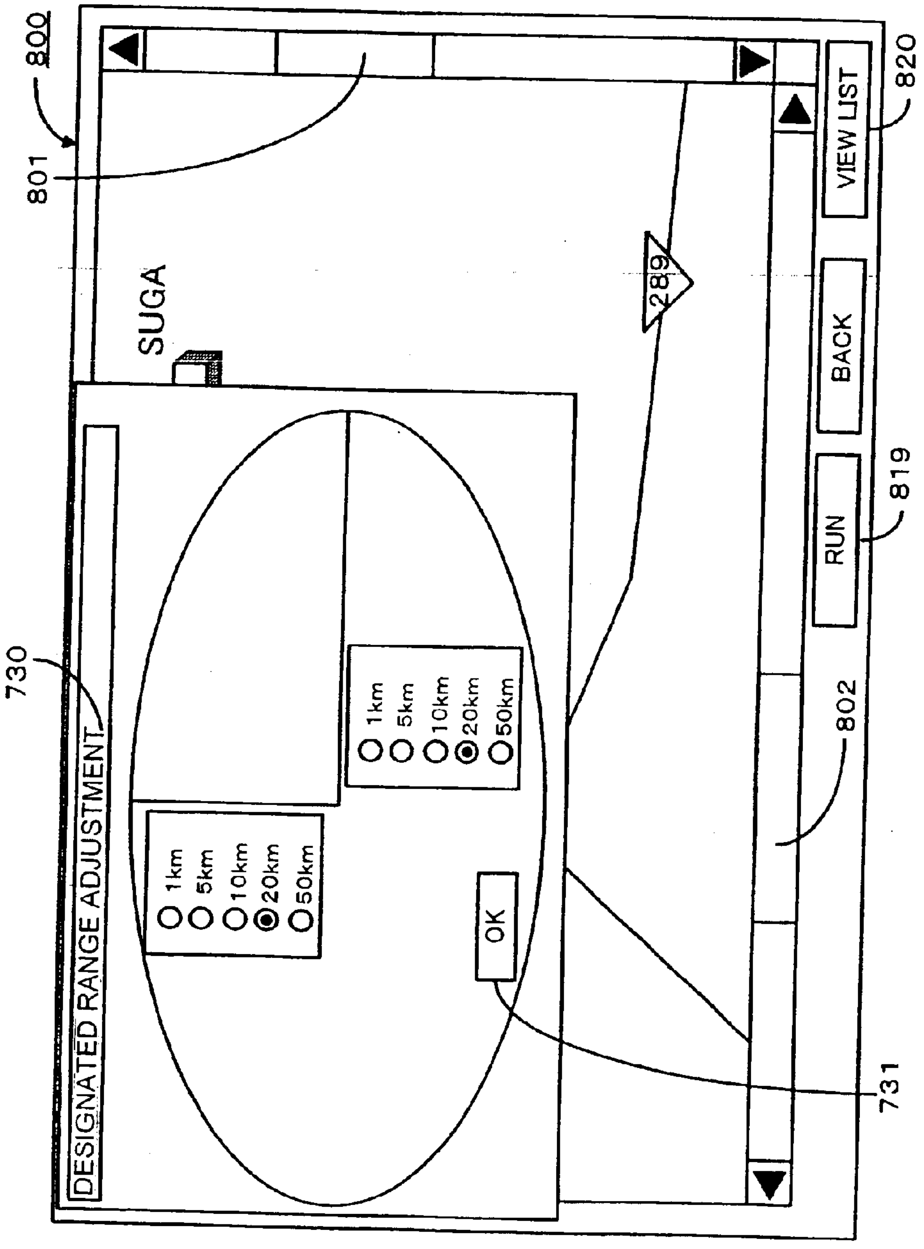
FIG. 77 shows an example of a designated range adjustment dialogue box 730.

The system accepts designations of desired bases from the branch store operator, on the map screen 800 displaying the map. When the operator designates a desired base on the map displayed by the map screen 800, for example, when the operator places the mouse cursor 805 over the branch store mark 804A as shown in FIG. 76, and clicks the "Run" button 819, the system displays the designated range adjustment dialogue box 730 for accepting a request from the branch store operator to designate the extent of a given range in the form of a circle that has the branch store mark 804A at the center thereof, on the map screen 800, as shown in FIG. 77. A plurality of radiobuttons for selecting the actual length of the [circle] diameter in a first direction (horizontal direction, for example), and a plurality of radiobuttons for selecting the actual length of the diameter in a second direction (vertical direction, for example), for the range designated in the form of a circle, are displayed in the designated range adjustment dialogue box 730.

Figure 78:
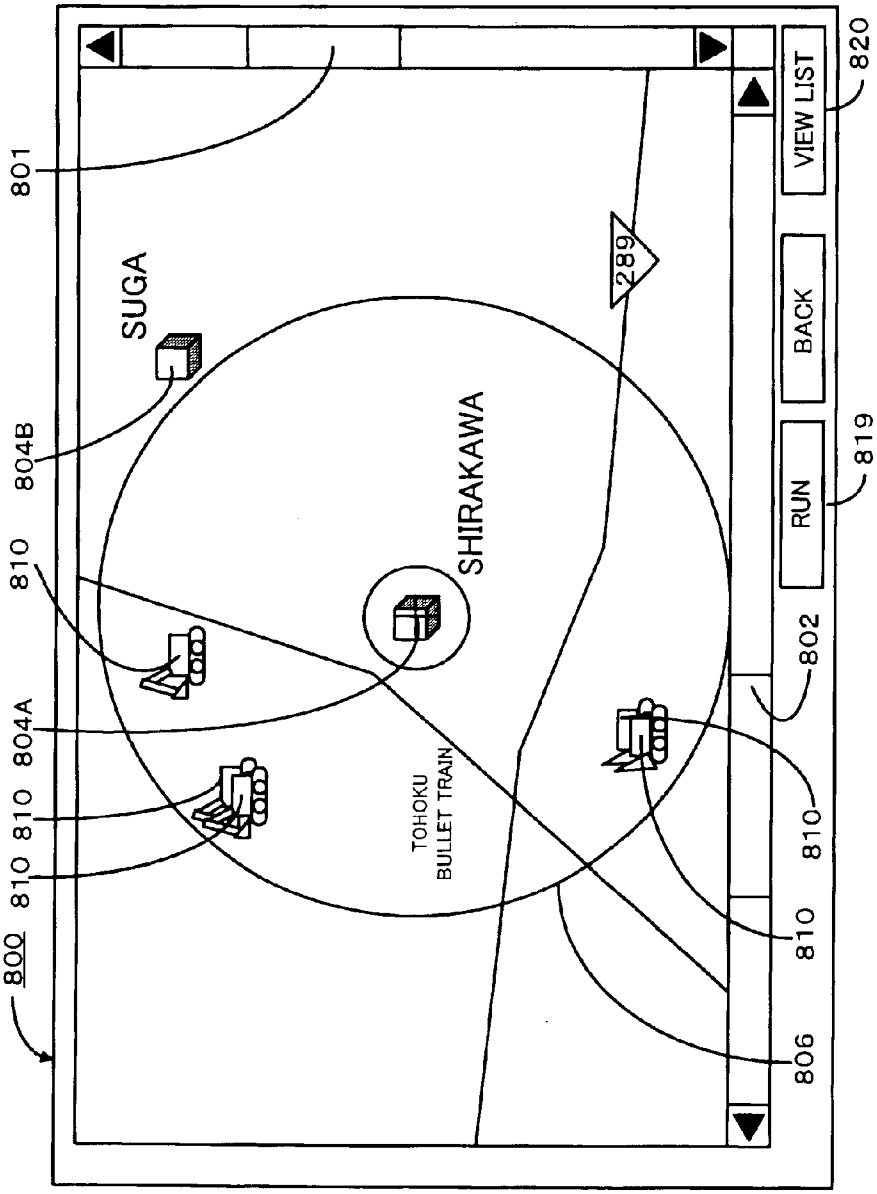
FIG. 78 shows the map screen 800 that displays the outline 806 of the range designated in the designated range adjustment dialogue box 730.

The branch store operator selects the respective diameter lengths in the first and second directions of the circle (or eclipse) which is to represent the designated range, in the designated range adjustment dialogue box 730, and clicks on the "OK" button. Then, as shown in FIG. 78, the system displays the outline 806 that corresponds to the circular designated range whose respective diameters are of the lengths selected, based on a reduced scale of the map currently displayed, on the map of the map screen 800 which has the branch store mark 804A at the center thereof.

Here the system can, before a desired branch store mark is designated by the operator, automatically display a preset range (a range that indicates the region lying under the jurisdiction of this branch store, or a circular region whose diameter is of a predetermined length or a length desired by the operator, for example) on the map on the map screen 800, with a branch store mark that represents the branch store where the computer terminal 112 is installed at the center of this range, as the above-mentioned "designated range". The system can also alter the shape of the range represented by the displayed outline 806 in accordance with a predetermined terminal operation performed by the operator (that is, the designated range represented by the outline 806 is not limited to a circle or eclipse, but rather can be changed freely).

Moreover, after displaying the outline 806 of the designated range, the system analyses the latest positional information on the construction vehicles 101, 101, . . . which is stored in the database of the basic server 108 (which information is contained in post-processing TMS mail data which is sent to the basic server 108), and identifies those construction vehicles which lie within the outline 806 (that is, within the designated range). Then, the system is capable of displaying marks 810, 810, . . . for construction vehicles located within this range, in locations within the range represented by the outline 806, which marks correspond to positions indicated by the latest positional information for the identified construction vehicles. Also, here, the displayed marks 810, 810, . . . can be marks of a plurality of types which correspond respectively to the plurality of construction vehicle types (for example, if the construction vehicle is a shovel dozer, a mark in the form of a shovel dozer, as is illustrated), or can all have the same mark irrespective of the construction vehicle type. In cases where a plurality of construction vehicles are located in the same place (site), the system can also display the marks for this plurality of construction vehicles so that such marks overlap or can also display only one mark representatively (here, the type and number, and so forth, of the construction vehicles can be displayed either on the marks or close to the marks). The system can also be made to not display construction vehicle marks in accordance with an operator request. When the operator performs a predetermined operation on the map displaying the marks 810, 810, . . . , such as that of placing the mouse cursor over a given mark 810, for example, the system can display basic or detailed information (the screen shown in FIG. 10 which is described hereinafter, for example) which is related to the construction vehicles corresponding with the marks 810, on the basis of operation information (contained in post-processing TMS mail data which is sent to the basic server 108) for the construction vehicles 101, 101, . . . stored in the database of the basic server 108, and of specific master data. In accordance with an operator request, the system can also display a condition input dialogue box (not illustrated) for inputting conditions for the construction vehicles which are displayed by marks, among the construction vehicles located within the range represented by the outline 806 (the conditions reduce the construction vehicles which are displayed), such that, of the construction vehicles located within the range represented by the outline 806, the system only displays marks for those construction vehicles that satisfy the conditions inputted in the condition input dialogue box (conditions such as an operating time length equal to or more than 72 hours, a remaining oil or fuel quantity equal to or more than one third, scheduled return dates on or after a given date, for example). The system can also pre-prepare maintenance requirement conditions that necessitate maintenance immediately (such as if the remaining oil or fuel quantity is extremely small, for example) and is thus also capable of automatically displaying only marks of those construction vehicles which satisfy maintenance requirement conditions, of the construction vehicles located in the range represented by the outline 806, by analyzing operation information in the database of the basic server 108 and the like to check whether or not there are construction vehicles that satisfy the maintenance requirement condition described above.

When the branch store operator performs a predetermined operation on the map screen 800 which displays the construction vehicle marks 810, 810, . . . on the map, for example when the operator clicks on the "View list" button 820 on the map screen 800, the system references specific master data in the database of the basic server 108 (such as the machine number master data 120 and delivery table 133, for example) and, as shown in FIG. 79, displays a vehicle list screen 900 on the branch store computer terminal 112, which vehicle list screen 900 displays information relating to the construction vehicles located within the outline 806 (such as the respective warehousing/delivery number, management number, and machine CD, as shown in FIG. 79, for example) in the form of a list (in itemized form or in a table as shown in FIG. 79, for example). Further, here, the system can restrict the information related to the construction vehicles displayed in the vehicle list screen 900 in accordance with an operator request (to only information relating to those construction vehicles satisfying conditions requested by the operator, for example). The system is also capable of changing the ranking order of the construction vehicles displayed in the form of a list, in the vehicle list screen 900, in response to an operator request (in order of greatness of the cumulative operating time, or the lateness of the scheduled return date, for example).

Figure 80:
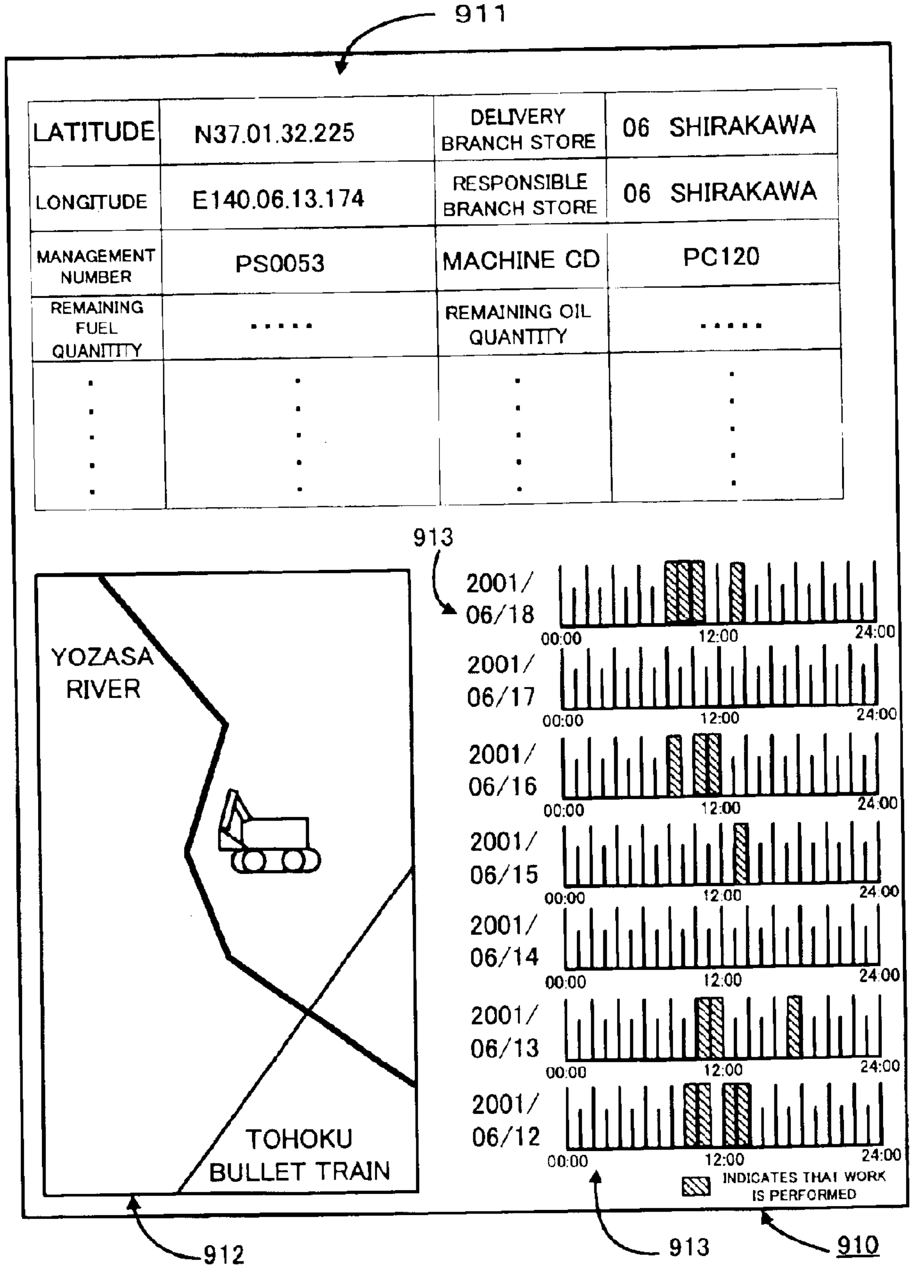
FIG. 80 shows an example of a vehicle details screen 910.

When information relating to the construction vehicle desired by the operator is selected on the vehicle list screen 900 (specifically, when the select radiobox 719 corresponding to the construction vehicle desired by the operator is selected and the "PICK UP" button 720 is clicked, for example), the system references the database of the basic server 108 (such as the machine number master data 120 and the delivery table 133, for example), and, as shown in FIG. 80, displays a screen 910 which displays information relating to the selected construction vehicle in more detail (referred to as "vehicle details screen" hereinafter). The system displays a table 911, which contains the latest position (latitude and longitude) of the selected construction vehicle, the delivery branch store, the responsible branch store, the management number, machine CD, remaining fuel quantity, remaining oil quantity, and the like; a map 912, which shows the latest position of the selected construction vehicle with greater accuracy (a map whose scale is enlarged, for example); and information 913, 913, . . . , which shows the operating times for each day in a given period (one week before the current day, for example), detected from the above-described operation information, for example, in the vehicle details screen 910. Here, of the information contained in the table 911, the information having characteristics necessitating immediate maintenance (a numerical value for the remaining fuel quantity is equal to or less than a certain threshold, for example) can be displayed by the system in highlighted form (displayed in a color different from other information, for example). Although not especially illustrated, the system can further display, in table 911, operation information other than that illustrated (such as details of any breakdowns and anomalies, the engine oil pressure, engine speed, the work machine oil temperature, work machine oil pressure, radiator water temperature, work machine load, the cumulative value of the operating time in a given period, for example), other information (such as the warehousing/delivery number, specifications, customer CD, customer name, clerk, delivery date, return date, attachment information (such as a bucket, a tooth edge for example), the form of agreement (daily, monthly, and so forth, for example), the date of the next specific independent inspection, and hour meter information (such as the current hour meters, date of update, for example). The system is also capable of printing all the information displayed in the vehicle detail screen 910 in accordance with a branch store operator request.

According to the embodiment described hereinabove, the current positions of the construction vehicles being rented are displayed on the map. Information including operation information on the construction vehicles being rented is also displayed. Because people at the branch store are thus able to grasp, in real time, in which sites the rented construction vehicles are presently located, and what operating state these vehicles are in, an efficient maintenance scheme is possible, for example one in which visits are made to a plurality of sites in any order, and this permits maintenance that is more efficient than that of the prior art.

An embodiment of the present invention was described hereinabove, but this embodiment is only an example used to describe the present invention, and is not intended to limit the present invention to this embodiment alone. Accordingly, the present invention can be implemented in a variety of other forms. In other words, a construction vehicle rental business was described as an example, but the present invention can also be applied to other embodiments such as an apparatus for supporting the creation of a maintenance scheme for machinery and tools marketed in a sales business for construction vehicle machinery and tools and the like. Moreover, in the embodiment described above, the method for notifying the system of the operating states of the construction vehicles is not limited to TMS mail, it being equally possible to adopt another method such as IBM's MQ (Message Q).

What is claimed is:

1. A system for monitoring a plurality of remotely located construction machines, comprising:

region designating means for designating a region;

map displaying means for displaying a map including the designated region;

position detecting means for automatically detecting a position of one of the plurality of remotely located construction machines;

object selecting means for selecting an object positioned in the designated region, on the basis of the detected position of said object;

object position displaying means for displaying a marker representing the selected object in the position of said selected object, on a displayed map; and state detecting means for automatically detecting the state of said one of the plurality of construction machines, wherein said region designating means designates said region based on the following:

(a) user-selected mark displayed on said map and corresponding to a desired base and, (b) a user-adjusted range that is specified in terms of distance from said desired base.

2. The system according to claim 1, further comprising: object state displaying means for displaying the detected state of said selected object.

3. The system according to claim 2, wherein said state detecting means detects substantially the latest state by executing an operation for detecting said state as required or periodically.

4. The system according to claim 2, wherein said object state displaying means displays the latest state of said object and a history of past states thereof.

5. The system according to claim 2, wherein said object state displaying means is constituted to display the state of said selected object and a map indicating the position of said selected object.

6. The system according to claim 1, further comprising:

means for displaying a marker that indicates at least one base, in the position of said base on said displayed map.

7. The system according to claim 1, wherein said desired base is a branch store of a rental company.

8. The system according to claim 1, further comprising:

means for displaying a list of selected objects.

9. The system according to claim 1, wherein said position detecting means detects substantially the latest position by executing an operation for detecting said position as required or periodically.

10. The system according to claim 1, wherein said state detecting means automatically detects a plurality of operating states of said one of the plurality of construction machines, said operating states including a cumulative operating time, details of any anomalies or breakdowns, an engine oil pressure, an engine speed, a work machine oil temperature, a work oil pressure, a radiator water temperature, and a remaining fuel quantity.

11. A method for monitoring a plurality of remotely located construction machines, comprising the steps of:

designating a region;

displaying a map including the designated region;

automatically detecting a position of one of the plurality of remotely located construction machines;

selecting an object positioned in the designated region, on the basis of the detected position of said object;

displaying a marker representing the selected object in the position of said selected object, on a displayed map; and automatically detecting the state of said one of the plurality of remotely located construction machines, wherein said step of designating a region includes the following:

(a) selecting a mark displayed on said map that corresponds to a desired base, and (b) adjusting a range by specifying distances from said desired base.

12. A computer program which is installed in a system for monitoring a plurality of remotely located construction machines and which has a computer to execute the steps of:

designating a region;

displaying a map including the designated region;

automatically detecting a position of one of the plurality of remotely located construction machines;

selecting an object positioned in the designated region, on the basis of the detected position of said object;

displaying a marker representing the selected object in the position of said selected object, on a displayed map, and automatically detecting the state of said one of the plurality of remotely located construction machines, wherein said step of designating a region includes the following:

(a) selecting a mark displayed on said map that corresponds to a desired base, and (b) adjusting a range by specifying distances from said desired base.

* * * * *